US012411491B2

(12) United States Patent
Hashimoto

(10) Patent No.: US 12,411,491 B2
(45) Date of Patent: Sep. 9, 2025

(54) REMOTE MOVING APPLICATION SOFTWARE AND REMOTE MOVING SYSTEM

(71) Applicant: TOYOTA JIDOSHA KABUSHIKI KAISHA, Toyota (JP)

(72) Inventor: Tatsuya Hashimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 383 days.

(21) Appl. No.: 17/952,942

(22) Filed: Sep. 26, 2022

(65) Prior Publication Data
US 2023/0108802 A1 Apr. 6, 2023

(30) Foreign Application Priority Data
Sep. 28, 2021 (JP) .................. 2021-157689

(51) Int. Cl.
*G05D 1/00* (2024.01)
*B60W 50/14* (2020.01)
*B60W 50/16* (2020.01)
*B60W 60/00* (2020.01)

(52) U.S. Cl.
CPC .............. *G05D 1/005* (2013.01); *B60W 50/16* (2013.01); *B60W 60/001* (2020.02); *B60W 2050/143* (2013.01); *B60W 2510/1005* (2013.01)

(58) Field of Classification Search
CPC .... G05D 1/005; G05D 1/0044; G05D 1/0212; B60W 50/16; B60W 60/001; B60W 2050/143; B60W 2510/1005
See application file for complete search history.

(56) References Cited

U.S. PATENT DOCUMENTS

| 8,903,567 | B2 | 12/2014 | Morimoto et al. |
| 10,464,554 | B2 | 11/2019 | Okamura et al. |
| 2015/0127208 | A1 | 5/2015 | Jecker et al. |
| 2017/0255263 | A1* | 9/2017 | Letendre ................. G06F 3/016 |
| 2019/0302754 | A1 | 10/2019 | Tsuruoka |
| 2020/0218249 | A1* | 7/2020 | Sannodo .............. G05D 1/0016 |
| 2021/0001876 | A1 | 1/2021 | Ichimaru |
| 2021/0197772 | A1 | 7/2021 | Tsumano |

FOREIGN PATENT DOCUMENTS

| JP | 2015-516772 A | 6/2015 |
| JP | 2019-166929 A | 10/2019 |
| WO | 2013/156361 A1 | 10/2013 |
| WO | 2017/072942 A1 | 5/2017 |
| WO | 2019/181378 A1 | 9/2019 |

* cited by examiner

*Primary Examiner* — Ramya P Burgess
*Assistant Examiner* — Ana D Thomas
(74) *Attorney, Agent, or Firm* — Sughrue Mion, PLLC

(57) ABSTRACT

When a remote moving control is executed, and a state of controlling a vehicle is a state of changing a shift state of a transmission apparatus of the vehicle, a remote moving application software controls a terminal control unit to cause an operation terminal to generate vibration having a vibration pattern different from the vibration pattern of the vibration generated by the operation terminal when the state of controlling the vehicle is a state other than the state of changing the shift state or output informing sounds having an output pattern different from the output pattern of the informing sounds output by the operation terminal when the state of controlling the vehicle is the state other than the state of changing the shift state.

5 Claims, 44 Drawing Sheets

REMOTE MOVING APPLICATION SOFTWARE AND REMOTE MOVING SYSTEM

CROSS-REFERENCE TO RELATED APPLICATIONS

This application claims priority to Japanese patent application No. JP 2021-157689 filed on Sep. 28, 2021, the content of which is hereby incorporated by reference in its entirety.

BACKGROUND

Field

The invention relates to a remote moving application software and a remote moving system.

Description of the Related Art

There is known a remote moving application software and a remote moving system for remotely activating a control unit of an own vehicle to autonomously move and park the own vehicle in a parking space in response to operations applied to a terminal or an operation terminal such as a cell phone (for example, see JP 2015-516772 A).

When the own vehicle is autonomously moved, and an obstacle which will interrupt an autonomous moving of the own vehicle is detected, the known remote moving application software and system inform a user of the operation terminal of the detected obstacle by vibrating the operation terminal. Also, when the known remote moving application software and system autonomously stop the own vehicle or start to autonomously move the own vehicle, the known remote moving application software and system inform the user of the operation terminal that the own vehicle will stop or will start to move by vibrating the operation terminal.

The known remote moving application software and system inform that (i) there is the obstacle, (ii) the own vehicle will stop, and (iii) the own vehicle will start to move by vibrating the operation terminal with different frequencies. Thereby, the user can determine whether (i) there is the obstacle, (ii) the own vehicle will stop, or (iii) the own vehicle will start to move, based on vibration of the operation terminal.

In this regard, the user can easily realize situations that (i) there is the obstacle, (ii) the own vehicle will stop, and (iii) the own vehicle will start to move by seeing the own vehicle, operating the operation terminal. On the other hand, the user cannot easily realize a situation that a shift state of a transmission apparatus has been changed, for example, to K-turn the own vehicle even by seeing the own vehicle. Thus, if the operation terminal can cause the user to easily realize a situation which the user cannot easily realize by seeing the own vehicle, the user can have some benefit. However, the known remote moving application software and system are not configured to use the operation terminal to cause the user to easily realize the situation which the user cannot easily realize with their eyes.

SUMMARY

An object of the invention is to provide a remote moving application software and a remote moving system which can provide the user of the operation terminal with a realization of a situation that the shift state of the transmission apparatus of the vehicle has been changed while the remote moving control to remotely and autonomously move the vehicle is executed.

A remote moving application software according to the invention is installed in a terminal control unit of an operation terminal to enable the terminal control unit to wirelessly communicate a vehicle control unit of a vehicle to cause the vehicle control unit to execute a remote moving control to autonomously move the vehicle in response to operations applied to the operation terminal. Further, the remote moving application software according to the invention is programmed to control the terminal control unit to cause the operation terminal to (i) generate vibration or (ii) output informing sounds, depending on a state of controlling the vehicle when the remote moving control is executed.

When (i) the remote moving control is executed, and (ii) the state of controlling the vehicle is a state of changing a shift state of a transmission apparatus of the vehicle, the remote moving application software according to the invention is programmed to control the terminal control unit to cause the operation terminal to (i) generate the vibration having a vibration pattern different from the vibration pattern of the vibration generated by the operation terminal when the state of controlling the vehicle is a state other than the state of changing the shift state or (ii) output the informing sounds having an output pattern different from the output pattern of the informing sounds output by the operation terminal when the state of controlling the vehicle is the state other than the state of changing the shift state.

According to the invention, while the remote moving control is executed, the vibration is generated in the operation terminal with the different vibration patterns in a shift change situation that the shift state is changed and a situation other than the shift change situation. Alternatively, while the remote moving control is executed, the informing sounds are output from the operation terminal with the different output patterns in the shift change situation and the situation other than the shift change situation. Thus, the user of the operation terminal can easily realize that the shift state is changed, based on the vibration or the informing sounds.

According to an aspect of the invention, when (i) the remote moving control is executed, and (ii) the state of controlling the vehicle is a state of moving the vehicle, the remote moving application software may be programmed to control the terminal control unit to cause the operation terminal to (i) generate the vibration having a predetermined moving vibration pattern or (ii) output the informing sounds having a predetermined moving informing sound output pattern. Further, when (i) the remote moving control is executed, and (ii) the state of controlling the vehicle is the state of changing the shift state, the remote moving application software may be programmed to control the terminal control unit to cause the operation terminal to (i) generate the vibration having a shift change vibration pattern different from the predetermined moving vibration pattern or (ii) output the informing sounds having a shift change informing sound output pattern different from the predetermined moving informing sound output pattern.

According to this aspect of the invention, while the remote moving control is executed, the vibration pattern or the output pattern differs between a situation that the vehicle is moved and the situation that the shift state is changed. Thus, the user of the operation terminal can easily determine whether the vehicle is moved, or the shift state is changed, based on the vibration or the informing sounds.

According to another aspect of the invention, when (i) the remote moving control is executed, and (ii) the state of controlling the vehicle is a state of braking the vehicle, the remote moving application software may be programmed to control the terminal control unit to cause the operation terminal to (i) generate the vibration having a predetermined braking vibration pattern or (ii) output the informing sounds having a predetermined braking informing sound output pattern. Further, when (i) the remote moving control is executed, and (ii) the state of controlling the vehicle is the state of changing the shift state, the remote moving application software may be programmed to control the terminal control unit to cause the operation terminal to (i) generate the vibration having a shift changing vibration pattern different from the predetermined braking vibration pattern or (ii) output the informing sounds having a shift change informing sound output pattern different from the predetermined braking informing sound output pattern.

According to this aspect of the invention, while the remote moving control is executed, the vibration pattern or the output pattern differs between a situation that the vehicle is braked and the situation that the shift state is changed. Thus, the user of the operation terminal can easily determine whether vehicle is braked, or the shift state is changed, based on the vibration or the informing sounds.

According to further another aspect of the invention, when (i) the remote moving control is executed, and (ii) an obstacle is detected around the vehicle, the remote moving application software may be programmed to control the terminal control unit to cause the operation terminal to (i) generate the vibration having the vibration pattern different from the vibration pattern which depends on the state of controlling the vehicle or (ii) output the informing sounds having the output pattern different from the output pattern which depends on the state of controlling the vehicle.

According to this aspect of the invention, when the obstacle is detected while the remote moving control is executed, the vibration is generated in the operation terminal with the vibration pattern which is different from the vibration pattern used to inform the user of the operation terminal of the state of controlling the vehicle. Alternatively, when the obstacle is detected while the remote moving control is executed, the informing sounds are output from the operation terminal with the output pattern which is different from the output pattern used to inform the user of the operation terminal of the state of controlling the vehicle. Thus, the user of the operation terminal can easily realize the state of controlling the vehicle and the obstacle, based on the vibration or the informing sounds.

Furthermore, a remote moving system according to the invention (i) causes a terminal control unit of an operation terminal and a vehicle control unit of a vehicle to wirelessly communicate each other and (ii) causes the vehicle control unit to execute a remote moving control to autonomously move the vehicle in response to operations applied to the operation terminal. The remote moving system according to the invention is configured to control the terminal control unit to cause the operation terminal to (i) generate vibration or (ii) output informing sounds, depending on a state of controlling the vehicle when the remote moving control is executed.

When (i) the remote moving control is executed, and (ii) the state of controlling the vehicle is a state of changing a shift state of a transmission apparatus of the vehicle, the terminal control unit is configured to cause the operation terminal to (i) generate the vibration having a vibration pattern different from the vibration pattern of the vibration generated by the operation terminal when the state of controlling the vehicle is a state other than the state of changing the shift state or (ii) output the informing sounds having an output pattern different from the output pattern of the informing sounds output by the operation terminal when the state of controlling the vehicle is the state other than the state of changing the shift state.

According to the invention, for the same reason as that described above, the user of the operation terminal can easily realize that the shift state is changed, based on the vibration or the informing sounds.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Below, a remote moving application software and a remote moving system according to an embodiment of the invention will be described with reference to the drawings.

The remote moving application software according to the embodiment of the invention described below is an application software or a remote parking-and-pulling-out application software installed in a terminal control unit (i.e., a control unit of an operation terminal). The remote moving application software causes the terminal control unit and a vehicle control unit (i.e., a control unit of an own vehicle) to wirelessly communicate each other. In addition, the remoter moving application software controls the terminal control unit to cause the vehicle control unit to execute a remote moving control or a remote parking-and-pulling-out control to perform an autonomous driving of the vehicle through wireless communication between the terminal control unit and the vehicle control unit. The remote moving control or the remote parking-and-pulling-out control is a control to (i) autonomously move and park the own vehicle in a parking space in response to operations applied to the operation terminal and (ii) autonomously move and pulling out the own vehicle from the parking space in response to the operations applied to the operation terminal.

The remote moving system described below is a remote parking-and-pulling-out system to cause the vehicle control unit and the terminal control unit to wirelessly communicate each other and control the terminal control unit to cause the vehicle control unit to execute the remote moving control or the remote parking-and-pulling-out control.

In this regard, the remote moving application software and the remote moving system according to the invention are not limited to the remote parking-and-pulling-out application software and the remote parking-and-pulling-out system described above. The remote moving application software and system according to the invention may be an application software and a system which execute a remote moving control to remotely and autonomously move the own vehicle from the outside of the own vehicle in response to the operations applied to the operation terminal.

Figure 1:
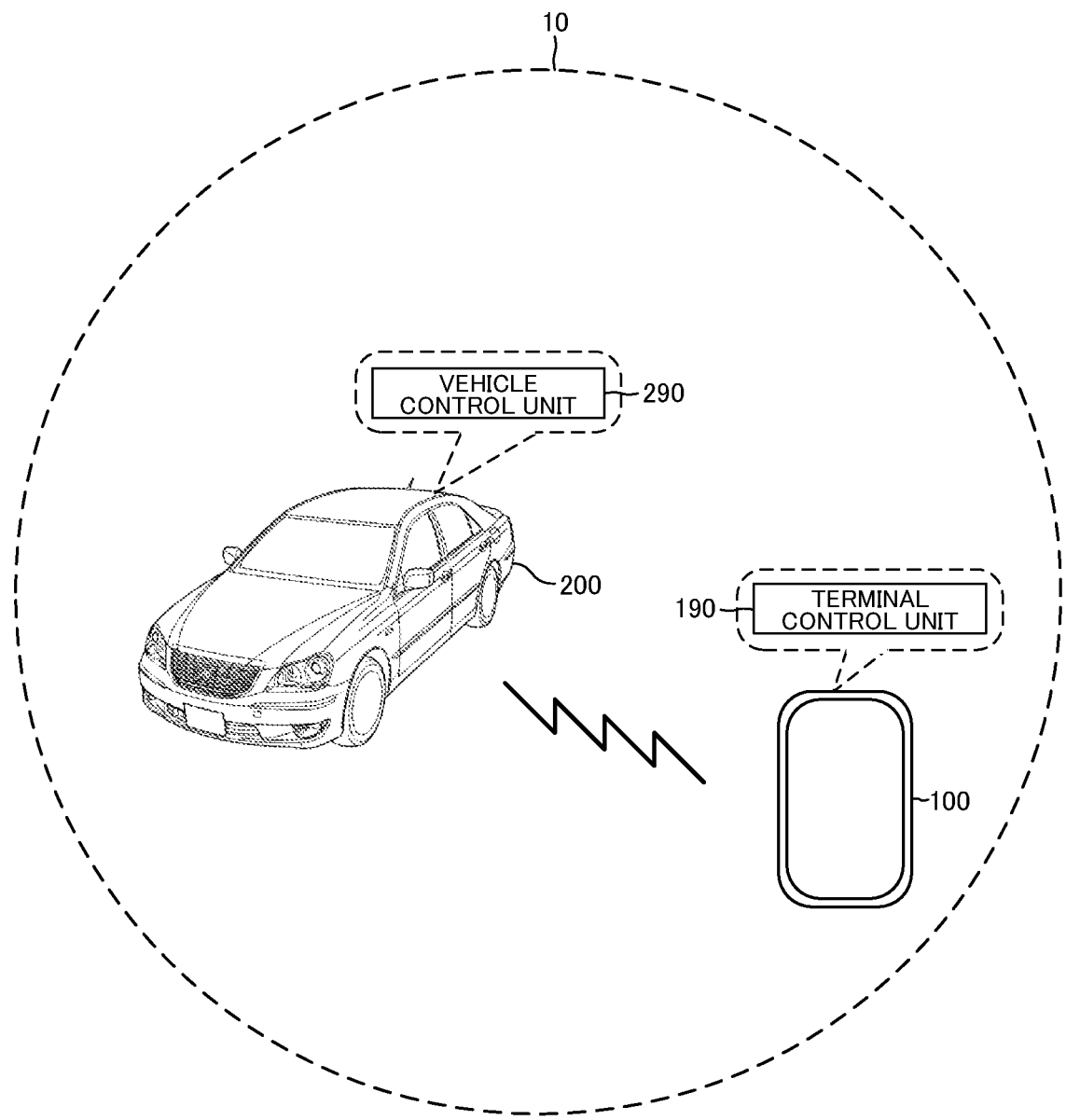
FIG. 1 is a view which shows a remote moving system according to an embodiment of the invention.

As shown in FIG. 1, the remote moving system 10 according to the embodiment of the invention includes a terminal control unit 110 (i.e., a control unit installed in an operation terminal 100) and a vehicle control unit 210 (i.e., a control unit installed on an own vehicle 200). The remote moving application software according to the embodiment of the invention is installed in the terminal control unit 110.

Figure 2:
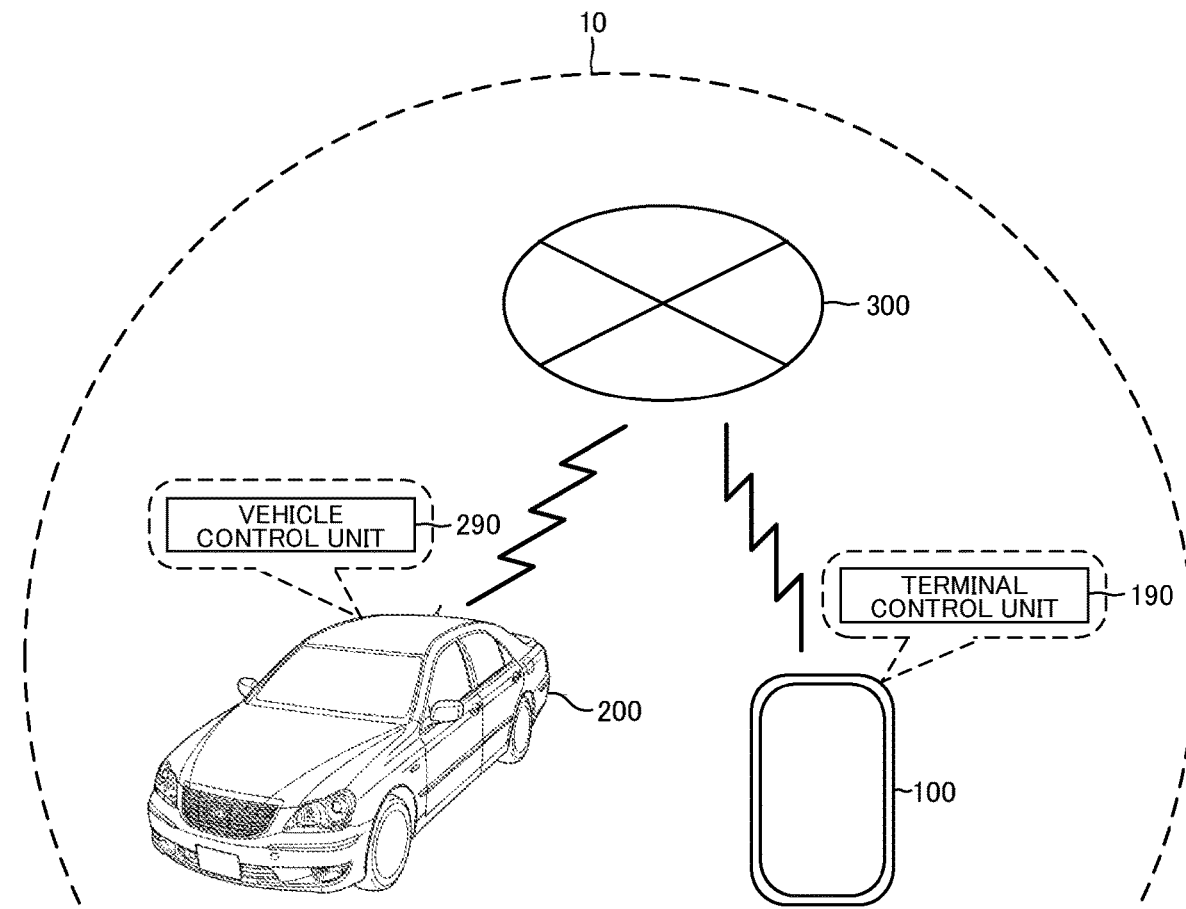
FIG. 2 is a view which shows a remote moving system according to a modified example of the embodiment of the invention.

In this embodiment, the terminal control unit 110 and the vehicle control unit 210 of the remote moving system 10 are configured to wirelessly and directly send and receive various signals to and from each other. In this regard, as shown in FIG. 2, the remote moving system 10 may be configured by (i) the terminal control unit 110, (ii) the vehicle control unit 210, and (iii) an internet 300 and may be configured to send and receive signals between the terminal control unit 110 and the vehicle control unit 210 via the internet 300.

Figure 3:
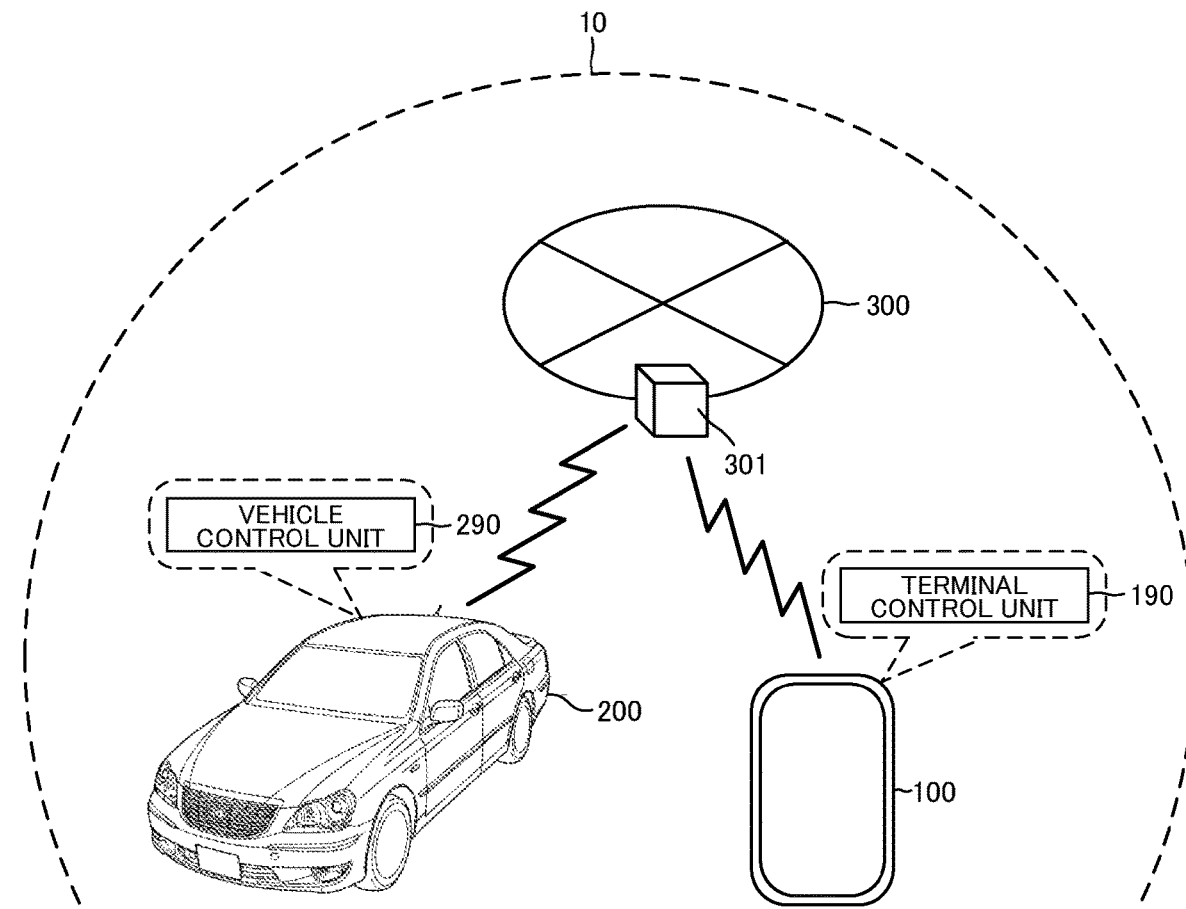
FIG. 3 is a view which shows a remote moving system according to another modified example of the embodiment of the invention.

Alternatively, as shown in FIG. 3, the remote moving system 10 may be configured by (i) the terminal control unit 110, (ii) the vehicle control unit 210, (iii) the internet 300, and (iv) a server 301 provided on the internet 300 and may be configured to send and receive signals between the terminal control unit 110 and 210 via the internet 300 and the server 301.

<Operation Terminal>

In this embodiment, the operation terminal 100 is a so-called smart phone which is a phone which a person can carry. In this regard, the operation terminal 100 may be any terminal which is separated from the own vehicle 200 and which a user such as a driver DR of the own vehicle 200 can carry to the outside of the own vehicle 200. For example, the operation terminal 100 may be a so-called smart key which a person can carry or a terminal dedicated to a remote parking-and-pulling-out.

Figure 4:
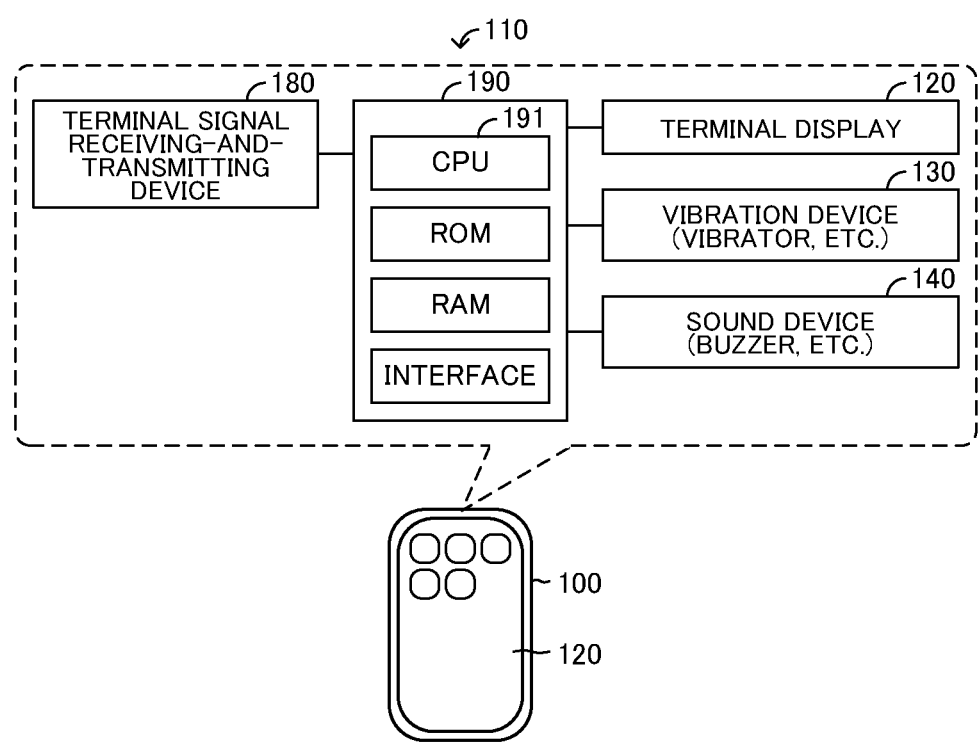
FIG. 4 is a view which shows a terminal control unit and an operation terminal installed with the terminal control unit which configure the remote moving system according to the embodiment of the invention.

As shown in FIG. 4, the operation terminal 100 includes the terminal control unit 110. The terminal control unit 110 includes a terminal ECU 190.

ECU stands for electronic control unit. The terminal ECU 190 includes a microcomputer as a main component. The terminal ECU 190 includes a CPU (i.e., a terminal CPU 191), a ROM, a RAM, a non-volatile memory, and an interface. The terminal CPU 191 is configured or programmed to realize various functions by executing instructions, programs, or routines stored in the ROM. In particular, the terminal ECU 190 is installed with the remote moving application software to cause a vehicle ECU 290 (i.e., an ECU of the own vehicle 200) to execute the remote parking-and-pulling-out control described later in detail.

It should be noted that when the remote moving system 10 is configured as shown in FIG. 3, the remote moving system 10 may be configured such that a program stored in the server 301 serves a part of functions of the remote moving application software installed in the terminal ECU 190. Further, when the remote moving system 10 is configured as shown in FIG. 3, the remote moving system 10 may be configured such that the remote moving application software installed in the terminal ECU 190 is updated by the server 301.

Further, the operation terminal 100 includes a terminal display 120, a vibration device 130, a sound device 140, and a terminal signal receiving-and-transmitting device 180.

The terminal display 120 is a device which displays images. Further, a particular physical property of the terminal display 120 changes in response to an object contacting the terminal display 120. In particular, in this embodiment, the particular physical property of the terminal display 120 changes in response to a finger of a person contacting the terminal display 120.

The terminal display 120 is electrically connected to the terminal ECU 190. The terminal ECU 190 can display various images on the terminal display 120. Further, the terminal ECU 190 detects a change of the particular physical property of the terminal display 120 in response to the object contacting the terminal display 120 and determines a portion of the terminal display 120 which the object contacts, based on the detected change.

It should be noted that the terminal ECU 190 can determine the portion of the terminal display 120 which the object contacts, based on the change of the particular physical property of the terminal display 120 and thus, the terminal display 120 is a contact information providing device which provides information for determining the portion which the object contacts. In this embodiment, the contact information providing device is the terminal display 120, but is not limited thereto. The contact information providing device may be any device which can provide information to determine the portion of the terminal display 120 which the object contacts. Thus, the contact information providing device may not have a function of displaying images.

The vibration device 130 is a device which generates vibration. The vibration device 130 may be a vibrator. The vibration device 130 is electrically connected to the terminal ECU 190. The terminal ECU 190 can vibrate the operation terminal 100 by activating the vibration device 130.

The sound device 140 is a device which outputs informing sounds such as buzzer sounds. The sound device 140 may be a buzzer. The sound device 140 is electrically connected to the terminal ECU 190. The terminal ECU 190 can output the informing sounds from the sound device 140.

The terminal signal receiving-and-transmitting device 180 is a device which receives signals wirelessly from the outside of the operation terminal 100 and wirelessly transmits signals to the outside of the operation terminal 100. The terminal signal receiving-and-transmitting device 180 is electrically connected to the terminal ECU 190. The terminal ECU 190 can wirelessly transmit various signals to the outside of the operation terminal 100 via the terminal signal receiving-and-transmitting device 180. In addition, the terminal ECU 190 can receive various wireless signals via the terminal signal receiving-and-transmitting device 180. In this embodiment, the wireless signals are signals which the vehicle ECU 290 of the own vehicle 200 wirelessly transmits out of the own vehicle 200 via a vehicle receiving-and-transmitting device 280.

As can be understood, the terminal control unit 110 is configured to wirelessly communicate with the vehicle control unit 210.

<Own Vehicle>

Figure 5:
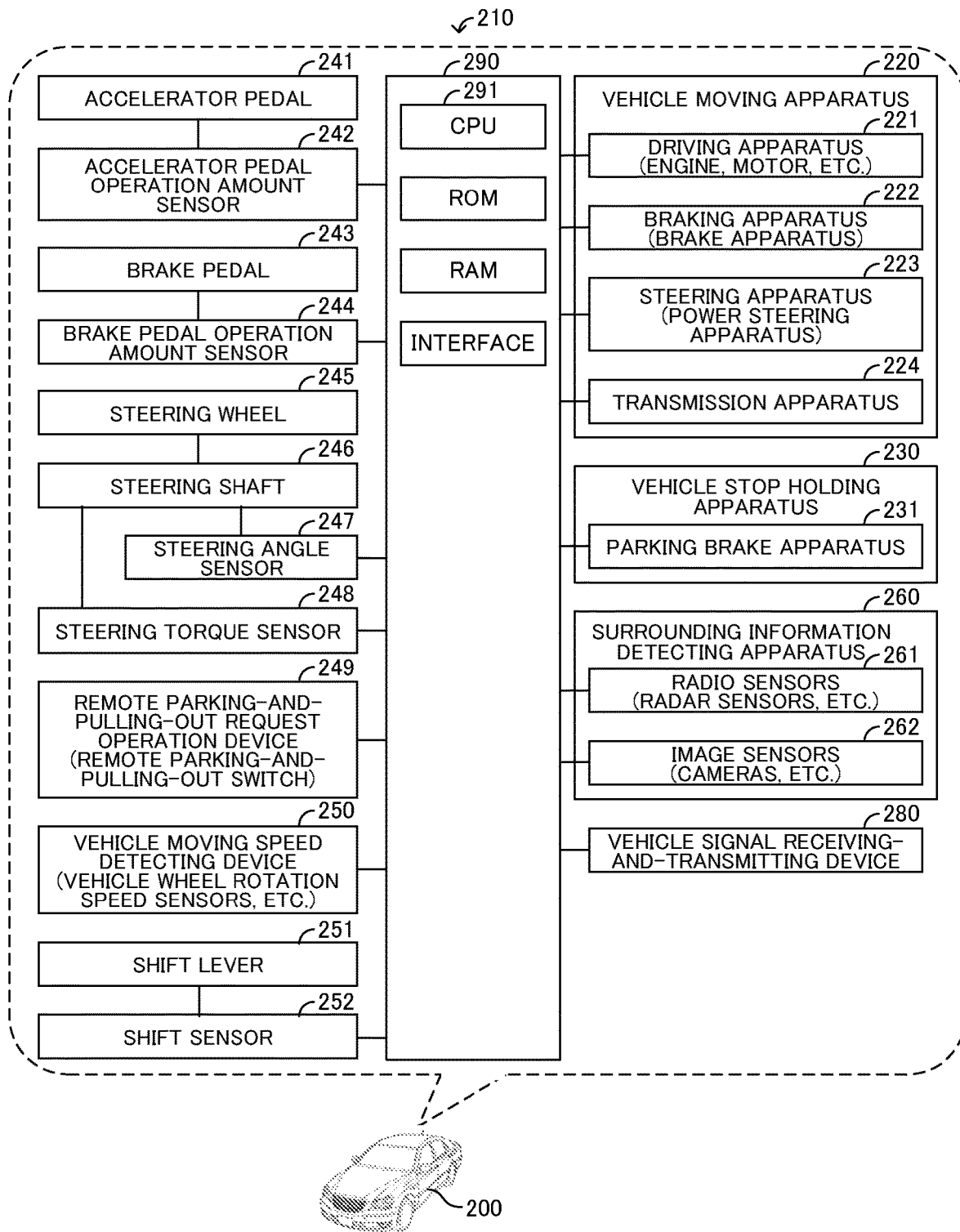
FIG. 5 is a view which shows a vehicle control unit and a vehicle (or an own vehicle) installed with the vehicle control unit which configure the remote moving system according to the embodiment of the invention.

As shown in FIG. 5, the vehicle control unit 210 is installed on the own vehicle 200.

The vehicle control unit 210 is a unit which executes a remote parking control and a remote pulling-out control as the remote parking-and-pulling-out control. The remote parking control is a control to park the own vehicle 200 in a designated parking space by autonomously moving the own vehicle 200 and stopping the own vehicle 200 at a point in the designated parking space in response to signals wirelessly transmitted from the operation terminal 100. The remote pulling-out control is a control to pull out the own vehicle 200 from the designated parking space by autonomously moving the own vehicle 200 and stopping the own vehicle 200 at a point outside of the designated parking space in response to signals wirelessly transmitted from the operation terminal 100.

As shown in FIG. 5, the vehicle control unit 210 includes a vehicle ECU 290. The vehicle ECU 290 includes a microcomputer as a main component. The vehicle ECU 290 includes a CPU (i.e., a vehicle CPU 291), a ROM, a RAM, a non-volatile memory, and an interface. The vehicle CPU 291 is configured or programmed to realize various functions by executing instructions, programs, or routines stored in the ROM. In particular, a program to execute the remote parking-and-pulling-out control is stored in the vehicle ECU 290.

It should be noted that when the remote moving system 10 is configured as shown in FIG. 3, the remote moving system 10 may be configured such that a part of processes executed by a program of executing the remote parking-and-pullingout control stored in the vehicle ECU 290 is executed by a program stored in the server 301. Further, when the remote moving system 10 is configured as shown in FIG. 3, the remote moving system 10 may be configured such that the program of executing the remote parking-and-pulling-out control stored in the vehicle ECU 290 is updated by the server 301.

<Vehicle Moving Apparatus>

Further, a vehicle moving apparatus 220 is installed on the own vehicle 200. The vehicle moving apparatus 220 drives, brakes, and steers the own vehicle 200 and performs a shift change of the own vehicle 200. In this embodiment, the vehicle moving apparatus 220 includes a driving apparatus 221, a braking apparatus 222, a steering apparatus 223, and a transmission apparatus 224.

<Driving Apparatus>

The driving apparatus 221 outputs a driving force to be applied to the own vehicle 200 to move the own vehicle 200. The driving apparatus 221 may include an internal combustion engine and/or at least one electric motor. The driving apparatus 221 is electrically connected to the vehicle ECU 290. The vehicle ECU 290 can control the driving force output from the driving apparatus 221 by controlling operations of the driving apparatus 221.

<Braking Apparatus>

The braking apparatus 222 outputs a braking force to be applied to the own vehicle 200 to brake the own vehicle 200. The braking apparatus 222 may include a fluid brake apparatus. The braking apparatus 222 is electrically connected to the vehicle ECU 290. The vehicle ECU 290 can control the braking force output from the braking apparatus 222 by controlling operations of the braking apparatus 222.

<Steering Apparatus>

The steering apparatus 223 outputs a steering force to be applied to the own vehicle 200 to steer the own vehicle 200. The steering apparatus 223 may include a power steering apparatus. The steering apparatus 223 is electrically connected to the vehicle ECU 290. The vehicle ECU 290 can control the steering force output from the steering apparatus 223 by controlling operations of the steering apparatus 223.

<Transmission Apparatus>

The transmission apparatus 224 can take any one of (i) a state to transmit the driving force output from the driving apparatus 221 to driven wheels of the own vehicle 200 and (ii) a state to shut off transmitting the driving force output from the driving apparatus 221 to the driven wheels of the own vehicle 200. In addition, the transmission apparatus 224 can take any one of (i) a state to transmit the driving force to the driven wheels so as to move the own vehicle 200 forward and (ii) a state to transmit the driving force to the driven wheels so as to move the own vehicle 200 rearward. In addition, the transmission apparatus 224 has a function of holding the own vehicle 200 stopped by engaging a pawl part or a parking lock pawl with a gear of the transmission apparatus 224 to lock the gear. Thus, the transmission apparatus 224 functions as a vehicle stop holding apparatus of holding the own vehicle 200 stopped.

The transmission apparatus 224 operates in any one of shift states, i.e., (i) a forward moving driving state SD, (ii) a rearward moving driving state SR, (iii) a neutral state SN, and (iv) a parking state SP. The forward moving driving state SD is a state to transmit the driving force to driven wheels of the own vehicle 200 so as to move the own vehicle 200 forward. The rearward moving driving state SR is a state to transmit the driving force to the driven wheels of the own vehicle 200 so as to move the own vehicle 200 rearward. The neutral state SN is a state to shut off transmitting the driving force to the driven wheels of the own vehicle 200. The parking state SP is a state to hold the own vehicle 200 stopped.

The transmission apparatus 224 is electrically connected to the vehicle ECU 290. The vehicle ECU 290 can set the shift state of the transmission apparatus 224 to any one of the forward moving driving state SD, the rearward moving driving state SR, the neutral state SN, and the parking state SP by controlling operations of the transmission apparatus 224.

<Vehicle Stop Holding Apparatus>

Furthermore, a vehicle stop holding apparatus 230 is installed on the own vehicle 200. The vehicle stop holding apparatus 230 has a function to hold the own vehicle 200 stopped. In this embodiment, the vehicle stop holding apparatus 230 includes a parking brake apparatus 231. The parking brake apparatus 231 may be an electric parking brake apparatus or a manual parking brake apparatus. The parking brake apparatus 231 has a function to hold the own vehicle 200 stopped by applying the braking force to wheels of the own vehicle 200. In particular, the parking brake apparatus 231 has a function to hold the own vehicle 200 stopped by pressing brake pads to brake discs provided on the wheels of the own vehicle 200 to apply the braking force to the wheels of the own vehicle 200. In this embodiment, the parking brake apparatus 231 is the electric parking brake. Thus, the parking brake apparatus 231 is electrically connected to the vehicle ECU 290. The vehicle ECU 290 can hold the own vehicle 200 stopped by activating the parking brake apparatus 231.

<Sensors, Etc.>

Furthermore, an accelerator pedal 241, an accelerator pedal operation amount sensor 242, a brake pedal 243, a brake pedal operation amount sensor 244, a steering wheel 245, a steering shaft 246, a steering angle sensor 247, a steering torque sensor 248, a remote parking-and-pulling-out request operation device 249, a vehicle moving speed detecting device 250, a shift lever 251, a shift sensor 252, a surrounding information detecting apparatus 260, and a vehicle signal receiving-and-transmitting device 280 are installed on the own vehicle 200.

<Accelerator Pedal Operation Amount Sensor>

The accelerator pedal operation amount sensor 242 detects an operation amount of the accelerator pedal 241. The accelerator pedal operation amount sensor 242 is electrically connected to the vehicle ECU 290. The accelerator pedal operation amount sensor 242 sends information on the detected operation amount of the accelerator pedal 241 to the vehicle ECU 290. The vehicle ECU 290 acquires the operation amount of the accelerator pedal 241 as an accelerator pedal operation amount AP, based on the information sent from the accelerator pedal operation amount sensor 242.

When the vehicle ECU 290 does not execute the remote parking-and-pulling-out control described later in detail, the vehicle ECU 290 calculates and acquires a required driving force or a required driving torque, based on the accelerator pedal operation amount AP and an own vehicle moving speed (i.e., a moving speed of the own vehicle 200). The vehicle ECU 290 controls the operations of the driving apparatus 221 so as to output the driving force corresponding to the required driving force. When the vehicle ECU 290 executes the remote parking-and-pulling-out control described later in detail, the vehicle ECU 290 determines a value of the driving force necessary to move the own vehicle 200 as desired by the remote parking-and-pulling-out control and controls the operations of the driving apparatus 221 so as to output the driving force corresponding to the determined value of the driving force.

<Brake Pedal Operation Amount Sensor>

The brake pedal operation amount sensor 244 detects an operation amount of the brake pedal 243. The brake pedal operation amount sensor 244 is electrically connected to the vehicle ECU 290. The brake pedal operation amount sensor 244 sends information on the detected operation amount of the brake pedal 243 to the vehicle ECU 290. The vehicle ECU 290 acquires the operation amount of the brake pedal 243 as a brake pedal operation amount BP, based on the information sent from the brake pedal operation amount sensor 244.

When the vehicle ECU 290 does not execute the remote parking-and-pulling-out control described later in detail, the vehicle ECU 290 calculates and acquires a required braking force or a required braking torque, based on the brake pedal operation amount BP. The vehicle ECU 290 controls the operations of the braking apparatus 222 so as to output the braking force corresponding to the required braking force. When the vehicle ECU 290 executes the remote parking-and-pulling-out control described later in detail, the vehicle ECU 290 determines a value of the braking force necessary to brake the own vehicle 200 as desired by the remote parking-and-pulling-out control and controls the operations of the braking apparatus 222 so as to output the braking force corresponding to the determined value of the braking force.

<Steering Angle Sensor>

The steering angle sensor 247 detects a rotation angle of the steering shaft 246 with respect to a neutral position thereof. The steering angle sensor 247 is electrically connected to the vehicle ECU 290. The steering angle sensor 247 sends information on the detected rotation angle of the steering shaft 246 to the vehicle ECU 290. The vehicle ECU 290 acquires the rotation angle of the steering shaft 246 as a steering angle θ, based on the information sent from the steering angle sensor 247.

<Steering Torque Sensor>

The steering torque sensor 248 detects a torque which the driver DR of the own vehicle 200 inputs to the steering shaft 246 via the steering wheel 245. The steering torque sensor 248 is electrically connected to the vehicle ECU 290. The steering torque sensor 248 sends information on the detected torque to the vehicle ECU 290. The vehicle ECU 290 acquires the torque which the driver DR inputs to the steering shaft 246 via the steering wheel 245 as a driver input torque, based on the information sent from the steering torque sensor 248.

When the vehicle ECU 290 does not execute the remote parking-and-pulling-out control described later in detail, the vehicle ECU 290 acquires a required steering force or a required steering torque, based on the steering angle θ, the driver input torque, and the own vehicle moving speed (i.e., the moving speed of the own vehicle 200). Then, the vehicle ECU 290 controls the operations of the steering apparatus 223 so as to output the steering torque corresponding to the required steering torque. When the vehicle ECU 290 executes the remote parking-and-pulling-out control described later in detail, the vehicle ECU 290 determines a value of the steering force necessary to brake the own vehicle 200 as desired by the remote parking-and-pulling-out control and controls the operations of the steering apparatus 223 so as to output the steering force corresponding to the determined value of the steering force.

<Remote Parking-And-Pulling-Out Request Operation Device>

The remote parking-and-pulling-out request operation device 249 is a device which is operated by the driver DR to request the vehicle ECU 290 to execute the remote parking-and-pulling-out control described later in detail. The remote parking-and-pulling-out request operation device 249 may be a switch. The remote parking-and-pulling-out request operation device 249 is electrically connected to the vehicle ECU 290. When the remote parking-and-pulling-out request operation device 249 is operated by the driver DR, the remote parking-and-pulling-out request operation device 249 sends a predetermined signal to the vehicle ECU 290. The vehicle ECU 290 determines that the remote parking-and-pulling-out control is requested to be executed in response to receiving the predetermined signal from the remote parking-and-pulling-out request operation device 249.

<Vehicle Moving Speed Detecting Device>

The vehicle moving speed detecting device 250 detects the moving speed of the own vehicle 200. The vehicle moving speed detecting device 250 may include vehicle wheel rotation speed sensors. The vehicle moving speed detecting device 250 is electrically connected to the vehicle ECU 290. The vehicle moving speed detecting device 250 sends information on the detected moving speed of the own vehicle 200 to the vehicle ECU 290. The vehicle ECU 290 acquires the moving speed of the own vehicle 200 as the own vehicle moving speed V, based on the information sent from the vehicle moving speed detecting device 250.

<Shift Sensor>

The shift sensor 252 detects a set position of the shift lever 251. The shift lever 251 is a device which is operated by the driver DR of the own vehicle 200. The set states of the shift lever 251 which the driver DR can set are (i) a forward moving position (or a drive range D), (ii) a rearward moving position (or a rear range R), (iii) a neutral position (or a neutral range N), and (iv) a parking position (or a parking range P). The shift sensor 252 is electrically connected to the vehicle ECU 290. The shift sensor 252 sends a signal representing the detected set position of the shift lever 251 to the vehicle ECU 290.

When the shift lever 251 is set in the drive range D, the shift sensor 252 sends a signal representing that the set position of the shift lever 251 is the drive range D to the vehicle ECU 290. The vehicle ECU 290 controls the shift state of the transmission apparatus 224 to the forward moving driving state SD in response to receiving the signal in question sent from the shift sensor 252.

When the shift sensor 252 is set in the rear range R, the shift sensor 252 sends a signal representing that the set position of the shift lever 251 is the rear range R to the vehicle ECU 290. The vehicle ECU 290 controls the shift state of the transmission apparatus 224 to the rearward moving driving state SR in response to receiving the signal in question sent from the shift sensor 252.

When the shift sensor 252 is set in the neutral range N, the shift sensor 252 sends a signal representing that the set position of the shift lever 251 is the neutral range N to the vehicle ECU 290. The vehicle ECU 290 controls the shift state of the transmission apparatus 224 to the neutral state SN in response to receiving the signal in question sent from the shift sensor 252.

When the shift sensor 252 is set in the parking range P, the shift sensor 252 sends a signal representing that the set position of the shift lever 251 is the parking range P to the vehicle ECU 290. The vehicle ECU 290 controls the shift state of the transmission apparatus 224 to the parking state SP in response to receiving the signal in question sent from the shift sensor 252.

It should be noted that when the vehicle ECU 290 executes the remote parking-and-pulling-out control described later in detail, the vehicle ECU 290 controls the shift state of the transmission apparatus 224 or performs the shift change of the transmission apparatus 224, depending on a necessity to move the own vehicle 200 as desired by the remote parking-and-pulling-out control.

<Surrounding Information Detecting Apparatus>

The surrounding information detecting apparatus 260 detects information on a situation around the own vehicle 200. In this embodiment, the surrounding information detecting apparatus 260 includes radio wave sensors 261 and image sensors 262.

<Radio Wave Sensors>

The radio wave sensor 261 detects information on objects around the own vehicle 200 by using radio waves. The radio wave sensor 261 may be a radar sensor such as a millimeter wave radar, a sound wave sensor such as an ultrasonic sound wave sensor such as a clearance sonar, or an optical sensor such as LiDAR. The radio wave sensor 261 is electrically connected to the vehicle ECU 290. The radio wave sensor 261 transmits radio waves and receives reflected waves (i.e., the radio waves reflected by objects). The radio wave sensor 261 sends information on the transmitted radio waves and the received radio waves or reflected waves to the vehicle ECU 290. In other words, the radio wave sensor 261 detects the objects around the own vehicle 200 and send information on the detected objects to the vehicle ECU 290. The vehicle ECU 290 acquires surrounding detection information IS (i.e., information on the objects around the own vehicle 200), based on the information (or radio wave information IR or radio wave data) sent from the radio wave sensor 261. The objects detected by the radio wave sensor 261 may be vehicles, walls, bicycles, and persons.

<Image Sensors>

The image sensor 262 takes images of a view around the own vehicle 200. The image sensor 262 may be a camera. The image sensor 262 is electrically connected to the vehicle ECU 290. The image sensor 262 takes the images of the view around the own vehicle 200 and sends information on the taken images to the vehicle ECU 290.

<Vehicle Signal Receiving-And-Transmitting Device>

The vehicle signal receiving-and-transmitting device 280 has a function of receiving signals wirelessly from the outside of the own vehicle 200 and wirelessly transmitting signals to the outside of the own vehicle 200. The vehicle signal receiving-and-transmitting device 280 is electrically connected to the vehicle ECU 290. The vehicle ECU 290 can transmit various signals to the outside of the own vehicle 200 via the vehicle signal receiving-and-transmitting device 280. In addition, the vehicle ECU 290 can receive various wireless signals via the vehicle signal receiving-and-transmitting device 280. In this embodiment, the wireless signals are signals which the terminal ECU 190 wirelessly transmits out of the operation terminal 100 via the terminal signal receiving-and-transmitting device 180.

<Summary of Operations of Remote Moving System>

Next, a summary of operations of the remote moving system 10 will be described.

When the own vehicle 200 is stopped, and the remote parking-and-pulling-out control is requested to be executed, the vehicle control unit 210 becomes a state to receive the wireless signal from the outside thereof and determine whether the received wireless signal is a wireless signal transmitted from a registered operation terminal. The registered operation terminal is an operation terminal which is registered as an operation terminal used for causing the vehicle control unit 210 to execute the remote parking-and-pulling-out control.

Figure 7:
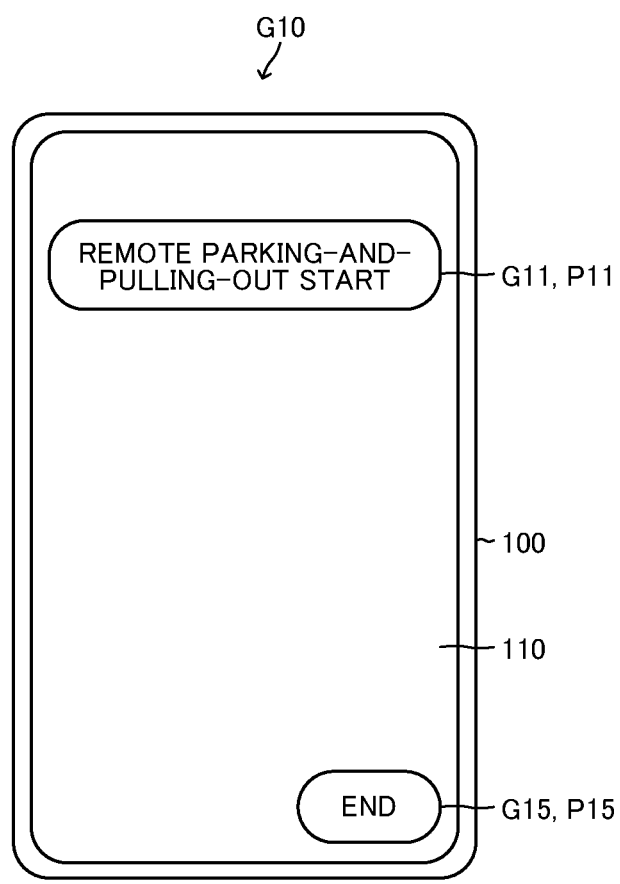
FIG. 7 is a view which shows the operation terminal which displays an initial screen image on a terminal display.

When the driver DR gets out of the own vehicle 200 and applies an application start operation to the terminal display 120 of the operation terminal 100, the terminal control unit 110 starts the remote moving application software in response to the application start operation and as shown in FIG. 7, displays an initial screen image G10 on the terminal display 120.

The application start operation is a touch operation applied to the terminal display 120 for starting the remote moving application software. In this embodiment, the touch operation applied to the terminal display 120 is an operation or a contact operation that a person touches the terminal display 120 with their finger. The initial screen image G10 includes a remote parking-and-pulling-out start image G11 and an application end image G15. The remote parking-and-pulling-out start image G11 is an image which displays characters "REMOTE PARKING-AND-PULLING-OUT START." The application end image G15 is an image which displays characters "END." A remote parking-and-pulling-out start image portion P11 and an application termination image portion P15 are portions which accept the touch operation applied by a terminal user UR (i.e., a user of the operation terminal 100). The remote parking-and-pulling-out start image portion P11 is a portion of the terminal display 120 which displays the remote parking-and-pulling-out start image G11. The application termination image portion P15 is a portion of the terminal display 120 which displays the application end image G15.

When the terminal control unit 110 starts the remote moving application software, the terminal control unit 110 wirelessly transmits an application start signal S10. The application start signal S10 is a signal which represents information on an ID for determining whether the operation terminal 100 is the registered operation terminal, i.e., for identifying the operation terminal 100.

When the vehicle control unit 210 receives the application start signal S10, the vehicle control unit 210 determines whether the operation terminal 100 represented by the application start signal S10 is the registered operation terminal. The registered operation terminal is the operation terminal which is registered as the operation terminal used for causing the vehicle control unit 210 to execute the remote parking-and-pulling-out control. The operation terminal 100 is the registered operation terminal. Thus, the vehicle control unit 210 determines that the operation terminal 100 is the registered operation terminal when the vehicle control unit 210 receives the application start signal S10. In this case, the vehicle control unit 210 executes the remote parking-and-pulling-out control, based on various signals wirelessly transmitted from the operation terminal 100.

When the vehicle control unit 210 determines that the operation terminal 100 is the registered operation terminal, the vehicle control unit 210 activates vehicle moving equipment such as the surrounding information detecting apparatus 260 and the vehicle moving apparatus 220 or renders itself ready to activate the vehicle moving equipment.

It should be noted that the vehicle control unit 210 may be configured to (i) determine types of assistance to be able to provide, based on the surrounding detection information IS when the vehicle control unit 210 determines that the operation terminal 100 is the registered operation terminal and (ii) wirelessly transmit a result of determining. For example, as described later in detail, the vehicle control unit 210 is configured to execute the remote parking control and the remote pulling-out control. In this regard, the vehicle control unit 210 may be configured to wirelessly transmit a signal representing that only the remote parking control can be executed when the remote pulling-out control cannot be executed and thus, only the remote parking control can be executed. When the terminal control unit 110 receives the signal in question, the terminal control unit 110 adjusts the image displayed on the terminal display 120 such that only the remote parking control can be selected.

Further, the remote moving system 10 described below is a system on which only a control to move the own vehicle 200 rearward and double-park the own vehicle 200 in a designated parking space 31D can be selected as a control to park the own vehicle 200 in the designated parking space 31D. In this regard, the remote moving system 10 may be a system on which one of (i) a control to move the own vehicle 200 forward and double-park the own vehicle 200 in the designated parking space 31D, (ii) a control to move the own vehicle 200 forward and parallel-park the own vehicle 200 in the designated parking space 31D, and (iii) a control to move the own vehicle 200 rearward and parallel-park the own vehicle 200 in the designated parking space 31D, can be selected as the control to park the own vehicle 200 in the designated parking space 31D in addition to the control to move the own vehicle 200 rearward and double-park the own vehicle 200 in the designated parking space 31D.

Figure 8:
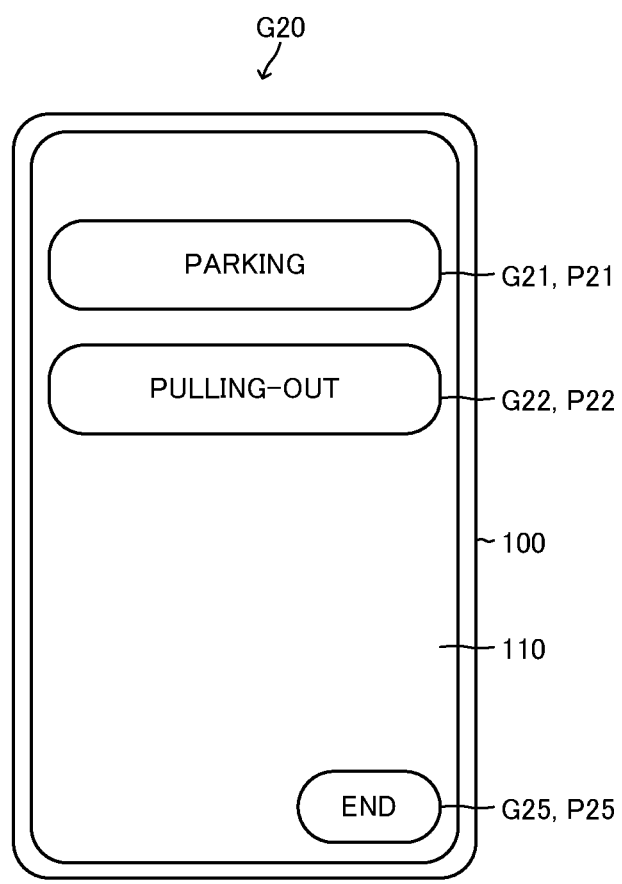
FIG. 8 is a view which shows the operation terminal which displays a parking-and-pulling-out selection image on the terminal display.

When the touch operation is applied to the remote parking-and-pulling-out start image portion P11, the terminal control unit 110 displays a parking-and-pulling-out selection image G20 on the terminal display 120 as shown in FIG. 8. In this embodiment, the effective touch operation applied to the remote parking-and-pulling-out start image portion P11 is a swipe operation. The swipe operation is one of the touch operations which correspond to a slide touch operation, i.e., the touch operation of sliding the finger on the terminal display 120 in one direction.

The parking-and-pulling-out selection image G20 includes a parking selection image G21, a pulling-out selection image G22, and an application end image G25. The parking selection image G21 is an image which displays characters "PARKING". The pulling-out selection image G22 is an image which displays characters "PULLING-OUT". The application end image G25 is an image which displays characters "END". A parking selection image portion P21, a pulling-out selection image portion P22, and an application end image portion P25 are portions which accept the touch operation applied by the terminal user UR. The parking selection image portion P21 is a portion of the terminal display 120 which displays the parking selection image G21. The pulling-out selection image portion P22 is a portion of the terminal display 120 which displays the pulling-out selection image G22. The application end image portion P25 is a portion of the terminal display 120 which displays the application end image G25.

<Remote Parking Control>

When the touch operation is applied to the parking selection image portion P21, the terminal control unit 110 wirelessly transmits a parking selection signal S11. The parking selection signal S11 is a signal which represents that the touch operation is applied to the parking selection image portion P21. In this embodiment, the effective touch operation applied to the parking selection image portion P21 is a tap operation. The tap operation is one of the touch operations which correspond to an operation that the finger shortly contacts the terminal display 120.

Figure 6:
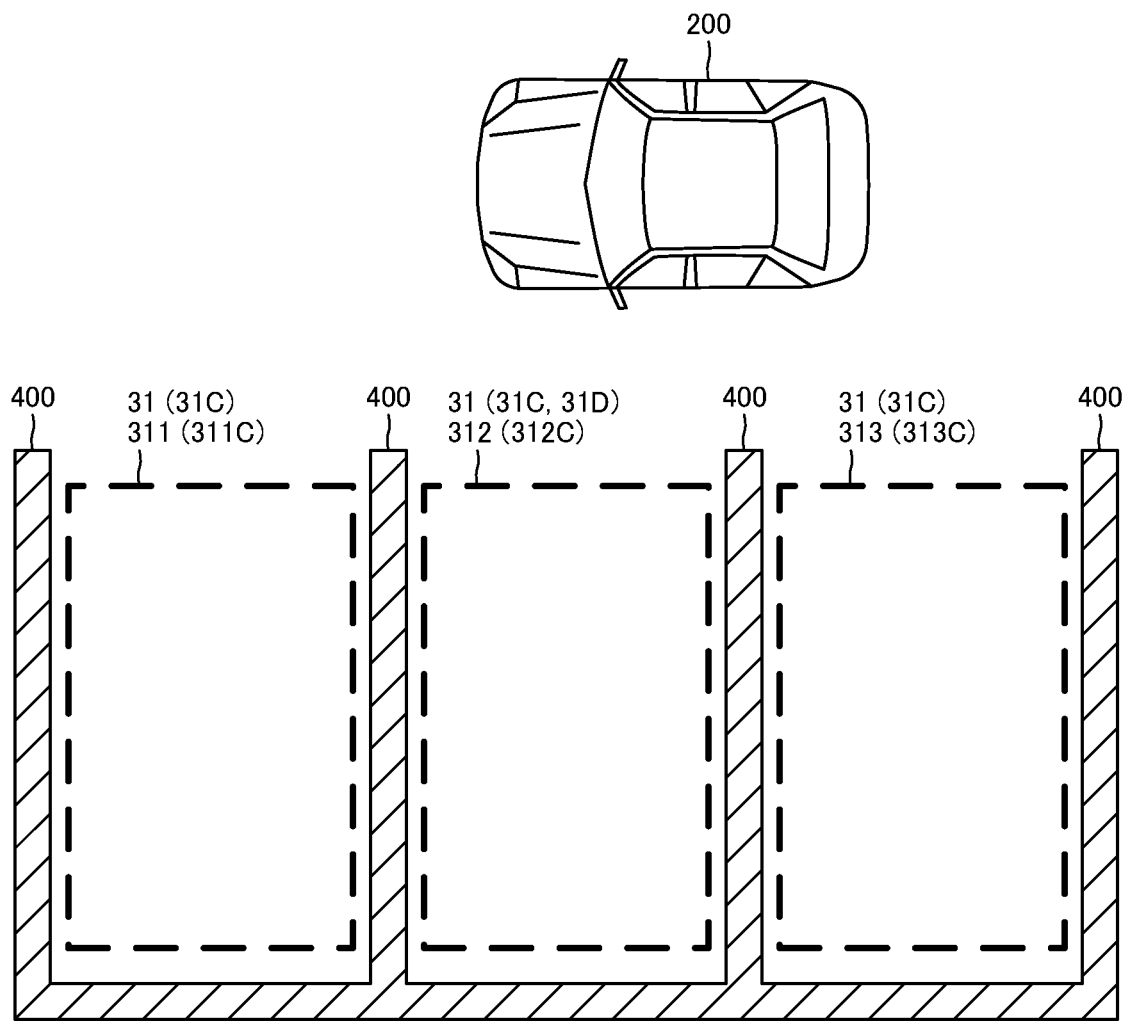
FIG. 6 is a view which shows a scene that the own vehicle stops near a parking space.

When the vehicle control unit 210 receives the parking selection signal S11, the vehicle control unit 210 detects an available parking space 31C, i.e., a space in which the own vehicle 200 can be parked, based on the surrounding detection information IS. For example, as shown in FIG. 6, when the own vehicle 200 is stopped near three parking spaces 311 to 313 in which no vehicles are parked, the vehicle control unit 210 detects the parking spaces 311 to 313 as available parking spaces 311C to 313C. An example shown in FIG. 6 is an example that there are the parking spaces 311 to 313 at the left side of the own vehicle 200. In this regard, when there are one or more parking spaces at the right side of the own vehicle 200, the vehicle control unit 210 detects the one or more parking spaces as the available parking spaces. It should be noted that symbols 400 in the drawings denote lines which defines the parking spaces 31.

When the vehicle control unit 210 detects the available parking space 31C, the vehicle control unit 210 acquires a position of the own vehicle 200 with respect to the detected available parking space 31C and etc.

When the vehicle control unit 210 detects the available parking space 31C and acquires the position of the own vehicle 200 with respect to the detected available parking space 31C and etc., the vehicle control unit 210 wirelessly transmits a designated parking space signal S12 and a vehicle position signal S13. The designated parking space signal S12 is one of signals which represent information on a moving state of the own vehicle 200. In particular, the designated parking space signal S12 is a signal which represents information on the available parking space 31C. The vehicle position signal S13 is one of the signals which represent information on the moving state of the own vehicle 200. In particular, the vehicle position signal S13 is a signal which represents information on the position of the own vehicle 200 with respect to the available parking space 31C and etc.

Figure 9:
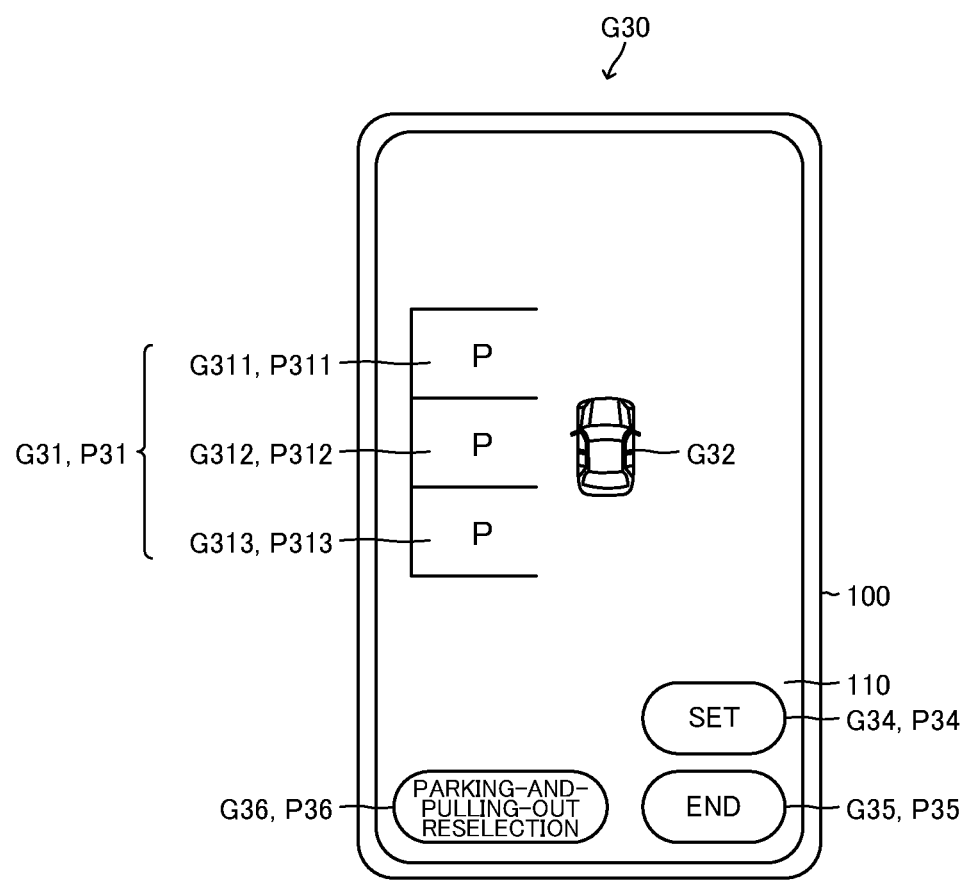
FIG. 9 is a view which shows the operation terminal which displays a parking space selection image on the terminal display.

When the terminal control unit 110 receives the designated parking space signal S12 and the vehicle position signal S13, the terminal control unit 110 causes the terminal display 120 to display a parking space selection image G30 as shown in FIG. 9. The parking space selection image G30 includes an available parking space image G31, a vehicle image G32, a selection set image G34, an application end image G35, and a parking-and-pulling-out reselection image G36.

The available parking space image G31 is an image which displays the available parking space 31C. FIG. 9 shows an example which corresponds to the example shown in FIG. 6. Thus, the available parking space image G31 shown in FIG. 9 includes available parking space images G311 to G313 which display the available parking spaces 311C to 313C. The vehicle image G32 is an image which displays the own vehicle 200. The selection set image G34 is an image which displays characters "SET". The application end image G35 is an image which displays characters "END". The parking-and-pulling-out reselection image G36 is an image which displays characters "PARKING-AND-PULLING-OUT RESELECTION".

Further, an available parking space image portion P31, a selection set image portion P34, an application end image portion P35, and a parking-and-pulling-out reselection image portion P36 are portions which accept the touch operation applied by the terminal user UR. The available parking space image portion P31 is a portion of the terminal display 120 which displays the available parking space image G31. FIG. 9 shows the example which corresponds to the example shown in FIG. 6. Thus, the available parking space image portion P31 shown in FIG. 9 includes available parking space image portions P311 to P313, i.e., three portions of the terminal display 120 which display the available parking space images G311 to G313, respectively. The selection set image portion P34 is a portion of the terminal display 120 which displays the selection set image G34. The application end image portion P35 is a portion of the terminal display 120 which displays the application end image G35. The parking-and-pulling-out selection image portion P36 is a portion of the terminal display 120 which displays the parking-and-pulling-out reselection image G36.

When the touch operation is applied to the available parking space image portion P31, and then the touch operation is applied to the selection set image portion P34, the terminal control unit 110 wirelessly transmits a designated parking space signal S14 or a moving type set signal. In the example shown in FIG. 9, when the touch operation is applied to any one of the available parking space image portions P311 to P313, and then the touch operation is applied to the selection set image portion P34, the terminal control unit 110 wirelessly transmits the designated parking space signal S14. The designated parking space signal S14 is a signal which represents the available parking space 31C designated as a space in which the own vehicle 200 is parked by the terminal user UR applying the touch operation to the available parking space image portion P31. In addition, the designated parking space signal S14 is also a moving type set signal which sets a type of moving of the own vehicle 200 by a vehicle moving process described later in detail.

It should be noted that in this embodiment, the effective touch operation applied to the available parking space image portion P31 is a long press operation. The long press operation may be called a long tap operation. The long press operation is one of the touch operations that the finger continues to touch the terminal display 120 for a relatively long time.

The parking space selection image G30 may include a parking direction selection image used to select a parking type of the own vehicle 200 from (i) a parking of the own vehicle 200 in the designated parking space 31D by moving the own vehicle 200 forward and (ii) a parking of the own vehicle 200 in the designated parking space 31D by moving the own vehicle 200 rearward. In this case, when the touch operations are applied to the available parking space image portion P31 and the parking direction selection image and then, the touch operation is applied to the selection set image portion P34, the terminal control unit 110 wirelessly transmits the designated parking space signal S14.

When the vehicle control unit 210 receives the designated parking space signal S14, the vehicle control unit 210 sets the available parking space 31C designated by the terminal user UR as a designated parking space 31D. In the example shown in FIG. 6, when the vehicle control unit 210 receives the designated parking space signal S14, the vehicle control unit 210 sets the available parking space 31C designated by the terminal user UR, i.e., the available parking space 312C of the available parking space 311C to 313C as the designated parking space 31D.

Figure 10:
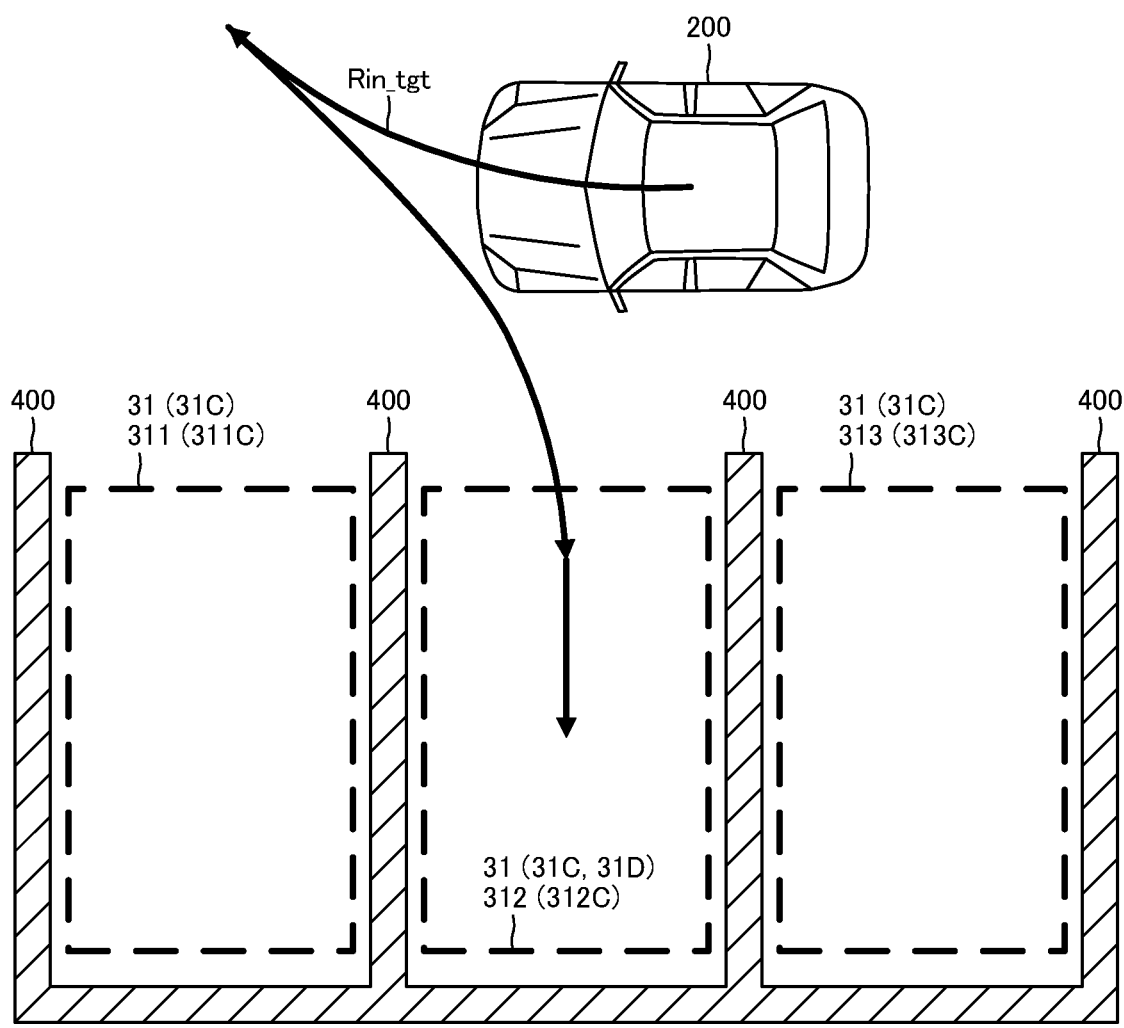
FIG. 10 is a view which shows a target parking route.

When the vehicle control unit 210 sets the designated parking space 31D, the vehicle control unit 210 starts the remote parking control. When the vehicle control unit 210 starts the remote parking control, the vehicle control unit 210 sets a target parking route Rin_tgt as shown in FIG. 10. The target parking route Rin_tgt is a route along which the vehicle control unit 210 moves the own vehicle 200 to park the own vehicle 200 in the designated parking space 31D. It should be noted that FIG. 10 shows an example in which the available parking space 312C in the example shown in FIG. 6 is set as the designated parking space 31D.

When the vehicle control unit 210 sets the target parking route Rin_tgt, the vehicle control unit 210 wirelessly transmits a parking remaining distance signal S15. The parking remaining distance signal S15 is one of the signals which represent information on the moving state of the own vehicle 200. In particular, the parking remaining distance signal S15 is a signal which represents a parking remaining distance Din, i.e., a distance between the own vehicle 200 and a target parking point Pin_tgt. The target parking point Pin_tgt is a point in the designated parking space 31D which the remote parking control causes the own vehicle 200 to reach. The vehicle control unit 210 acquires the parking remaining distance Din, based on the surrounding detection information IS.

Figure 11:
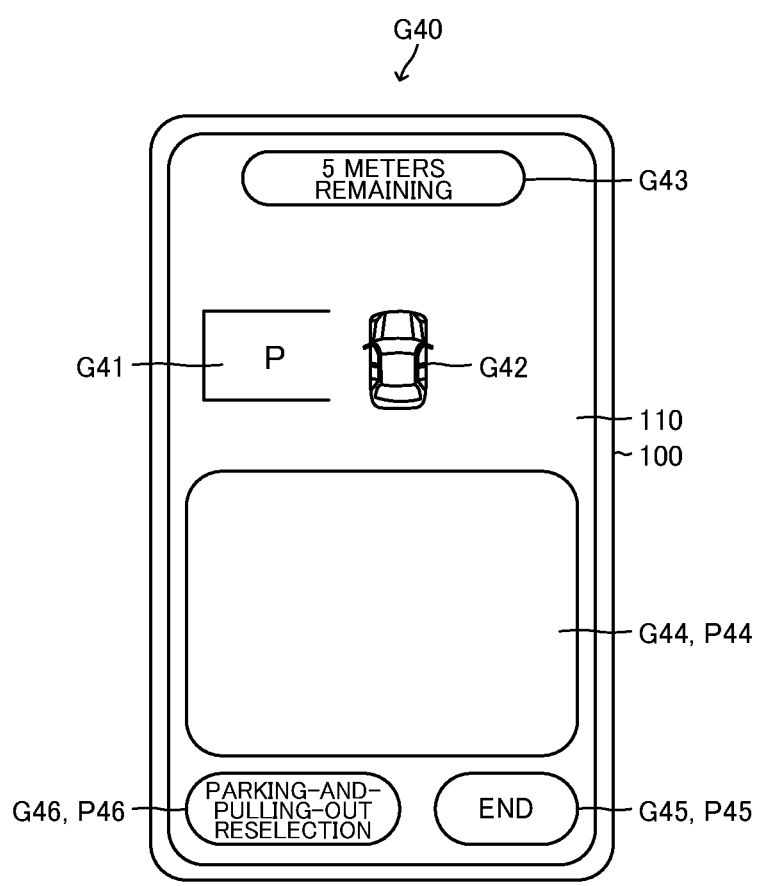
FIG. 11 is a view which shows the operation terminal which displays a parking operation image on the terminal display.

On the other hand, when the touch operation is applied to the available parking space image portion P31, the terminal control unit 110 causes the terminal display 120 to display a parking operation image G40 as shown in FIG. 11. FIG. 11 shows an example which corresponds to the example shown in FIG. 10. In FIG. 11, the designated parking space 31D is the available parking space 31C or 312C at the left side of the own vehicle 200.

The parking operation image G40 includes a designated parking space image G41, a vehicle image G42, a parking remaining distance image G43, a parking moving operation image G44, an application end image G45, and a parking-and-pulling-out reselection image G46. The designated parking space image G41 is an image which displays the designated parking space 31D. The vehicle image G42 is an image which displays the own vehicle 200. The parking remaining distance image G43 is an image which displays the parking remaining distance Din. The parking moving operation image G44 is an image which defines an area having a predetermined area. The application end image G45 is an image which displays characters "END". The parking-and-pulling-out reselection image G46 is an image which displays characters "PARKING-AND-PULLING-OUT RESELECTION". A parking moving operation image portion P44, an application end image portion P45, and a parking-and-pulling-out reselection image portion P46 are portions which accept the touch operation applied by the terminal user UR. The parking moving operation image portion P44 is a portion of the terminal display 120 which displays the parking moving operation image G44. The application end image portion P45 is a portion of the terminal display 120 which displays the application end image G45. The parking-and-pulling-out reselection image portion P46 is a portion of the terminal display 120 which displays the parking-and-pulling-out reselection image G46.

When the terminal control unit 110 receives the parking remaining distance signal S15, the terminal control unit 110 causes the terminal display 120 to display the parking remaining distance image G43 which displays the parking remaining distance Din represented by the parking remaining distance signal S15.

Figure 12:
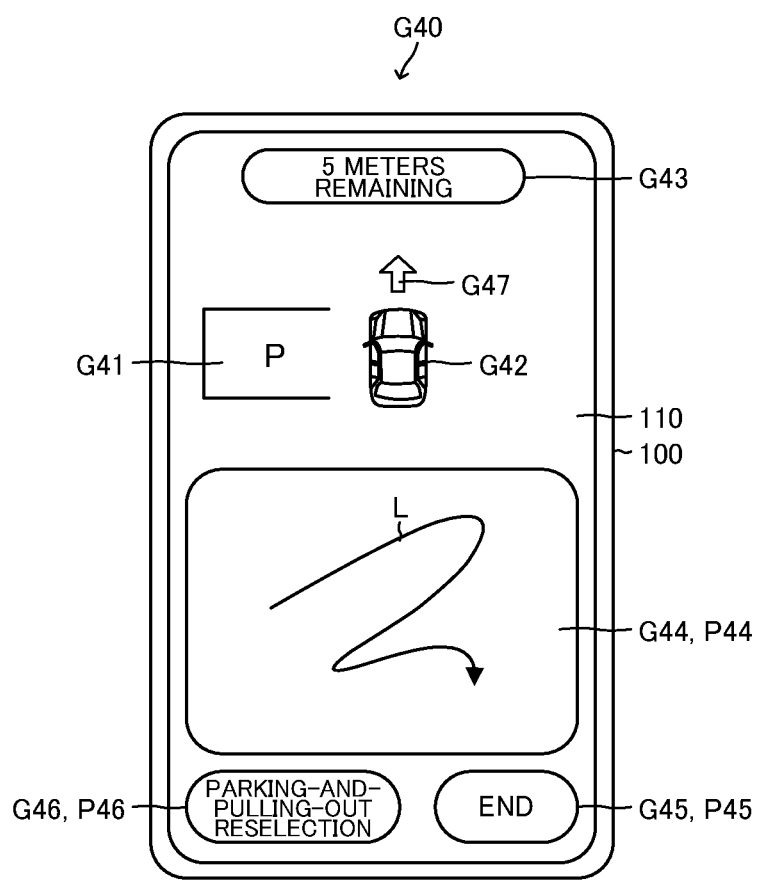
FIG. 12 is a view which shows the operation terminal which displays the parking operation image on the terminal display.

While a predetermined operation continues to be applied to the parking moving operation image portion P44, the terminal control unit 110 wirelessly transmits a continuous touch operation signal S16 or a predetermined operation signal. The continuous touch operation signal S16 is a signal which represents that the predetermined operation is applied to the parking moving operation image portion P44. In this embodiment, the predetermined operation applied to the parking moving operation image portion P44 is the touch operation. In particular, the effective touch operation applied to the parking moving operation image portion P44 is a continuous touch operation. The continuous touch operation is one of the slide operations. In particular, the continuous touch operation is the slide operation of sliding the finger of the terminal user UR on the parking moving operation image portion P44 as shown by a line L in FIG. 12. Thus, when the continuous touch operation is not carried out, i.e., the finger of the terminal user UR touches the parking moving operation image portion P44, but stops on the parking moving operation image portion P44, the terminal control unit 110 does not transmit the continuous touch operation signal S16.

It should be noted that the terminal control unit 110 may be configured to wirelessly transmit a signal which represents a position in the parking moving operation image portion P44 to which the touch operation is applied in place of the continuous touch operation signal S16. In this case, the vehicle control unit 210 receives the signal in question and determines whether the continuous touch operation is applied to the parking moving operation image portion P44.

Figure 13:
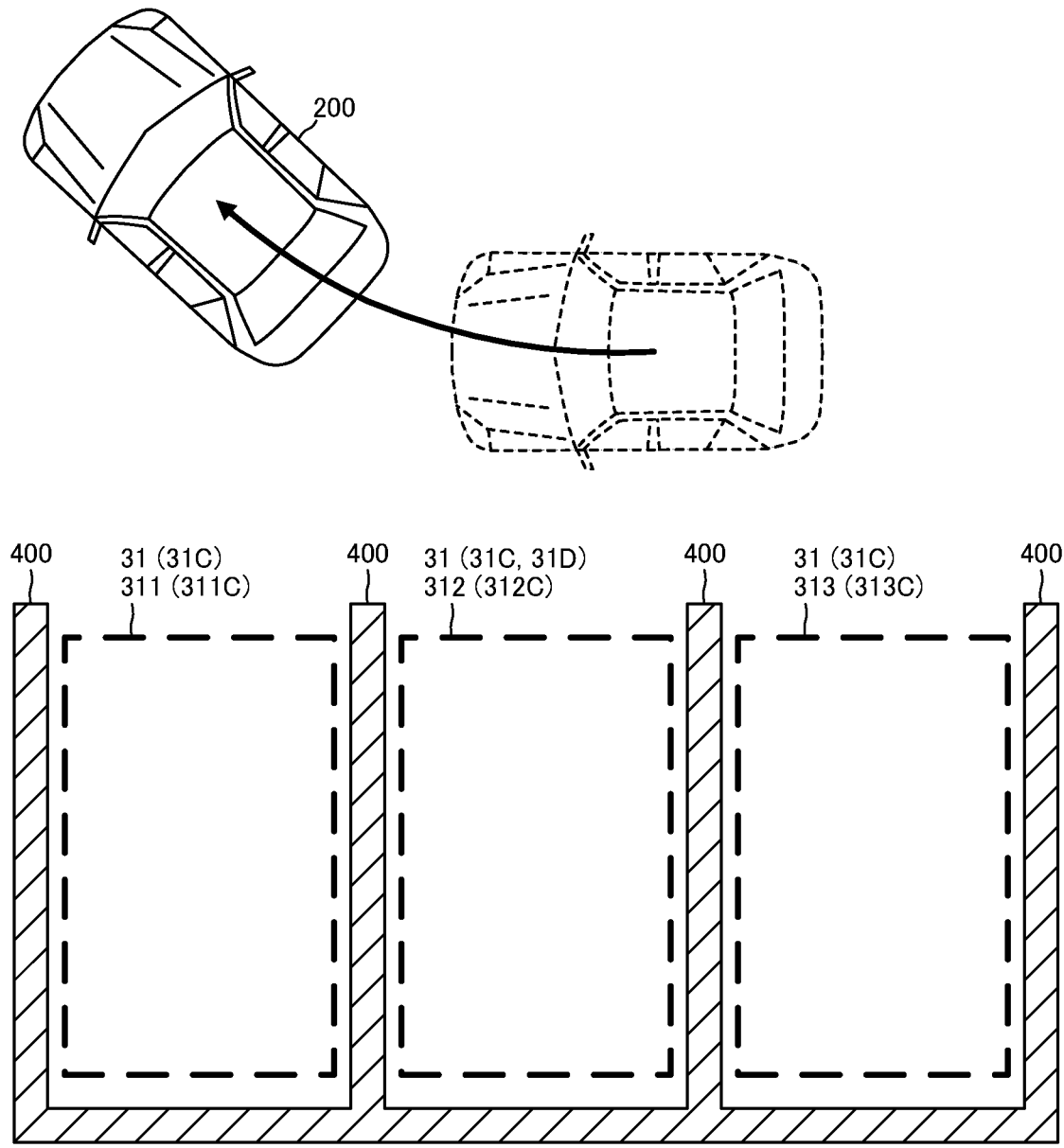
FIG. 13 is a view which shows a scene that the own vehicle is moved forward and rightward by a remote parking control.

When the vehicle control unit 210 receives the continuous touch operation signal S16, the vehicle control unit 210 controls the operations of the transmission apparatus 224 to set the transmission apparatus 224 in the forward moving driving state SD. In addition, as shown in FIG. 13, the vehicle control unit 210 executes a vehicle moving process to control the operations of the vehicle moving apparatus 220 to move the own vehicle 200 forward and rightward along the target parking route Rin_tgt and stop the own vehicle 200 when the own vehicle 200 moves a predetermined distance.

While the vehicle control unit 210 receives the continuous touch operation signal S16, the vehicle control unit 210 executes the vehicle moving process to move the own vehicle 200 along the target parking route Rin_tgt.

Further, the vehicle control unit 210 continues wirelessly transmitting the vehicle position signal S13, the parking remaining distance signal S15, and a moving direction signal S17 until the vehicle control unit 210 completes parking the own vehicle 200 in the designated parking space 31D after the vehicle control unit 210 starts to receive the continuous touch operation signal S16. The moving direction signal S17 is one of the signals which represent the information on the moving state of the own vehicle 200. In particular, the moving direction signal S17 is a signal which represents a moving direction of the own vehicle 200.

Figure 14:
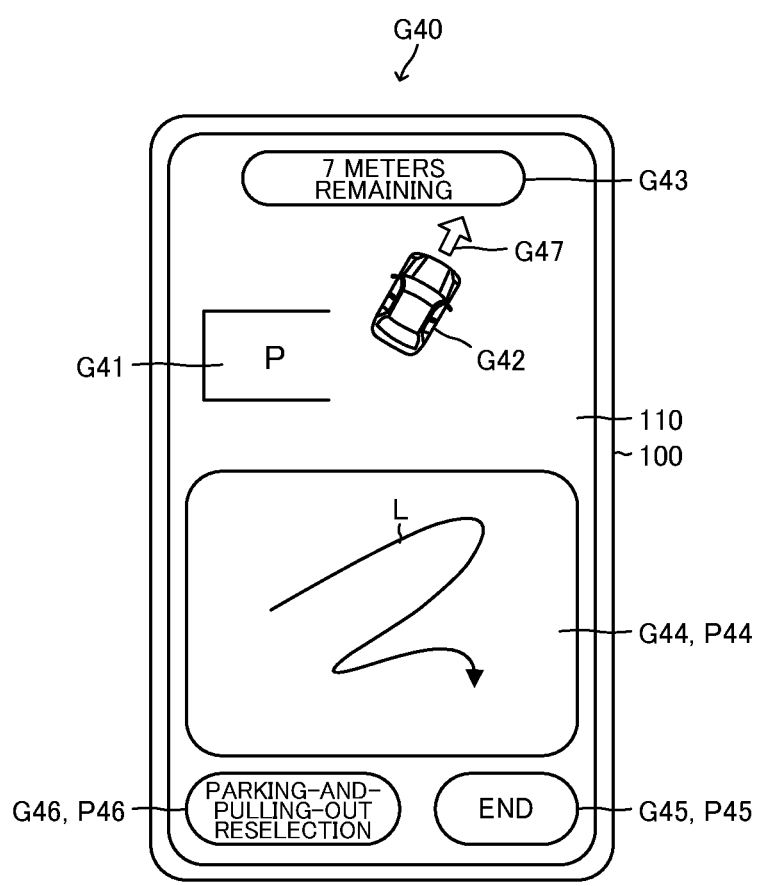
FIG. 14 is a view which shows the operation terminal which displays the parking operation image on the terminal display.

When the terminal control unit 110 receives the vehicle position signal S13, the terminal control unit 110 causes the terminal display 120 to display the vehicle image G42 at a portion thereof corresponding to a position of the own vehicle 200 with respect to the designated parking space 31D which is represented by the vehicle position signal S13 as shown in FIG. 14. The vehicle image G42 shown in FIG. 14 displays the own vehicle 200 which is moved to a position shown in FIG. 13.

Further, when the terminal control unit 110 receives the parking remaining distance signal S15, the terminal control unit 110 causes the terminal display 120 to display the parking remaining distance image G43 which displays the parking remaining distance Din represented by the parking remaining distance signal S15 as shown in FIG. 14.

Further, when the terminal control unit 110 receives the moving direction signal S17, the terminal control unit 110 causes the terminal display 120 to display the moving direction image G47 displaying the moving direction of the own vehicle 200 represented by the moving direction signal S17 at a portion of the terminal display 120 near the vehicle image G42 as shown in FIG. 14.

It should be noted that when the terminal user UR puts their finger off the parking moving operation image portion P44, the terminal control unit 110 stops wirelessly transmitting the continuous touch operation signal S16. In this case, the vehicle control unit 210 does not receive the continuous touch operation signal S16. When the vehicle control unit 210 does not receive the continuous touch operation signal S16, the vehicle control unit 210 executes a vehicle stop process to stop the own vehicle 200 by the braking apparatus 222.

Figure 15:
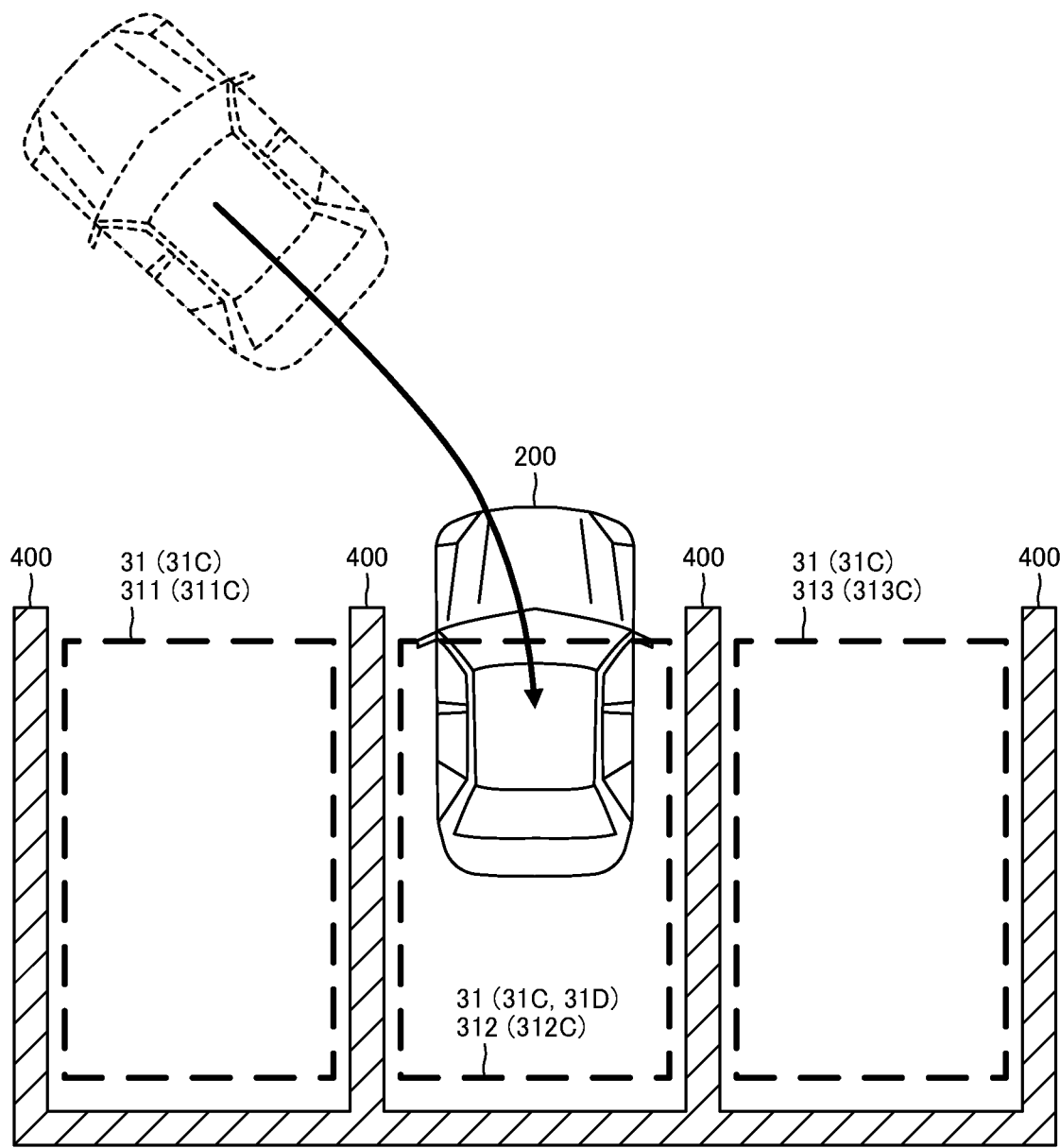
FIG. 15 is a view which shows a scene that the own vehicle is moved rearward and leftward by the remote parking control.

When the vehicle control unit 210 moves the own vehicle 200 forward and rightward and stops the own vehicle 200 as shown in FIG. 13, the vehicle control unit 210 executes the vehicle moving process to control the operations of the vehicle moving apparatus 220 as follows. That is, the vehicle control unit 210 changes the shift state of the transmission apparatus 224 from the forward moving driving state SD to the rearward moving driving state SR to K-turn the own vehicle 200. Then, the vehicle control unit 210 moves the own vehicle 200 rearward and leftward, gradually decreasing the steering angle θ such that the steering angle θ becomes zero when a longitudinal direction of the own vehicle 200 becomes parallel to a longitudinal direction of the designated parking space 31D as shown in FIG. 15.

Figure 16:
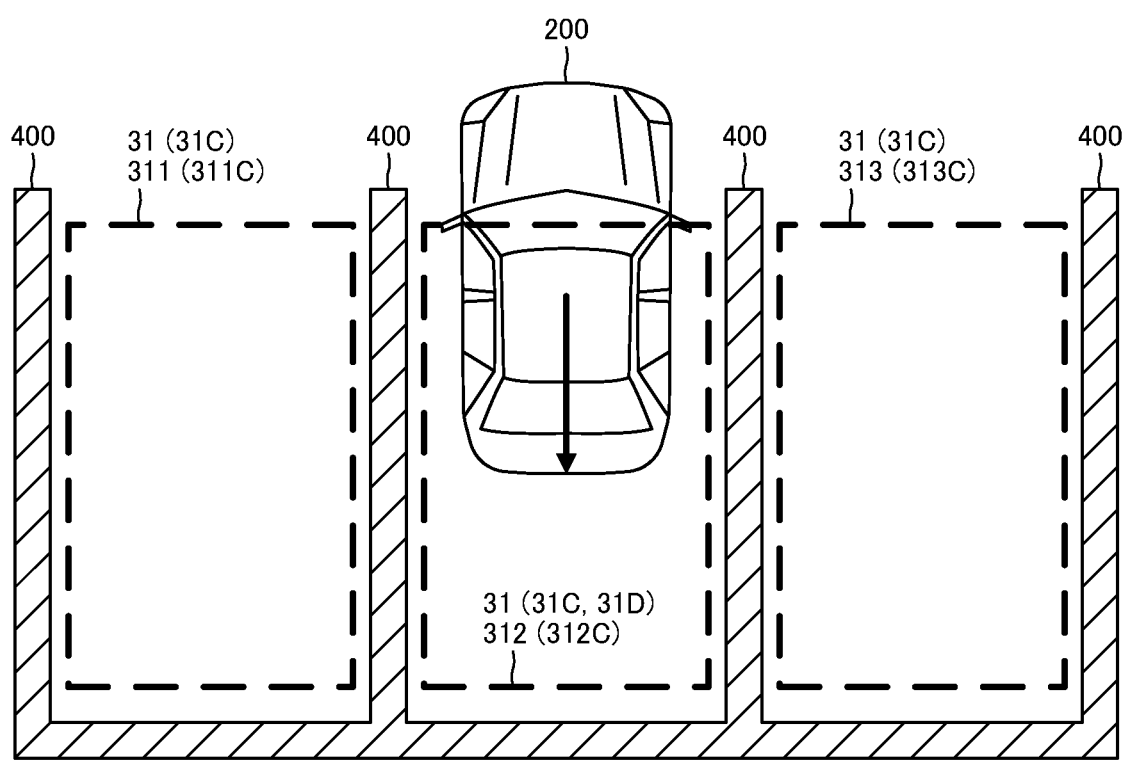
FIG. 16 is a view which shows a scene that the own vehicle is moved straight rearward by the remote parking control.

Then, the vehicle control unit 210 executes the vehicle moving process to control the operations of the vehicle moving apparatus 220 to move the own vehicle 200 straight rearward as shown in FIG. 16.

It should be noted that in this embodiment, while the vehicle control unit 210 moves the own vehicle 200 by the remote parking control, the vehicle control unit 210 controls the driving force output from the driving apparatus 221 and the braking force output from the braking apparatus 222 such that the own vehicle moving speed V is maintained at a speed equal to or lower than a predetermined limit vehicle moving speed Vlimit.

Figure 17:
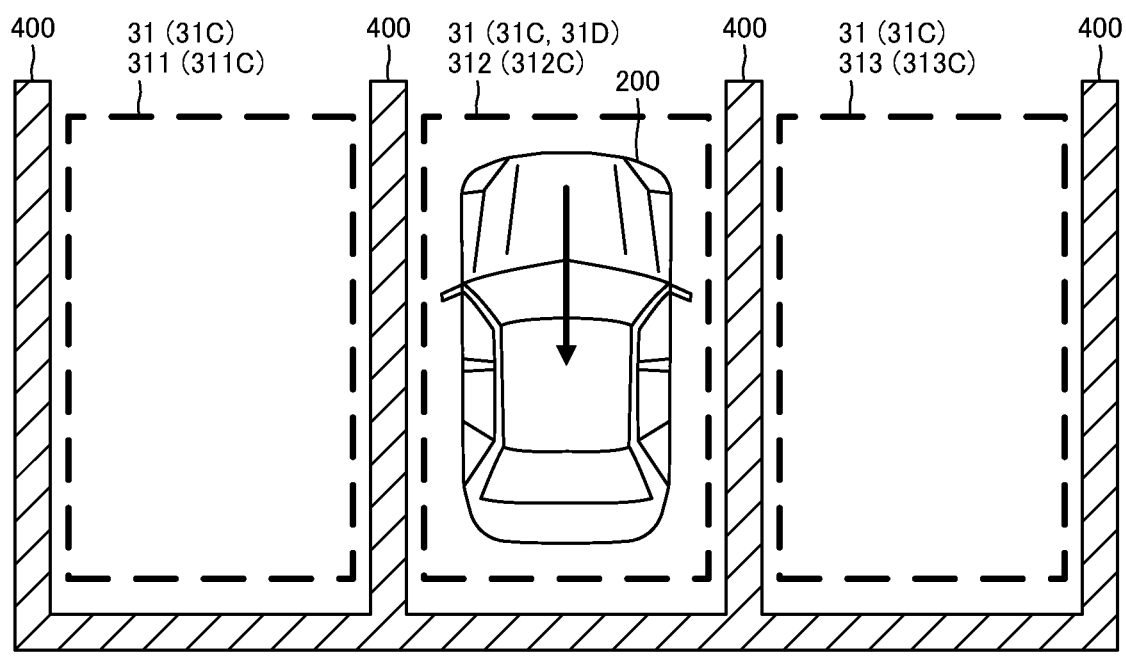
FIG. 17 is a view which shows a scene that parking the own vehicle by the remote parking control is completed.

Then, when the own vehicle 200 arrives at the target parking point Pin_tgt as shown in FIG. 17, the vehicle control unit 210 stops the own vehicle 200 by the vehicle stop process. Then, the vehicle control unit 210 holds the own vehicle 200 stopped by a vehicle stop holding process, stops the operations of apparatuses such as the surrounding information detecting apparatus 260 and the vehicle moving apparatus 220, and terminates the remote parking control. Thereby, parking the own vehicle 200 in the designated parking space 31D is completed.

It should be noted that in this embodiment, the vehicle stop process is a process to stop the own vehicle 200 by the braking apparatus 222. Further, the vehicle stop holding process is a process to hold the own vehicle 200 stopped by activating the parking brake apparatus 231 or by controlling the operation of the transmission apparatus 224 to put the state of the transmission apparatus 224 in the parking state SP.

Further, when parking the own vehicle 200 is completed, the vehicle control unit 210 wirelessly transmits a parking complete signal S18. The parking complete signal S18 is a signal which represents that parking the own vehicle 200 is completed.

It should be noted that when the vehicle control unit 210 detects an obstacle, based on the surrounding detection information IS while the vehicle control unit 210 moves the own vehicle 200 by the remote parking control, and determines that the own vehicle 200 needs to be stopped, for example, for the reason that the own vehicle 200 is likely to contact the object, the vehicle control unit 210 stops the own vehicle 200 by the vehicle stop process, sets the new target parking route Rin_tgt (or sets the target parking route Rin_tgt again), and starts to move the own vehicle 200.

Figure 18:
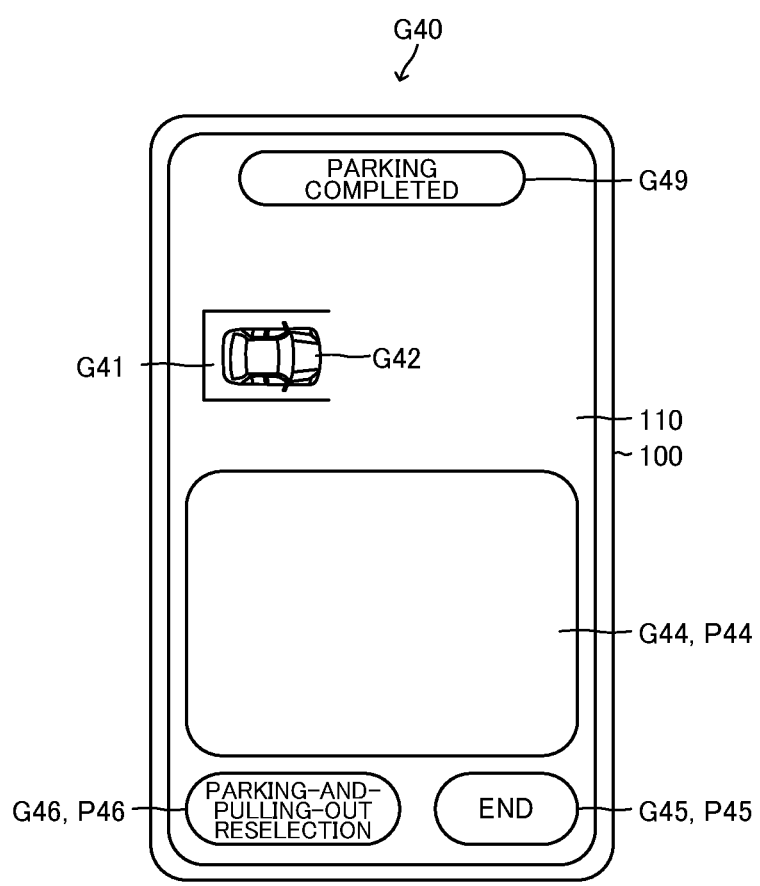
FIG. 18 is a view which shows the operation terminal which displays the parking operation image on the terminal display.

When the terminal control unit 110 receives the parking complete signal S18, the terminal control unit 110 causes the terminal display 120 to display a parking complete image G49 as shown in FIG. 18. The parking complete image G49 is an image which displays that parking the own vehicle 200 is completed.

<Remote Pulling-Out Control>

When the touch operation is applied to the pulling-out selection image portion P22, the terminal control unit 110 wirelessly transmits a pulling-out selection signal S21. The pulling-out selection signal S21 is a signal which represents that the touch operation is applied to the pulling-out selection image portion P22. In this embodiment, the effective touch operation applied to the pulling-out selection image portion P22 is the tap operation.

Figure 19:
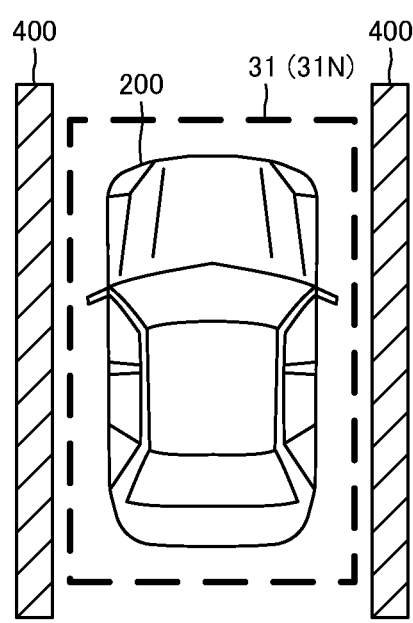
FIG. 19 is a view which shows a scene that the own vehicle is parked in the parking space.

When the vehicle control unit 210 receives the pulling-out selection signal S21, the vehicle control unit 210 acquires the position of the own vehicle 200 with respect to a current parking space 31N (i.e., the parking space where the own vehicle 200 is parked) and etc., based on the surrounding detection information IS. For example, when the own vehicle 200 is parked as shown in FIG. 19, the parking space 31 is the current parking space 31N, and the vehicle control unit 210 acquires the position of the own vehicle 200 with respect to the current parking space 31N and etc.

When the vehicle control unit 210 acquires the position of the own vehicle 200 with respect to the current parking space 31N and etc., the vehicle control unit 210 wirelessly transmits a vehicle position signal S23. The vehicle position signal S23 is a signal which represents information on the position of the own vehicle 200 with respect to the current parking space 31N and etc.

Figure 20:
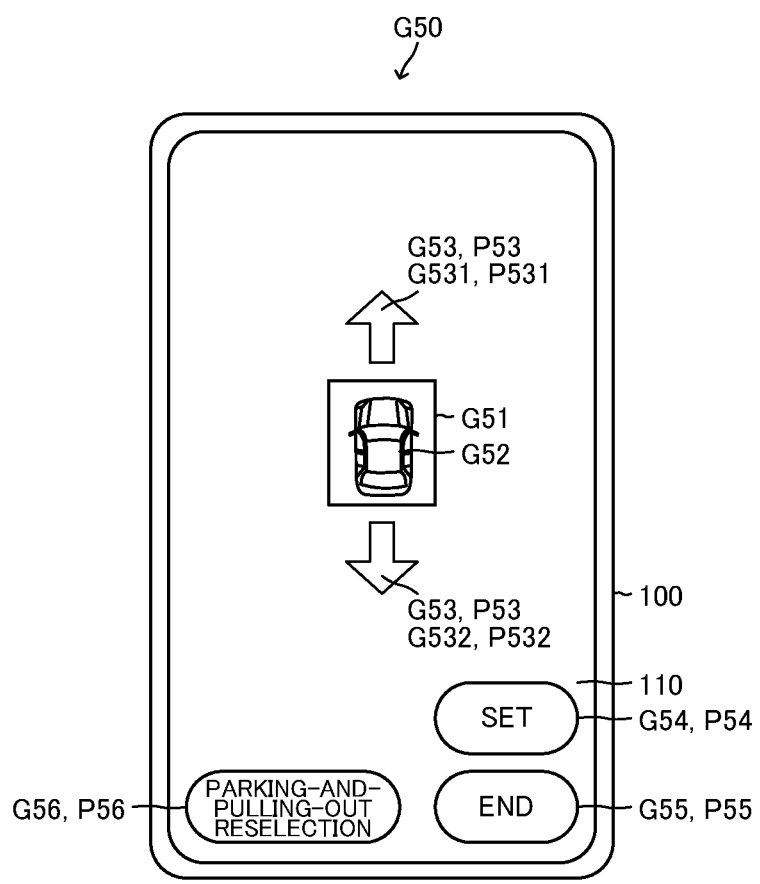
FIG. 20 is a view which shows the operation terminal which displays a pulling-out direction selection image on the terminal display.

When the terminal control unit 110 receives the vehicle position signal S23, the terminal control unit 110 causes the terminal display 120 to display a pulling-out direction selection image G50 as shown in FIG. 20. The pulling-out direction selection image G50 includes a current parking space image G51, a vehicle image G52, a selectable pulling-out direction image G53, a selection set image G54, an application end image G55, and a parking-and-pulling-out reselection image G56.

The current parking space image G51 is an image which displays the current parking space 31N. The vehicle image G52 is an image which displays the own vehicle 200. The selectable pulling-out direction image G53 is an image which displays pulling-out directions in which the own vehicle 200 can be pulled out. FIG. 20 shows an example which corresponds to the example shown in FIG. 19. Thus, the selectable pulling-out direction image G53 shown in FIG. 20 includes a forward direction image G531 which displays a forward direction and a rearward direction image G532 which displays a rearward direction. The selection set image G54 is an image which displays characters "SET". The application end image G55 is an image which displays characters "END". The parking-and-pulling-out reselection image G56 is an image which displays characters "PARKING-AND-PULLING-OUT RESELECTION".

Further, a selectable pulling-out direction image portion P53, a selection set image portion P54, an application end image portion P55, and a parking-and-pulling-out reselection image portion P56 are portions which accept the touch operation applied by the terminal user UR. The selectable pulling-out direction image portion P53 is a portion of the terminal display 120 which displays the selectable pulling-out direction image G53. FIG. 20 shows the example which corresponds to the example shown in FIG. 19. Thus, the selectable pulling-out direction image portion P53 shown in FIG. 20 includes a forward direction image portion P531 and a rearward direction image portion P532, i.e., two portions of the terminal display 120 which display the forward direction image G531 and the rearward direction image G532, respectively. The selection set image portion P54 is a portion of the terminal display 120 which displays the selection set image G54. The application end image portion P55 is a portion of the terminal display 120 which displays the application end image G55. The parking-and-pulling-out reselection image portion P56 is a portion of the terminal display 120 which displays the parking-and-pulling-out reselection image G56.

When the touch operation is applied to the selectable pulling-out direction image portion P53, and then the touch operation is applied to the selection set image portion P54, the terminal control unit 110 wirelessly transmits a designated pulling-out direction signal S22. In the example shown in FIG. 20, when the touch operation is applied to any one of the forward direction image portion P531 and the rearward direction image portion P532, and then the touch operation is applied to the selection set image portion P54, the terminal control unit 110 wirelessly transmits the designated pulling-out direction signal S22. The designated pulling-out direction signal S22 is a signal which represents the selectable pulling-out direction designated as a direction in which the own vehicle 200 is pulled out by the terminal user UR applying the touch operation to the selectable pulling-out direction image portion P53. In addition, the designated pulling-out direction signal S22 is also the moving type set signal which sets the type of moving of the own vehicle 200 by the vehicle moving process described later in detail.

It should be noted that in this embodiment, the effective touch operation applied to the selectable pulling-out direction image portion P53 is the long press operation.

When the vehicle control unit 210 receives the designated pulling-out direction signal S22, the vehicle control unit 210 sets the selectable pulling-out direction designated by the terminal user UR as a designated pulling-out direction. In the example shown in FIG. 19, when the vehicle control unit 210 receives the designated pulling-out direction signal S22, the vehicle control unit 210 sets the selectable pulling-out direction designated by the terminal user UR, i.e., the forward direction as the designated pulling-out direction.

Figure 21:
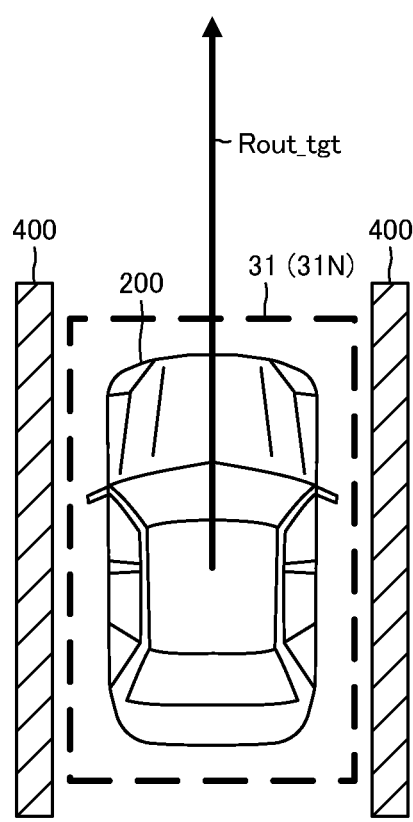
FIG. 21 is a view which shows a target pulling-out route.

When the vehicle control unit 210 sets the designated pulling-out direction, the vehicle control unit 210 starts the remote pulling-out control. When the vehicle control unit 210 starts the remote pulling-out control, the vehicle control unit 210 sets a target pulling-out route Rout_tgt as shown in FIG. 21. The target pulling-out route Rout_tgt is a route along which the vehicle control unit 210 moves the own vehicle 200 in the designated pulling-out direction to pull the own vehicle 200 out of the current parking space 31N. FIG. 21 shows an example in which the forward direction in the example shown in FIG. 19 is set as the designated pulling-out direction.

When the vehicle control unit 210 sets the target pulling-out route Rout_tgt, the vehicle control unit 210 wirelessly transmits a pulling-out remaining distance signal S25. The pulling-out remaining distance signal S25 is a signal which represents a pulling-out remaining distance Dout, i.e., a distance between the own vehicle 200 and a target pulling-out point Pout_tgt. The target pulling-out point Pout_tgt is a point outside of the current parking space 31N which the remote pulling-out control causes the own vehicle 200 to reach. The vehicle control unit 210 acquires the parking-out remaining distance Dout, based on the surrounding detection information IS.

Figure 22:
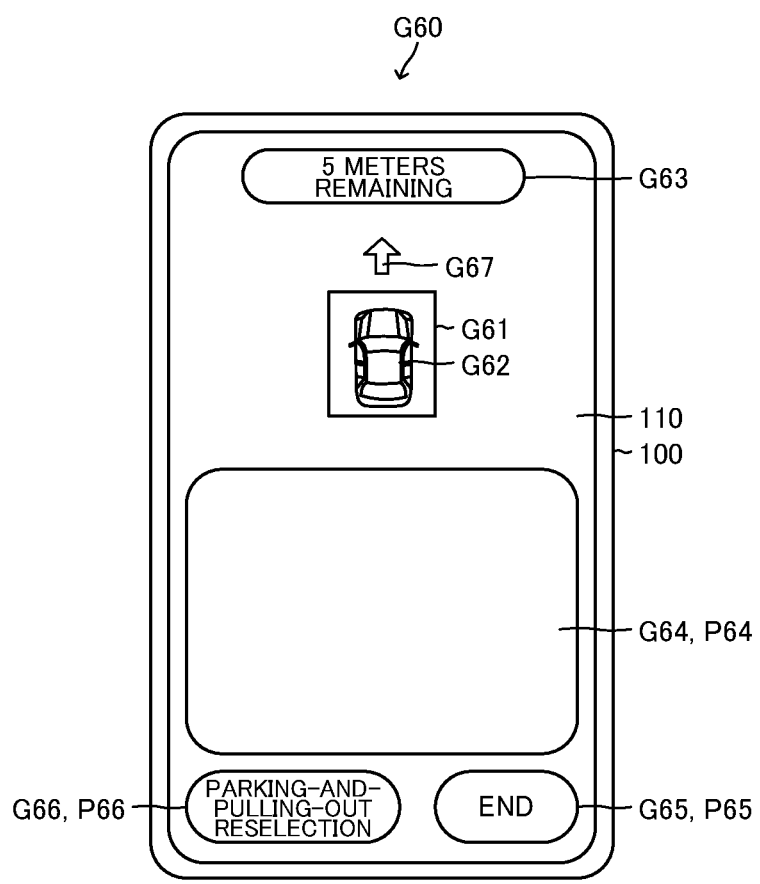
FIG. 22 is a view which shows the operation terminal which displays a pulling-out operation image on the terminal display.

On the other hand, when the touch operation is applied to the selectable pulling-out direction image portion P53, the terminal control unit 110 causes the terminal display 120 to display a pulling-out operation image G60 as shown in FIG. 22. FIG. 22 shows an example which corresponds to the example shown in FIG. 21. In FIG. 22, the designated pulling-out direction is the forward direction.

The pulling-out operation image G60 includes a current parking space image G61, a vehicle image G62, a pulling-out remaining distance image G63, a pulling-out moving operation image G64, an application end image G65, a parking-and-pulling-out reselection image G66, and a pulling-out direction image G67. The current parking space image G61 is an image which displays the current parking space 31N. The vehicle image G62 is an image which displays the own vehicle 200. The pulling-out remaining distance image G63 is an image which displays the parking-out remaining distance Dout. The pulling-out moving operation image G64 is an image which defines an area having a predetermined area. The application end image G65 is an image which displays characters "END". The parking-and-pulling-out reselection image G66 is an image which displays characters "PARKING-AND-PULLING-OUT RESELECTION". The pulling-out direction image G67 is an image which displays the designated pulling-out direction.

A pulling-out moving operation image portion P64, an application end image portion P65, and a parking-and-pulling-out reselection image portion P66 are portions which accept the touch operation applied by the terminal user UR. The pulling-out moving operation image portion P64 is a portion of the terminal display 120 which displays the pulling-out moving operation image G64. The application end image portion P65 is a portion of the terminal display 120 which displays the application end image G65. The parking-and-pulling-out reselection image portion P66 is a portion of the terminal display 120 which displays the parking-and-pulling-out reselection image G66.

When the terminal control unit 110 receives the pulling-out remaining distance signal S25, the terminal control unit 110 causes the terminal display 120 to display the pulling-out remaining distance image G63 which displays the parking-out remaining distance Dout represented by the pulling-out remaining distance signal S25.

While the touch operation continues to be applied to the pulling-out moving operation image portion P64, the terminal control unit 110 wirelessly transmits a continuous touch operation signal S26 or a predetermined operation signal. The continuous touch operation signal S26 is a signal which represents that the predetermined operation is applied to the pulling-out moving operation image portion P64. In this embodiment, the predetermined operation applied to the pulling-out moving operation image portion P64 is the touch operation. In particular, the effective touch operation applied to the pulling-out moving operation image portion P64 is the continuous touch operation. The continuous touch operation is one of the slide operations. In particular, the continuous touch operation is the slide operation of sliding the finger of the terminal user UR on the pulling-out moving operation image portion P64 as shown by a line L in FIG. 23. Thus, when the continuous touch operation is not carried out, i.e., the finger of the terminal user UR touches the pulling-out moving operation image portion P64, but stops on the pulling-out moving operation image portion P64, the terminal control unit 110 does not transmit the continuous touch operation signal S26.

It should be noted that the terminal control unit 110 may be configured to wirelessly transmit a signal which represents a position in the pulling-out moving operation image portion P64 to which the touch operation is applied in place of the continuous touch operation signal S26. In this case, the vehicle control unit 210 receives the signal in question and determines whether the continuous touch operation is applied to the pulling-out moving operation image portion P64.

Figure 24:
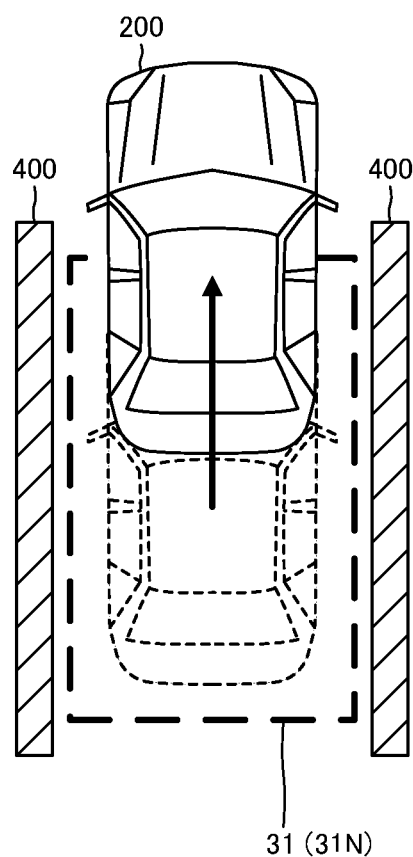
FIG. 24 is a view which shows a scene that the own vehicle is moved straight forward by a remote pulling-out control.

When the vehicle control unit 210 receives the continuous touch operation signal S26, the vehicle control unit 210 controls the operations of the transmission apparatus 224 to set the transmission apparatus 224 in the forward moving driving state SD. In addition, as shown in FIG. 24, the vehicle control unit 210 executes the vehicle moving process to control the operations of the vehicle moving apparatus 220 to move the own vehicle 200 forward along the target pulling-out route Rout_tgt and stop the own vehicle 200 when the own vehicle 200 arrives at the target pulling-out point Pout_tgt.

While the vehicle control unit 210 receives the continuous touch operation signal S26, the vehicle control unit 210 executes the vehicle moving process to move the own vehicle 200 along the target pulling-out route Rout_tgt.

Further, the vehicle control unit 210 continues wirelessly transmitting the vehicle position signal S23 and the pulling-out remaining distance signal S25 until the vehicle control unit 210 completes pulling the own vehicle 200 out of the current parking space 31N after the vehicle control unit 210 starts to receive the continuous touch operation signal S26.

Figure 23:
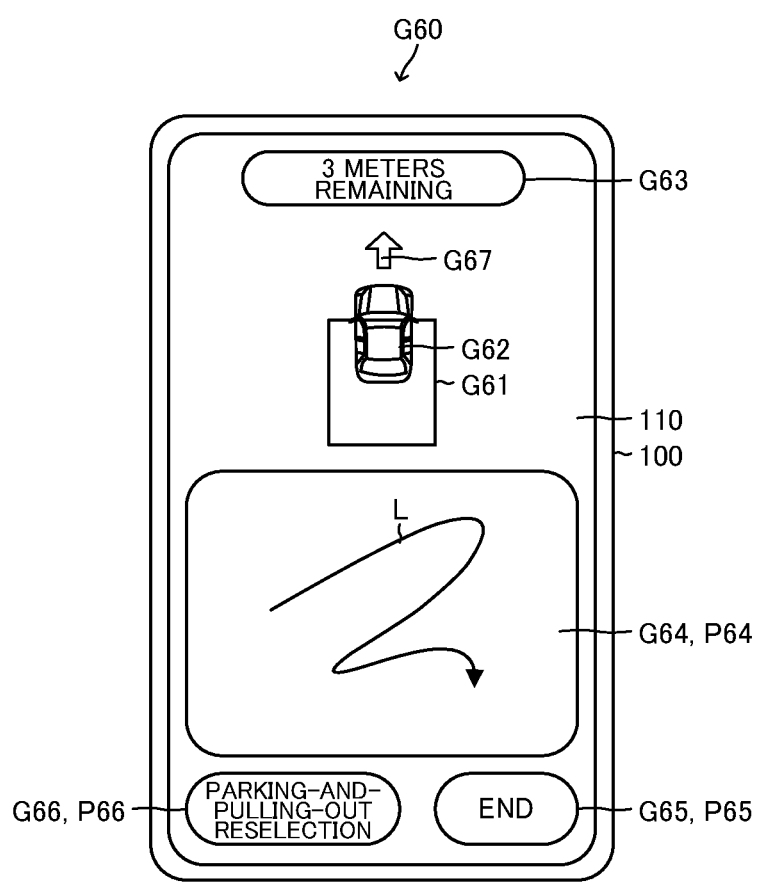
FIG. 23 is a view which shows the operation terminal which displays the pulling-out operation image on the terminal display.

When the terminal control unit 110 receives the vehicle position signal S23, the terminal control unit 110 causes the terminal display 120 to display the vehicle image G62 at a portion thereof corresponding to a position of the own vehicle 200 with respect to the current parking space 31N which is represented by the vehicle position signal S23 as shown in FIG. 23. The vehicle image G62 shown in FIG. 23 displays the own vehicle 200 which is moved to a position shown in FIG. 24.

Further, when the terminal control unit 110 receives the pulling-out remaining distance signal S25, the terminal control unit 110 causes the terminal display 120 to display the pulling-out remaining distance image G63 which displays the parking-out remaining distance Dout represented by the pulling-out remaining distance signal S25 as shown in FIG. 23.

It should be noted that when the terminal user UR puts their finger off the pulling-out moving operation image portion P64, the terminal control unit 110 stops wirelessly transmitting the continuous touch operation signal S26. In this case, the vehicle control unit 210 does not receive the continuous touch operation signal S26. When the vehicle control unit 210 does not receive the continuous touch operation signal S26, the vehicle control unit 210 executes the vehicle stop process to stop the own vehicle 200 by the braking apparatus 222.

It should be noted that in this embodiment, while the vehicle control unit 210 moves the own vehicle 200 by the remote pulling-out control, the vehicle control unit 210 controls the driving force output from the driving apparatus 221 and the braking force output from the braking apparatus 222 such that the own vehicle moving speed V is maintained at a speed equal to or lower than the predetermined limit vehicle moving speed Vlimit.

Figure 25:
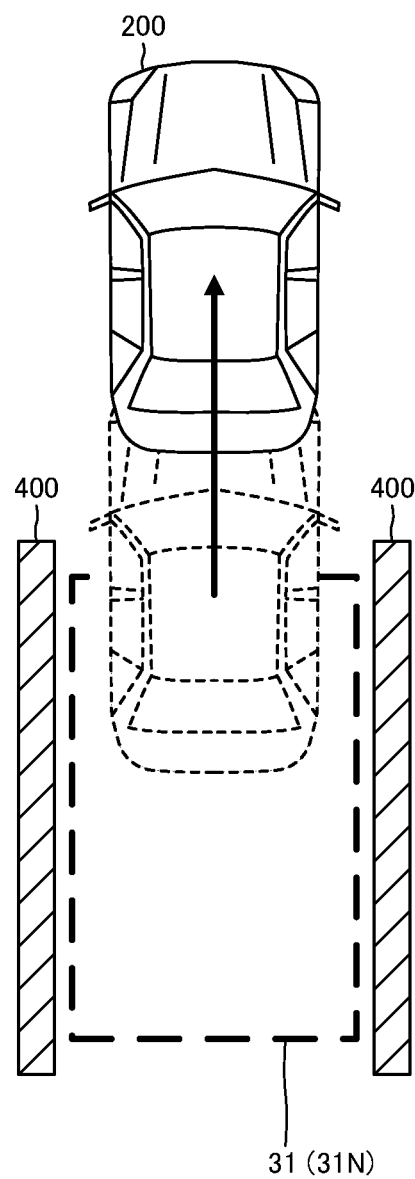
FIG. 25 is a view which shows a scene that pulling-out the own vehicle by the remote pulling-out control is completed.

Then, when the own vehicle 200 arrives at the target pulling-out point Pout_tgt as shown in FIG. 25, the vehicle control unit 210 stops the own vehicle 200 by the vehicle stop process. Then, the vehicle control unit 210 holds the own vehicle 200 stopped by the vehicle stop holding process, stops the operations of apparatuses such as the surrounding information detecting apparatus 260 and the vehicle moving apparatus 220, and terminates the remote pulling-out control. Thereby, pulling-out the own vehicle 200 of the current parking space 31N is completed.

Further, when pulling out the own vehicle 200 is completed, the vehicle control unit 210 wirelessly transmits a pulling-out complete signal S28. The pulling-out complete signal S28 is a signal which represents that pulling out the own vehicle 200 is completed.

Figure 26:
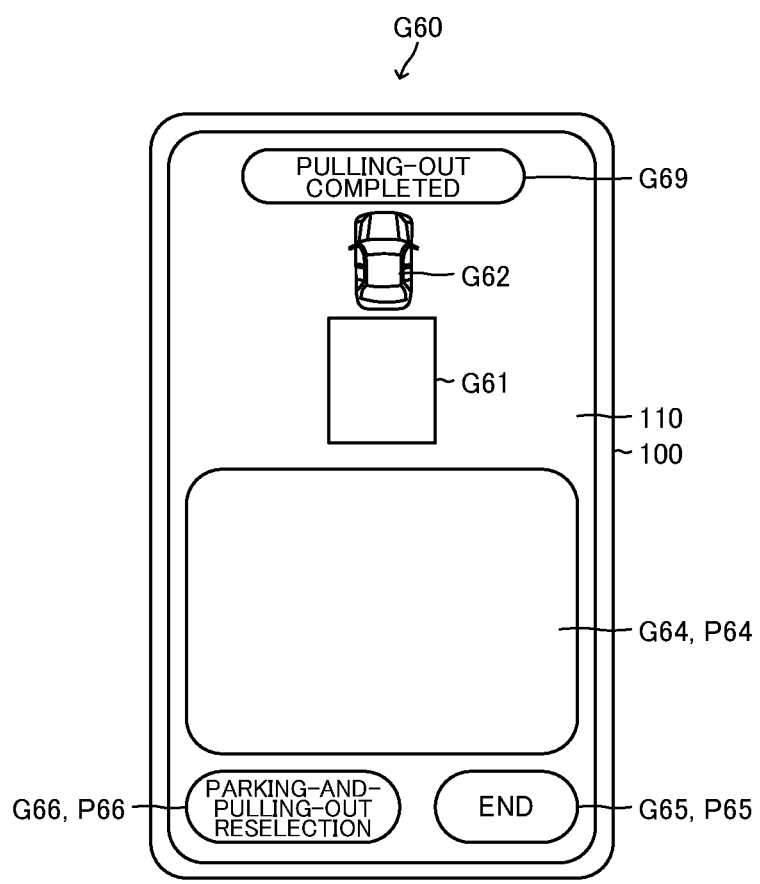
FIG. 26 is a view which shows the operation terminal which displays the pulling-out operation image on the terminal display.

When the terminal control unit 110 receives the pulling-out complete signal S28, the terminal control unit 110 causes the terminal display 120 to display a pulling-out complete image G69 as shown in FIG. 26. The pulling-out complete image G69 is an image which displays that pulling out the own vehicle 200 is completed.

It should be noted that when the vehicle control unit 210 determines to need to K-turn the own vehicle 200 to pulling out the own vehicle 200 while the vehicle control unit 210 executes the remote pulling-out control, the vehicle control unit 210 changes the shift state of the transmission apparatus 224 and K-turns the own vehicle 200.

<Termination of Application Software, and Etc.>

When the touch operation is applied to any one of the application termination image portions P15 to P65 (i.e., the application termination image portions P15, P25, P35, P45, P55, and P65), the terminal control unit 110 terminates the remote moving application software and wirelessly transmits a control termination command signal S30. The control termination command signal S30 is a signal which commands terminating the remote parking-and-pulling-out control.

When the touch operation is applied to any one of the parking-and-pulling-out reselection image portions P36 to P66 (i.e., the parking-and-pulling-out reselection image portions P36, P46, P56, and P66), the terminal control unit 110 causes the terminal display 120 to display the parking-and-pulling-out selection image G20 and wirelessly transmits the control termination command signal S30.

When the vehicle control unit 210 receives the control termination command signal S30, the vehicle control unit 210 stops the own vehicle 200 by the vehicle stop process. In addition, the vehicle control unit 210 holds the own vehicle 200 stopped by the vehicle stop holding process, stops the operations of apparatuses such as the surrounding information detecting apparatus 260 and the vehicle moving apparatus 220, and terminates the remote parking control or the remote pulling-out control.

It should be noted that the terminal control unit 110 may be configured to cause the terminal display 120 to display an image which defines a portion of the terminal display 120 to which the touch operation to return a screen of the terminal display 120 to the previous screen is applied when the remote moving application software is programmed to change the screen of the terminal display 120 many times while the remote moving application software is executed.

<Vibration Process>

As described above, the terminal user UR continuously applies the touch operation with their finger to the terminal display 120 of the operation terminal 100 when the own vehicle 200 is autonomously moved by the remote moving control or the remote parking-and-pulling-out control. For ensuring a moving safety of the own vehicle 200, the terminal user UR is required to apply the touch operation to the terminal display 120, watching the moving state of the own vehicle 200 without watching the terminal display 120.

If information on a state of controlling the own vehicle 200 is provided from the operation terminal 100 to the terminal user UR, the terminal user UR can obtain much information on the state of controlling the own vehicle 200. Thereby, the terminal user UR has benefits.

Accordingly, the vehicle ECU 290 is configured to wirelessly transmit a moving vibration request signal S41 via the vehicle signal receiving-and-transmitting device 280 when the own vehicle 200 is autonomously moved by the remote moving control, i.e., the own vehicle 200 is autonomously moved forward or rearward. The moving vibration request signal S41 is a signal which requests to activate the vibration device 130 to vibrate the operation terminal 100 with a predetermined vibration pattern or a moving vibration pattern. In other words, the vehicle ECU 290 is configured to wirelessly transmit the moving vibration request signal S41 via the vehicle signal receiving-and-transmitting device 280 when the state of controlling the own vehicle 200 corresponds to a state of moving the own vehicle 200 while the remote moving control is executed.

In this case, when the terminal ECU 190 receives the moving vibration request signal S41 via the terminal signal receiving-and-transmitting device 180, the terminal ECU 190 executes a moving vibration process, i.e., the vibration process to activate the vibration device 130 to generate vibration of the moving vibration pattern. In other words, when the state of controlling the own vehicle 200 corresponds to the state of moving the own vehicle 200 while the remote moving control is executed, the terminal ECU 190 executes the moving vibration process.

Thereby, the terminal user UR can realize that the own vehicle 200 moves from the vibration of the operation terminal 100 and with their eyes.

In this embodiment, the vibration pattern is defined by a vibration duration (i.e., a duration period of time of continuously generating the vibration), the vibration number of times (i.e., the number of times of generating the vibration by one vibration process), a vibration interval (i.e., a time interval of generating the vibrations in one vibration process, a vibration intensity (i.e., an intensity of the vibration), and a vibration frequency (i.e., a frequency of the vibration). Thus, the vibration pattern can be changed by changing one or more of the vibration duration, the vibration number of times, the vibration interval, the vibration intensity, and the vibration frequency.

Further, in this embodiment, the vibration pattern of the operation terminal 100 when the own vehicle 200 is moved forward by the remote moving control is the same as the vibration pattern of the operation terminal 100 when the own vehicle 200 is moved rearward by the remote moving control. In this regard, the vibration pattern of the operation terminal 100 when the own vehicle 200 is moved forward by the remote moving control and the vibration pattern of the operation terminal 100 when the own vehicle 200 is moved rearward by the remote moving control may be different.

Furthermore, the vehicle ECU 290 may be configured to wirelessly transmit a moving informing sound request signal S51 via the vehicle signal receiving-and-transmitting device 280 in addition to or in place of wirelessly transmitting the moving vibration request signal S41 when the own vehicle 200 is autonomously moved (i.e., the own vehicle 200 is autonomously moved forward or rearward) by the remote moving control. The moving informing sound request signal S51 is a signal which requests to output informing sounds from the sound device 140 with a predetermined informing sound output pattern or a moving informing sound output pattern. In this case, when the terminal ECU 190 receives the moving informing sound request signal S51 via the terminal signal receiving-and-transmitting device 180, the terminal ECU 190 executes a moving informing process, i.e., an informing process to output the informing sounds from the sound device 140 with the moving informing sound output pattern.

Further, the vehicle ECU 290 is configured not to wirelessly transmit the vibration request signal S40, i.e., the signal which requests the vibration by the vibration device 130 when the own vehicle 200 is stopped by the remote moving control. In other words, the vehicle ECU 290 is configured not to wirelessly the vibration request signal S40 when the state of controlling the own vehicle 200 corresponds to the state of stopping the own vehicle 200 while the remote moving control is executed.

On the other hand, the terminal ECU 190 does not activate the vibration device 130 when the terminal ECU 190 does not receive the vibration request signal S40. That is, the terminal ECU 190 does not execute the vibration process. In other words, the terminal ECU 190 does not execute the vibration process when the state of controlling the own vehicle 200 corresponds to the state of stopping the own vehicle 200 while the remote moving control is executed.

Further, the vehicle ECU 290 is configured to wirelessly transmit a shift change vibration request signal S42 via the vehicle signal receiving-and-transmitting device 280 when the vehicle ECU 290 changes the shift state of the transmission apparatus 224 from the forward moving driving state SD to the rearward moving driving state SR to K-turn the own vehicle 200. The shift change vibration request signal S42 is a signal which requests to vibrate the operation terminal 100 with a predetermined vibration pattern or a shift change vibration pattern by activating the vibration device 130. In other words, the vehicle ECU 290 is configured to wirelessly transmit the shift change vibration request signal S42 via the vehicle signal receiving-and-transmitting device 280 when the state of controlling the own vehicle 200 corresponds to a state of changing the shift state of the transmission apparatus 224 while the remote moving control is executed.

It should be noted that the shift change vibration pattern is different from the moving vibration pattern. Further, the vehicle ECU 290 may be configured to wirelessly transmit the shift change vibration request signal S42 via the vehicle signal receiving-and-transmitting device 280 when the vehicle ECU 290 changes the shift state of the transmission apparatus 224 from the rearward moving driving state SR to the forward moving driving state SD to K-turn the own vehicle 200.

Further, the vehicle ECU 290 may be configured to wirelessly transmit the shift change vibration request signal S42 via the vehicle signal receiving-and-transmitting device 280 when the vehicle ECU 290 changes the shift state of the transmission apparatus 224 from the forward moving driving state SD to the rearward moving driving state SR or from the rearward moving driving state SR to the forward moving driving state SD to achieve an object other than an object of K-turning the own vehicle 200.

In this case, when the terminal ECU 190 receives the shift change vibration request signal S42 via the terminal signal receiving-and-transmitting device 180, the terminal ECU 190 executes a shift change vibration process, i.e., the vibration process to activate the vibration device 130 to generate the vibration of the shift change vibration pattern. In other words, the terminal ECU 190 is configured to execute the shift change vibration process when the state of controlling the own vehicle 200 corresponds to the state of changing the shift state of the transmission apparatus 224 while the remote moving control is executed.

It is difficult for the terminal user UR to realize that the shift state of the transmission apparatus 224 is changed to K-turn the own vehicle 200 and etc. with their eyes. According to the embodiment, the terminal user UR can realize that the shift state of the transmission apparatus 224 is changed by the vibration of the operation terminal 100.

It should be noted that the vehicle ECU 290 may be configured to wirelessly transmit a shift change informing sound request signal S52 via the vehicle signal receiving-and-transmitting device 280 in addition to or in place of wirelessly transmitting the shift change vibration request signal S42 when the vehicle ECU 290 changes the shift state of the transmission apparatus 224. The shift change informing sound request signal S52 is a signal which requests to output the informing sounds from the sound device 140 with a predetermined informing sound output pattern or a shift change informing sound output pattern. In this case, the terminal ECU 190 is configured to execute a shift change informing process, i.e., an informing process to output the informing sounds from the sound device 140 with the shift change informing sound output pattern when the terminal ECU 190 receives the shift change informing sound request signal S52 via the terminal signal receiving-and-transmitting device 180. In this regard, the shift change informing sound output pattern is different from the moving informing sound output pattern.

Further, the informing sound output pattern is defined by an informing duration (i.e., a duration period of time of continuously outputting the informing sound), the informing number of times (i.e., the number of times of outputting the informing sound by one informing process), an informing interval (i.e., a time interval of outputting the informing sounds in one informing process), an informing sound intensity (i.e., an intensity of the informing sound), and an informing sound frequency (i.e., a frequency of the informing sound). Thus, the informing sound output pattern can be changed by changing one or more of the informing duration, the informing number of times, the informing interval, the informing sound intensity, and the informing sound frequency.

Figure 27:
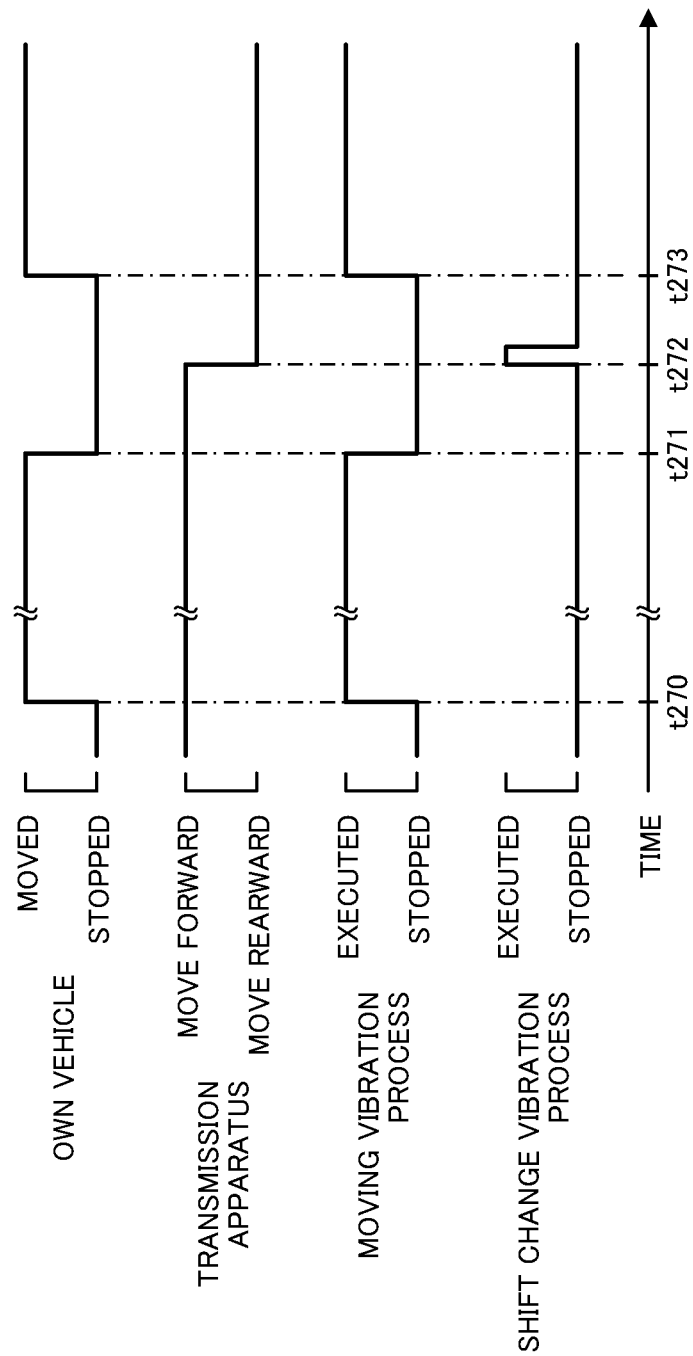
FIG. 27 is a view which shows a time chart which shows vibration and etc. of the operation terminal while a remote moving control is executed.

According to the remote moving system described above, the vibration is generated in the operation terminal 100, for example, as shown in FIG. 27 while the remote moving control is executed. In an example shown in FIG. 27, while the remote moving control is executed, at a time t270, the own vehicle 200 starts to be moved forward. Then, at a time t271, the own vehicle 200 is stopped to K-turn the own vehicle 200. Then, at a time t272, the shift state of the transmission apparatus 224 is changed from the forward moving driving state SD to the rearward moving driving state SR. Then, at a time t273, the own vehicle 200 starts to be moved rearward.

In the example shown in FIG. 27, when the own vehicle 200 starts to be moved forward at the time 270, the moving vibration process is started. Thus, the vibration of the moving vibration pattern is generated in the operation terminal 100 by the vibration device 130 of the operation terminal 100.

Then, when the own vehicle 200 is stopped at the time t271, the vibration process or the moving vibration process is stopped.

Then, when the shift state of the transmission apparatus 224 is changed from the forward moving driving state SD to the rearward moving driving state SR at the time t272, the shift change vibration process is executed, and the vibration of the shift change vibration pattern is generated in the operation terminal 100 by the vibration device 130 of the operation terminal 100.

Then, when the own vehicle 200 starts to be moved rearward at the time t273, the moving vibration process is started, and the vibration of the moving vibration pattern is generated in the operation terminal 100 by the vibration device 130 of the operation terminal 100.

It should be noted that the terminal user UR can have benefits if the terminal user UR is informed that the own vehicle 200 is braked by the remote moving control.

Accordingly, the vehicle ECU 290 may be configured to wirelessly transmit a braking vibration request signal S43 via the vehicle signal receiving-and-transmitting device 280 when the vehicle ECU 290 brakes the own vehicle 200 by the remote moving control. The braking vibration request signal S43 is a signal which requests to vibrate the operation terminal 100 with a predetermined vibration pattern or a braking vibration pattern by activating the vibration device 130. In other words, the vehicle ECU 290 may be configured to wirelessly transmit the braking vibration request signal S43 via the vehicle signal receiving-and-transmitting device 280 when the state of controlling the own vehicle 200 corresponds to a state of braking the own vehicle 200 while the remote moving control is executed.

In this case, when the terminal ECU 190 receives the braking vibration request signal S43 via the terminal signal receiving-and-transmitting device 180, the terminal ECU 190 executes a braking vibration process, i.e., the vibration process to activate the vibration device 130 to generate the vibration of the braking vibration pattern. In other words, when the state of controlling the own vehicle 200 corresponds to the state of braking the own vehicle 200 while the remote moving control is executed, the terminal ECU 190 executes the braking vibration process. The braking vibration pattern is different from the moving vibration pattern and the shift change vibration pattern.

Thereby, the terminal user UR can realize that the own vehicle 200 is braked from the vibration of the operation terminal 100 when the terminal user UR cannot easily realize that the own vehicle 200 is braked with their eyes.

It should be noted that the vehicle ECU 290 may be configured to wirelessly transmit a braking informing sound request signal S53 via the vehicle signal receiving-and-transmitting device 280 in addition to or in place of wirelessly transmitting the braking vibration request signal S43 when the own vehicle 200 is braked by the remote moving control. The braking informing sound request signal S53 is a signal which requests to output the informing sounds from the sound device 140 with a predetermined informing sound output pattern or a braking informing sound output pattern. In this case, when the terminal ECU 190 receives the braking informing sound request signal S53 via the terminal signal receiving-and-transmitting device 180, the terminal ECU 190 executes a braking informing process, i.e., the informing process to output the informing sounds from the sound device 140 with the braking informing sound output pattern. The braking informing sound output pattern is different from the moving informing sound output pattern and the shift change informing sound output pattern.

Further, the terminal user UR can have benefits if the terminal user UR is informed that an obstacle such as a person which interrupts or may interrupt the moving of the own vehicle 200 is detected, based on the surrounding detection information IS while the own vehicle 200 is moved by the remote moving control.

Accordingly, the vehicle ECU 290 may be configured to wirelessly transmit an obstacle vibration request signal S44 via the vehicle signal receiving-and-transmitting device 280 when the vehicle ECU 290 detects the obstacle while moving the own vehicle 200 by the remote moving control. The obstacle vibration request signal S44 is a signal which requests to vibrate the operation terminal 100 with a predetermined vibration pattern or an obstacle vibration pattern by activating the vibration device 130.

In this case, when the terminal ECU 190 receives the obstacle vibration request signal S44 via the terminal signal receiving-and-transmitting device 180, the terminal ECU 190 executes an obstacle vibration process, i.e., the vibration process to activate the vibration device 130 to generate the vibration of the obstacle vibration pattern.

The obstacle vibration pattern is different from the moving vibration pattern, the shift change vibration pattern, and the braking vibration pattern. Further, the obstacle vibration process is executed without executing the braking vibration process even when the own vehicle 200 starts to be braked in response to detecting the obstacle.

Thereby, the terminal user UR can realize that there is the obstacle from the vibration of the operation terminal 100 and with their eyes.

It should be noted that the vehicle ECU 290 may be configured to wirelessly transmit an obstacle informing sound request signal S54 via the vehicle signal receiving-and-transmitting device 280 in addition to or in place of wirelessly transmitting the obstacle vibration request signal S44 when the vehicle ECU 290 detects the obstacle while moving the own vehicle 200 by the remote moving control. The obstacle informing sound request signal S54 is a signal which requests to output the informing sounds from the sound device 140 with a predetermined informing sound output pattern or an obstacle informing sound output pattern. In this case, when the terminal ECU 190 receives the obstacle informing sound request signal S54 via the terminal signal receiving-and-transmitting device 180, the terminal ECU 190 executes an obstacle informing process, i.e., the informing process to output the informing sounds from the sound device 140 with the obstacle informing sound output pattern. The obstacle informing sound output pattern is different from the moving informing sound output pattern, the shift change informing sound output pattern, and the braking informing sound output pattern.

Figure 28:
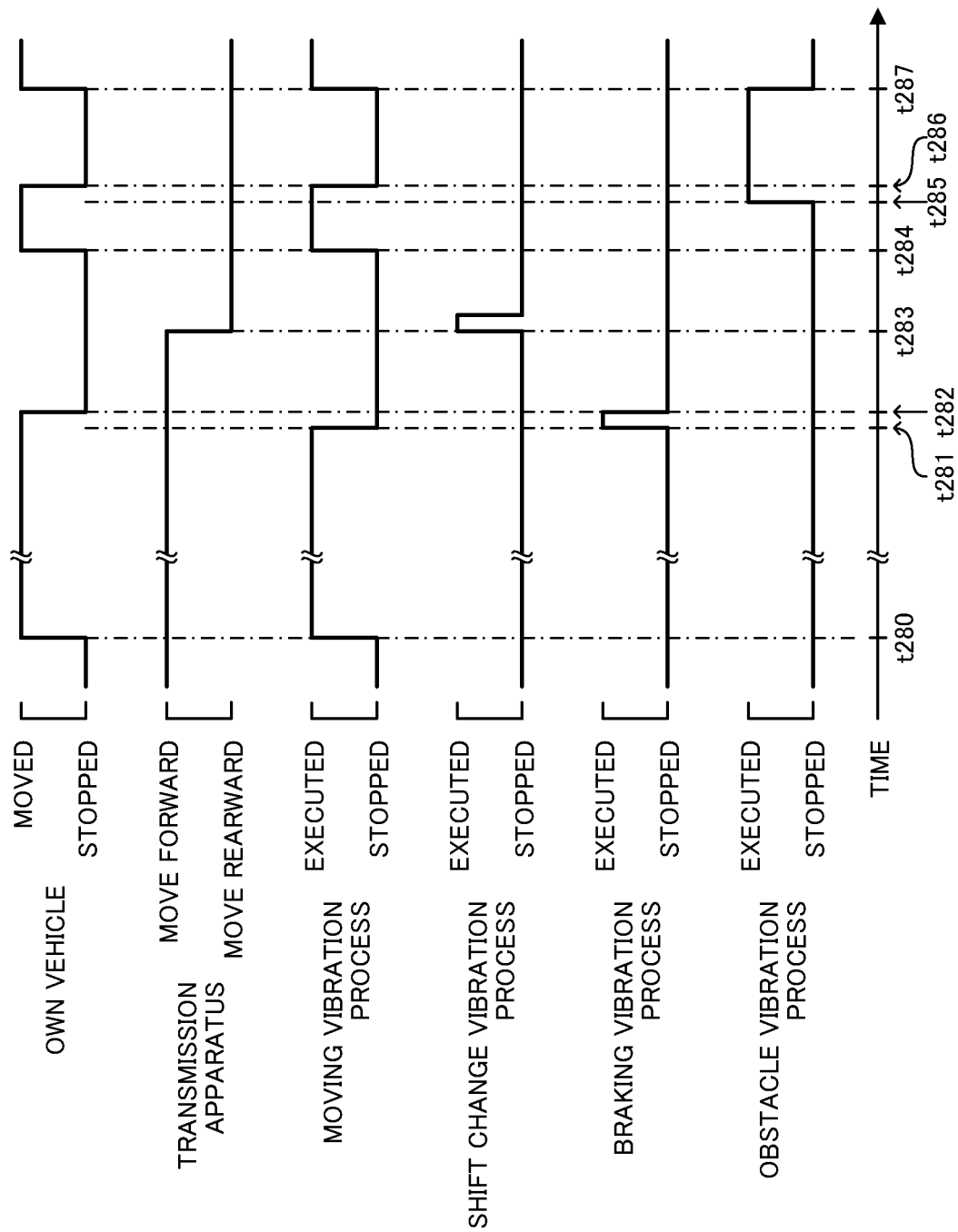
FIG. 28 is a view which shows a time chart which shows the vibration and etc. of the operation terminal while the remote moving control is executed.

According to the remote moving system described above, the vibration is generated in the operation terminal 100, for example, as shown in FIG. 28 while the remote moving control is executed. In an example shown in FIG. 28, while the remote moving control is executed, at a time t280, the own vehicle 200 starts to be moved forward. Then, at a time t281, the own vehicle 200 starts to be braked to K-turn the own vehicle 200. Then, at a time t282, the own vehicle 200 is stopped. Then, at a time t283, the shift state of the transmission apparatus 224 is changed from the forward moving driving state SD to the rearward moving driving state SR. Then, at a time t284, the own vehicle 200 starts to be moved rearward. Then, at a time t285, the own vehicle 200 starts to be braked in response to detecting the obstacle. Then, at a time 286, the own vehicle 200 is stopped. Then, at a time 287, the own vehicle 200 starts to be moved rearward after the obstacle disappeared.

In the example shown in FIG. 28, when the own vehicle 200 starts to be moved forward at the time 280, the moving vibration process is started. Thus, the vibration of the moving vibration pattern is generated in the operation terminal 100 by the vibration device 130 of the operation terminal 100.

Then, when the own vehicle 200 starts to be braked at the time t281, the moving vibration process is stopped, the braking vibration process is started, and the vibration of the braking vibration pattern is generated in the operation terminal 100 by the vibration device 130 of the operation terminal 100.

Then, when the own vehicle 200 is stopped at the time t282, the braking vibration process is stopped.

Then, when the shift state of the transmission apparatus 224 is changed from the forward moving driving state SD to the rearward moving driving state SR at the time t283, the shift change vibration process is executed, and the vibration of the shift change vibration pattern is generated in the operation terminal 100 by the vibration device 130 of the operation terminal 100.

Then, when the own vehicle 200 starts to be moved rearward at the time t284, the moving vibration process is started, and the vibration of the moving vibration pattern is generated in the operation terminal 100 by the vibration device 130 of the operation terminal 100.

Then, when the own vehicle 200 starts to be braked in response to detecting the obstacle at the time 285, the moving vibration process is stopped, the obstacle vibration process is started, and the vibration of the obstacle vibration pattern is generated in the operation terminal 100 by the vibration device 130 of the operation terminal 100. Then, at the time t286, the own vehicle 200 is stopped.

Then, when the obstacle disappeared, and the own vehicle 200 starts to be moved at the time t287, the obstacle vibration process is stopped, the moving vibration process is started, and the vibration of the moving vibration pattern is generated in the operation terminal 100 by the vibration device 130 of the operation terminal 100.

As described above, the remote moving system 10 executes the moving vibration process while the own vehicle 200 is moved forward or rearward by the remote moving control and executes the shift change vibration process when the own vehicle 200 is K-turned. In addition to these vibration processes, the remote moving system 10 may execute the obstacle vibration process when the obstacle is detected. In this regard, if there is information to be informed to the terminal user UR by the vibration of the operation terminal 100 other than the information on (i) the moving state of the own vehicle 200 (i.e., whether the own vehicle 200 is moved forward or rearward), (ii) the K-turn of the own vehicle 200, and (iii) a detection of the obstacle, the remote moving system 10 may be configured to inform the terminal user UR of the other information by vibrating the operation terminal 100 by the vibration device 130 with the vibration pattern different from the vibration patterns used to inform the terminal user UR of the moving state of the own vehicle 200, the K-turn of the own vehicle 200, and the detection of the obstacle.

The remote moving system 10 has been described. According to the remote moving system 10, the operation terminal 100 is vibrated with the different vibration patterns when the own vehicle 200 is moved by the remote moving control, when the own vehicle 200 is braked, when the shift state of the transmission apparatus 224 is changed, and when the obstacle is detected. Thus, the terminal user UR can realize the state of controlling the own vehicle 200 and the obstacle from the vibration of the operation terminal 100 while watching the own vehicle 200 without watching the terminal display 120. In other words, the vibration patterns used are different, depending on the state of controlling the own vehicle 200 and a situation around the own vehicle 200. Thus, the terminal user UR can realize the state of controlling the own vehicle 200 and the obstacle from the vibration of the operation terminal 100 while watching the own vehicle 200 without watching the terminal display 120.

<Specific Operations of Remote Moving System>

Figure 29:
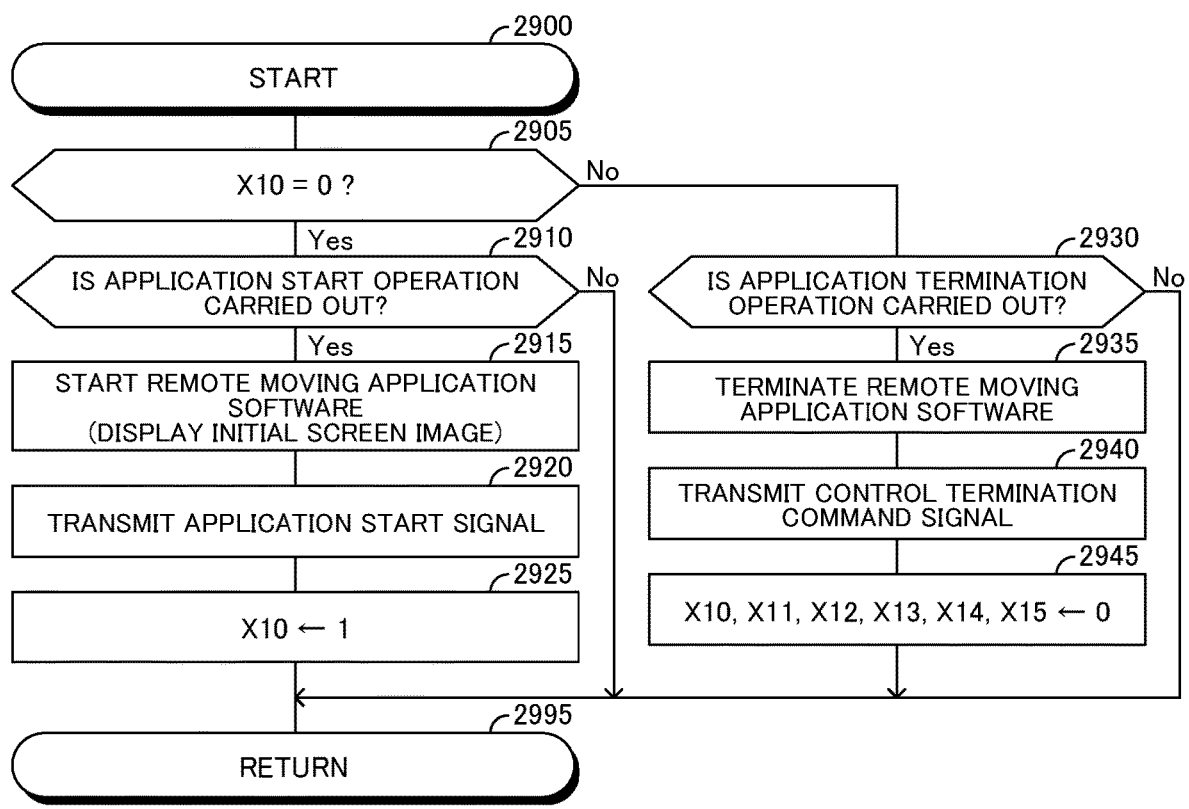
FIG. 29 is a view which shows a flowchart of a routine executed by the terminal control unit according to the embodiment of the invention.

Next, specific operations of the remote moving system will be described. The terminal CPU 191 of the terminal ECU 190 of the terminal control unit 110 is configured or programmed to execute a routine shown in FIG. 29 with a predetermined calculation cycle. Thus, at a predetermined timing, the terminal CPU 191 starts a process from a step 2900 of the routine shown in FIG. 29 and proceeds with the process to a step 2905 to determine whether a value of an initial screen image display flag X10 is "0". The initial screen image display flag X10 is a flag which represents that the initial screen image G10 is displayed on the terminal display 120. The value of the initial screen image display flag X10 is set to "1" when the initial screen image G10 is displayed on the terminal display 120. When the value of the initial screen image display flag X10 is "0", the initial screen image G10 is not displayed on the terminal display 120.

When the terminal CPU 191 determines "Yes" at the step 2905, the terminal CPU 191 proceeds with the process to a step 2910 to determine whether the application start operation is carried out. That is, the terminal CPU 191 determines whether the predetermined touch operation to start the remote moving application software is applied to the terminal display 120. When the terminal CPU 191 determines "Yes" at the step 2910, the terminal CPU 191 proceeds with the process to a step 2915 to start the remote moving application software and display the initial screen image G10. Next, the terminal CPU 191 proceeds with the process to a step 2920 to wirelessly transmit the application start signal S10. Next, the terminal CPU 191 proceeds with the process to a step 2925 to set the value of the initial screen image display flag X10 to "1". Next, the terminal CPU 191 proceeds with the process to a step 2995 to terminate this routine once.

On the other hand, when the terminal CPU 191 determines "No" at the step 2910, the terminal CPU 191 proceeds with the process directly to the step 2995 to terminate this routine once.

Further, when the terminal CPU 191 determines "No" at the step 2905, the terminal CPU 191 proceeds with the process to a step 2930 to determine whether an application termination operation is carried out. That is, the terminal CPU 191 determines whether the tap operation is applied to any one of the application termination image portions P15 to P65. When the terminal CPU 191 determines "Yes" at the step 2930, the terminal CPU 191 proceeds with the process to a step 2935 to terminate the remote moving application software. Next, the terminal CPU 191 proceeds with the process to a step 2940 to wirelessly transmit the control termination command signal S30. Next, the terminal CPU 191 proceeds with the process to a step 2945 to set the value of the initial screen image display flag X10 to "0" and set values of a parking-and-pulling-out selection image display flag X11, a parking space selection image display flag X12, a pulling-out direction selection image display flag X13, a parking operation image display flag X14, and a pulling-out operation image display flag X15 to "0", respectively. Next, the terminal CPU 191 proceeds with the process to the step 2995 to terminate this routine once.

On the other hand, when the terminal CPU 191 determines "No" at the step 2930, the terminal CPU 191 proceeds with the process directly to the step 2995 to terminate this routine once.

Figure 30:
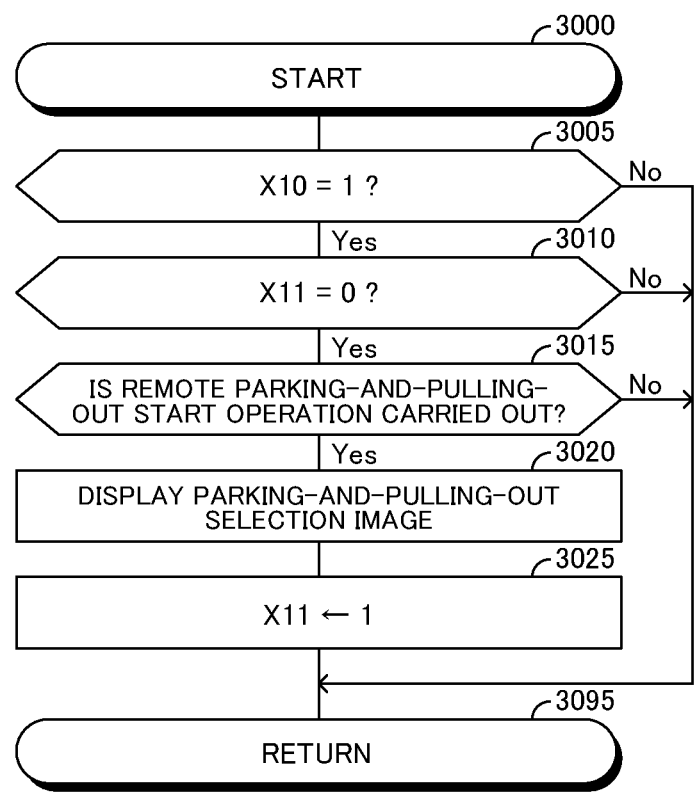
FIG. 30 is a view which shows a flowchart of a routine executed by the terminal control unit according to the embodiment of the invention.

Further, the terminal CPU 191 is configured or programmed to execute a routine shown in FIG. 30 with the predetermined calculation cycle. Thus, at a predetermined timing, the terminal CPU 191 starts a process from a step 3000 of the routine shown in FIG. 30 and proceeds with the process to a step 3005 to determine whether the value of the initial screen image display flag X10 is "1". When the terminal CPU 191 determines "Yes" at the step 3005, the terminal CPU 191 proceeds with the process to a step 3010 to determine whether the value of the parking-and-pulling-out selection image display flag X11 is "0". The parking-and-pulling-out selection image display flag X11 is a flag which represents that the parking-and-pulling-out selection image G20 is displayed on the terminal display 120. The value of the parking-and-pulling-out selection image display flag X11 is set to "1" when the parking-and-pulling-out selection image G20 is displayed on the terminal display 120. When the value of the parking-and-pulling-out selection image display flag X11 is "0", the parking-and-pulling-out selection image G20 is not displayed on the terminal display 120.

When the terminal CPU 191 determines "Yes" at the step 3010, the terminal CPU 191 proceeds with the process to a step 3015 to determine whether a remote parking-and-pulling-out start operation is carried out. That is, the terminal CPU 191 determines whether the touch operation is applied to the remote parking-and-pulling-out start image portion P11. When the terminal CPU 191 determines "Yes" at the step 3015, the terminal CPU 191 proceeds with the process to a step 3020 to display the parking-and-pulling-out selection image G20 on the terminal display 120. Next, the terminal CPU 191 proceeds with the process to a step 3025 to set the value of the parking-and-pulling-out selection image display flag X11 to "1". Next, the terminal CPU 191 proceeds with the process to a step 3095 to terminate this routine once.

On the other hand, when the terminal CPU 191 determines "No" at the step 3015, the terminal CPU 191 proceeds with the process directly to the step 3095 to terminate this routine once.

Further, when the terminal CPU 191 determines "No" at the step 3005 or 3010, the terminal CPU 191 proceeds with the process directly to the step 3095 to terminate this routine once.

Figure 31:
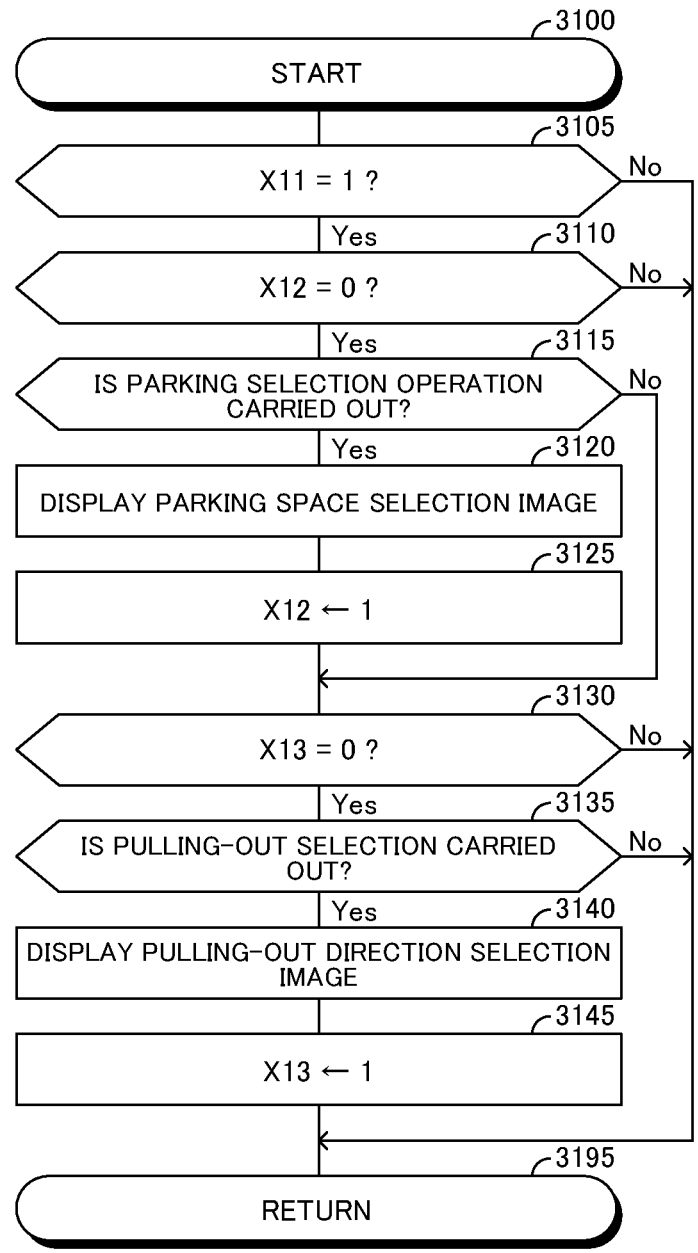
FIG. 31 is a view which shows a flowchart of a routine executed by the terminal control unit according to the embodiment of the invention.

Furthermore, the terminal CPU 191 is configured or programmed to execute a routine shown in FIG. 31 with the predetermined calculation cycle. Thus, at a predetermined timing, the terminal CPU 191 starts a process from a step 3100 of the routine shown in FIG. 31 and proceeds with the process to a step 3105 to determine whether the value of the initial screen image display flag X11 is "1". When the terminal CPU 191 determines "Yes" at the step 3105, the terminal CPU 191 proceeds with the process to a step 3110 to determine whether the value of the parking space selection image display flag X12 is "0". The parking space selection image display flag X12 is a flag which represents that the parking space selection image G30 is displayed on the terminal display 120. The value of the parking space selection image display flag X12 is set to "1" when the parking space selection image G30 is displayed on the terminal display 120. When the value of the parking space selection image display flag X12 is "0", the parking space selection image G30 is not displayed on the terminal display 120.

When the terminal CPU 191 determines "Yes" at the step 3110, the terminal CPU 191 proceeds with the process to a step 3115 to determine whether a parking selection operation is carried out. That is, the terminal CPU 191 determines whether the touch operation is applied to the parking selection image portion P21. When the terminal CPU 191 determines "Yes" at the step 3115, the terminal CPU 191 proceeds with the process to a step 3120 to display the parking space selection image G30 on the terminal display 120. Next, the terminal CPU 191 proceeds with the process to a step 3125 to set the value of the parking space selection image display flag X12 to "1". Next, the terminal CPU 191 proceeds with the process to a step 3130.

On the other hand, when the terminal CPU 191 determines "No" at the step 3115, the terminal CPU 191 proceeds with the process directly to the step 3130.

When the terminal CPU 191 proceeds with the process to the step 3130, the terminal CPU 191 determines whether the value of the pulling-out direction selection image display flag X13 is "0". The pulling-out direction selection image display flag X13 is a flag which represents that the pulling-out direction selection image G50 is displayed on the terminal display 120. The value of the pulling-out direction selection image display flag X13 is set to "1" when the pulling-out direction selection image G50 is displayed on the terminal display 120. When the value of the pulling-out direction selection image display flag X13 is "0", the pulling-out direction selection image G50 is not displayed on the terminal display 120.

When the terminal CPU 191 determines "Yes" at the step 3130, the terminal CPU 191 proceeds with the process to a step 3135 to determine whether a pulling-out selection operation is carried out. That is, the terminal CPU 191 determines whether the touch operation is applied to the pulling-out selection image portion P22. When the terminal CPU 191 determines "Yes" at the step 3135, the terminal CPU 191 proceeds with the process to a step 3140 to display the pulling-out direction selection image G50 on the terminal display 120. Next, the terminal CPU 191 proceeds with the process to a step 3145 to set the value of the pulling-out direction selection image display flag X13 to "1". Next, the terminal CPU 191 proceeds with the process to a step 3195 to terminate this routine once.

On the other hand, when the terminal CPU 191 determines "No" at the step 3135, the terminal CPU 191 proceeds with the process directly to the step 3195 to terminate this routine once.

Further, when the terminal CPU 191 determines "No" at the step 3105 or 3110 or 3130, the terminal CPU 191 proceeds with the process directly to the step 3195 to terminate this routine once.

Figure 32:
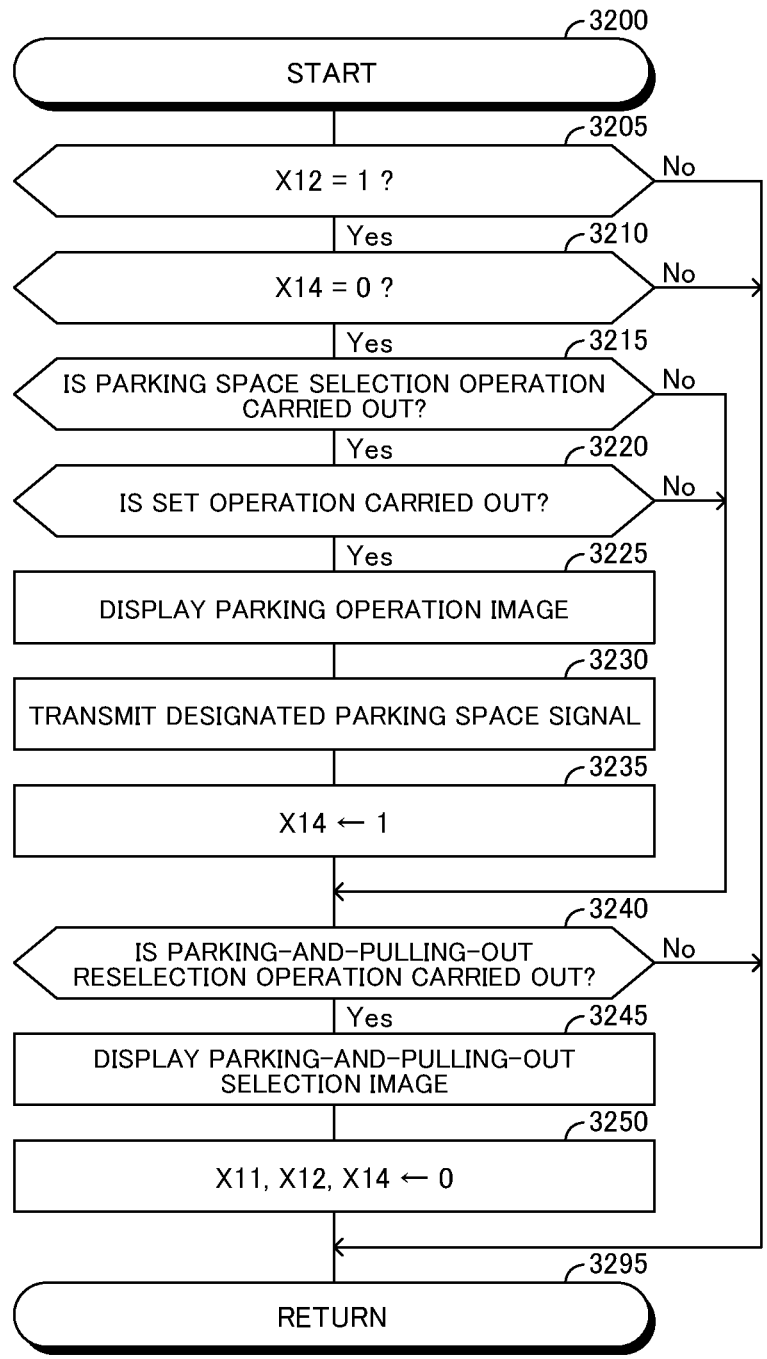
FIG. 32 is a view which shows a flowchart of a routine executed by the terminal control unit according to the embodiment of the invention.

Furthermore, the terminal CPU 191 is configured or programmed to execute a routine shown in FIG. 32 with the predetermined calculation cycle. Thus, at a predetermined timing, the terminal CPU 191 starts a process from a step 3200 of the routine shown in FIG. 32 and proceeds with the process to a step 3205 to determine whether the value of the parking space selection image display flag X12 is "1". When the terminal CPU 191 determines "Yes" at the step 3205, the terminal CPU 191 proceeds with the process to a step 3210 to determine whether the value of the parking operation image display flag X14 is "0". The parking operation image display flag X14 is a flag which represents that the parking operation image G40 is displayed on the terminal display 120. The value of the parking operation image display flag X14 is set to "1" when the parking operation image G40 is displayed on the terminal display 120. When the value of the parking operation image display flag X14 is "0", the parking operation image G40 is not displayed on the terminal display 120.

When the terminal CPU 191 determines "Yes" at the step 3210, the terminal CPU 191 proceeds with the process to a step 3215 to determine whether a parking space selection operation is applied to the terminal display 120. That is, the terminal CPU 191 determines whether the touch operation is applied to the available parking space image portion P31. When the terminal CPU 191 determines "Yes" at the step 3215, the terminal CPU 191 proceeds with the process to a step 3220 to determine whether a set operation is applied to the terminal display 120. That is, the terminal CPU 191 determines whether the touch operation is applied to the selection set image portion P34.

When the terminal CPU 191 determines "Yes" at the step 3220, the terminal CPU 191 proceeds with the process to a step 3225 to display the parking operation image G40 on the terminal display 120. Next, the terminal CPU 191 proceeds with the process to a step 3230 to wirelessly transmit the designated parking space signal S12. At this time, the terminal CPU 191 displays the vehicle image G42 on the terminal display 120 at a position corresponding to the position of the own vehicle 200 represented by the vehicle position signal S13, displays the parking remaining distance image G43 displaying the parking remaining distance Din represented by the parking remaining distance signal S15 on the terminal display 120, and displays the moving direction image G47 displaying the moving direction of the own vehicle 200 represented by the moving direction signal S17 on the terminal display 120.

Next, the terminal CPU 191 proceeds with the process to a step 3235 to set the value of the parking operation image display flag X14 to "1". Next, the terminal CPU 191 proceeds with the process to a step 3240.

On the other hand, when the terminal CPU 191 determines "No" at the step 3220, the terminal CPU 191 proceeds with the process directly to the step 3240.

Further, when the terminal CPU 191 determines "No" at the step 3215, the terminal CPU 191 proceeds with the process directly to the step 3240.

When the terminal CPU 191 proceeds with the process to the step 3240, the terminal CPU 191 determines whether a parking-and-pulling-out reselection operation is applied to the terminal display 120. That is, the terminal CPU 191 determines whether the touch operation is applied to the parking-and-pulling-out selection image portion P36. When the terminal CPU 191 determines "Yes" at the step 3240, the terminal CPU 191 proceeds with the process to a step 3245 to display the parking-and-pulling-out selection image G20 on the terminal display 120. Next, the terminal CPU 191 proceeds with the process to a step 3250 to set the values of the parking-and-pulling-out selection image display flag X11, the parking space selection image display flag X12, and the parking operation image display flag X14 to "0", respectively. Next, the terminal CPU 191 proceeds with the process to a step 3295 to terminate this routine once.

On the other hand, when the terminal CPU 191 determines "No" at the step 3240, the terminal CPU 191 proceeds with the process directly to the step 3295 to terminate this routine once.

Further, when the terminal CPU 191 determines "No" at the step 3205 or 3210, the terminal CPU 191 proceeds with the process directly to the step 3295 to terminate this routine once.

Figure 33:
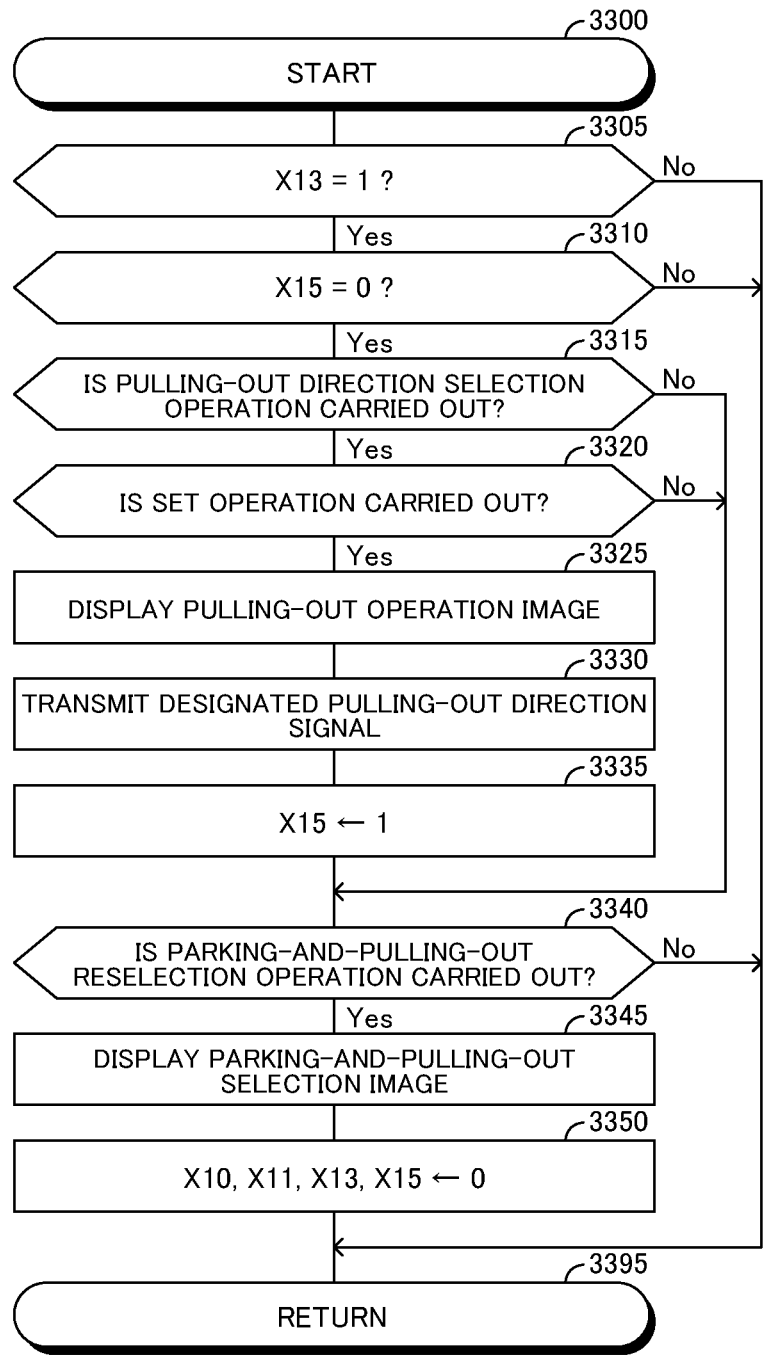
FIG. 33 is a view which shows a flowchart of a routine executed by the terminal control unit according to the embodiment of the invention.

Furthermore, the terminal CPU 191 is configured or programmed to execute a routine shown in FIG. 33 with the predetermined calculation cycle. Thus, at a predetermined timing, the terminal CPU 191 starts a process from a step 3300 of the routine shown in FIG. 33 and proceeds with the process to a step 3305 to determine whether the value of the pulling-out direction selection image display flag X13 is "1". When the terminal CPU 191 determines "Yes" at the step 3305, the terminal CPU 191 proceeds with the process to a step 3310 to determine whether the value of the pulling-out operation image display flag X15 is "0". The pulling-out operation image display flag X15 is a flag which represents that the pulling-out operation image G60 is displayed on the terminal display 120. The value of the pulling-out operation image display flag X15 is set to "1" when the pulling-out operation image G60 is displayed on the terminal display 120. When the value of the pulling-out operation image display flag X15 is "0", the pulling-out operation image G60 is not displayed on the terminal display 120.

When the terminal CPU 191 determines "Yes" at the step 3310, the terminal CPU 191 proceeds with the process to a step 3315 to determine whether a pulling-out direction selection operation is applied to the terminal display 120. That is, the terminal CPU 191 determines whether the touch operation is applied to the selectable pulling-out direction image portion P53. When the terminal CPU 191 determines "Yes" at the step 3315, the terminal CPU 191 proceeds with the process to a step 3320 to determine whether the set operation is applied to the terminal display 120. That is, the terminal CPU 191 determines whether the touch operation is applied to the selection set image portion P54.

When the terminal CPU 191 determines "Yes" at the step 3320, the terminal CPU 191 proceeds with the process to a step 3325 to display the pulling-out operation image G60 on the terminal display 120. Next, the terminal CPU 191 proceeds with the process to a step 3330 to wirelessly transmit the designated pulling-out direction signal S22. At this time, the terminal CPU 191 displays the vehicle image G62 on the terminal display 120 at a position corresponding to the position of the own vehicle 200 represented by the vehicle position signal S23, and displays the pulling-out remaining distance image G63 displaying the parking-out remaining distance Dout represented by the pulling-out remaining distance signal S25 on the terminal display 120.

Next, the terminal CPU 191 proceeds with the process to a step 3335 to set the value of the pulling-out operation image display flag X15 to "1". Next, the terminal CPU 191 proceeds with the process to a step 3340.

On the other hand, when the terminal CPU 191 determines "No" at the step 3320, the terminal CPU 191 proceeds with the process directly to the step 3340.

Further, when the terminal CPU 191 determines "No" at the step 3315, the terminal CPU 191 proceeds with the process directly to the step 3340.

When the terminal CPU 191 proceeds with the process to the step 3340, the terminal CPU 191 determines whether the parking-and-pulling-out reselection operation is applied to the terminal display 120. That is, the terminal CPU 191 determines whether the touch operation is applied to the parking-and-pulling-out reselection image portion P56. When the terminal CPU 191 determines "Yes" at the step 3340, the terminal CPU 191 proceeds with the process to a step 3345 to display the parking-and-pulling-out selection image G20 on the terminal display 120. Next, the terminal CPU 191 proceeds with the process to a step 3350 to set the values of the parking-and-pulling-out selection image display flag X11, the pulling-out direction selection image display flag X13, and the pulling-out operation image display flag X15 to "0", respectively. Next, the terminal CPU 191 proceeds with the process to a step 3395 to terminate this routine once.

On the other hand, when the terminal CPU 191 determines "No" at the step 3340, the terminal CPU 191 proceeds with the process directly to the step 3395 to terminate this routine once.

Further, when the terminal CPU 191 determines "No" at the step 3305 or 3310, the terminal CPU 191 proceeds with the process directly to the step 3395 to terminate this routine once.

Figure 34:
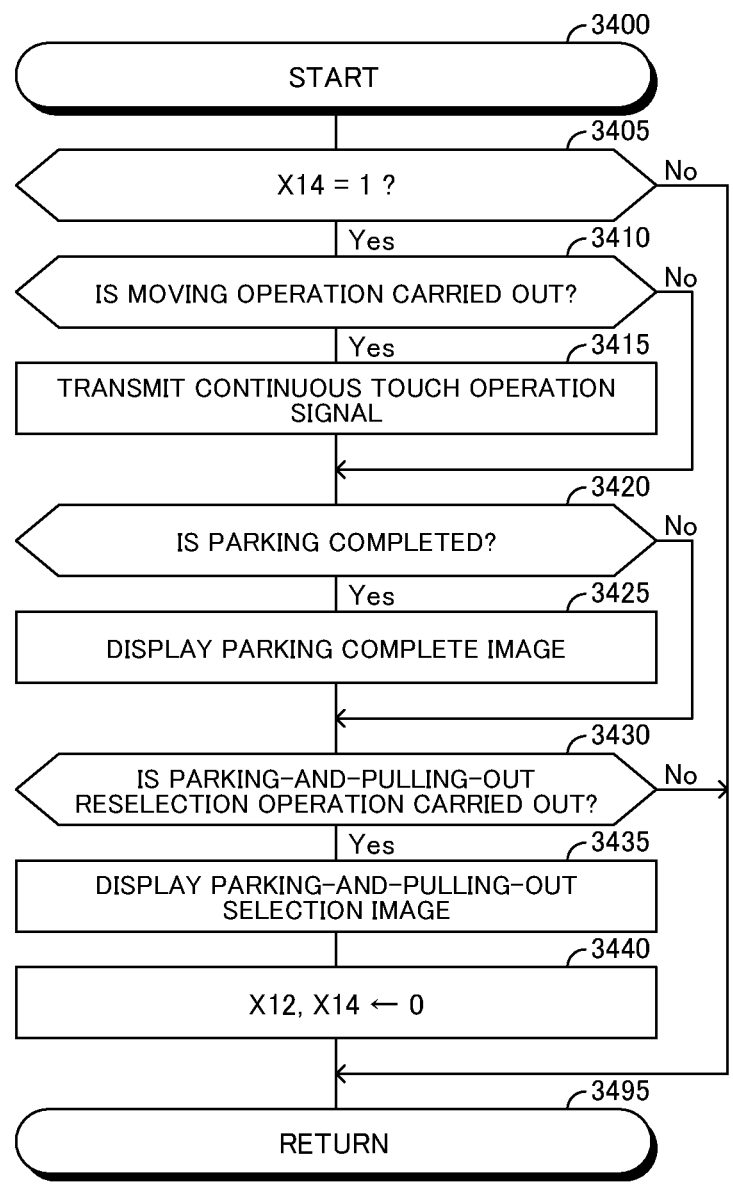
FIG. 34 is a view which shows a flowchart of a routine executed by the terminal control unit according to the embodiment of the invention.

Furthermore, the terminal CPU 191 is configured or programmed to execute a routine shown in FIG. 34 with the predetermined calculation cycle. Thus, at a predetermined timing, the terminal CPU 191 starts a process from a step 3400 of the routine shown in FIG. 34 and proceeds with the process to a step 3405 to determine whether the value of the parking operation image display flag X14 is "1". When the terminal CPU 191 determines "Yes" at the step 3405, the terminal CPU 191 proceeds with the process to a step 3410 to determine whether a moving operation is carried out. That is, the terminal CPU 191 determines whether the touch operation is applied to the parking moving operation image portion P44. When the terminal CPU 191 determines "Yes" at the step 3410, the terminal CPU 191 proceeds with the process to a step 3415 to wirelessly transmit the continuous touch operation signal S16. Next, the terminal CPU 191 proceeds with the process to a step 3420.

On the other hand, when the terminal CPU 191 determines "No" at the step 3410, the terminal CPU 191 proceeds with the process directly to the step 3420.

When the terminal CPU 191 proceeds with the process to the step 3420, the terminal CPU 191 determines whether parking the own vehicle 200 in the designated parking space 31D is completed. That is, the terminal CPU 191 determines whether to have received the parking complete signal S18. When the terminal CPU 191 determines "Yes" at the step 3420, the terminal CPU 191 proceeds with the process to a step 3425 to display the parking complete image G49 on the terminal display 120. Next, the terminal CPU 191 proceeds with the process to a step 3430.

On the other hand, when the terminal CPU 191 determines "No" at the step 3420, the terminal CPU 191 proceeds with the process directly to the step 3430.

When the terminal CPU 191 proceeds with the process to the step 3440, the terminal CPU 191 determines whether the parking-and-pulling-out reselection operation is applied to the terminal display 120. That is, the terminal CPU 191 determines whether the touch operation is applied to the parking-and-pulling-out reselection image portion P46. When the terminal CPU 191 determines "Yes" at the step 3430, the terminal CPU 191 proceeds with the process to a step 3435 to display the parking-and-pulling-out selection image G20 on the terminal display 120. Next, the terminal CPU 191 proceeds with the process to a step 3440 to set the values of the parking space selection image display flag X12 and the parking operation image display flag X14 to "0", respectively. Next, the terminal CPU 191 proceeds with the process to a step 3495 to terminate this routine once.

On the other hand, when the terminal CPU 191 determines "No" at the step 3430, the terminal CPU 191 proceeds with the process directly to the step 3495 to terminate this routine once.

Further, when the terminal CPU 191 determines "No" at the step 3405, the terminal CPU 191 proceeds with the process directly to the step 3495 to terminate this routine once.

Figure 35:
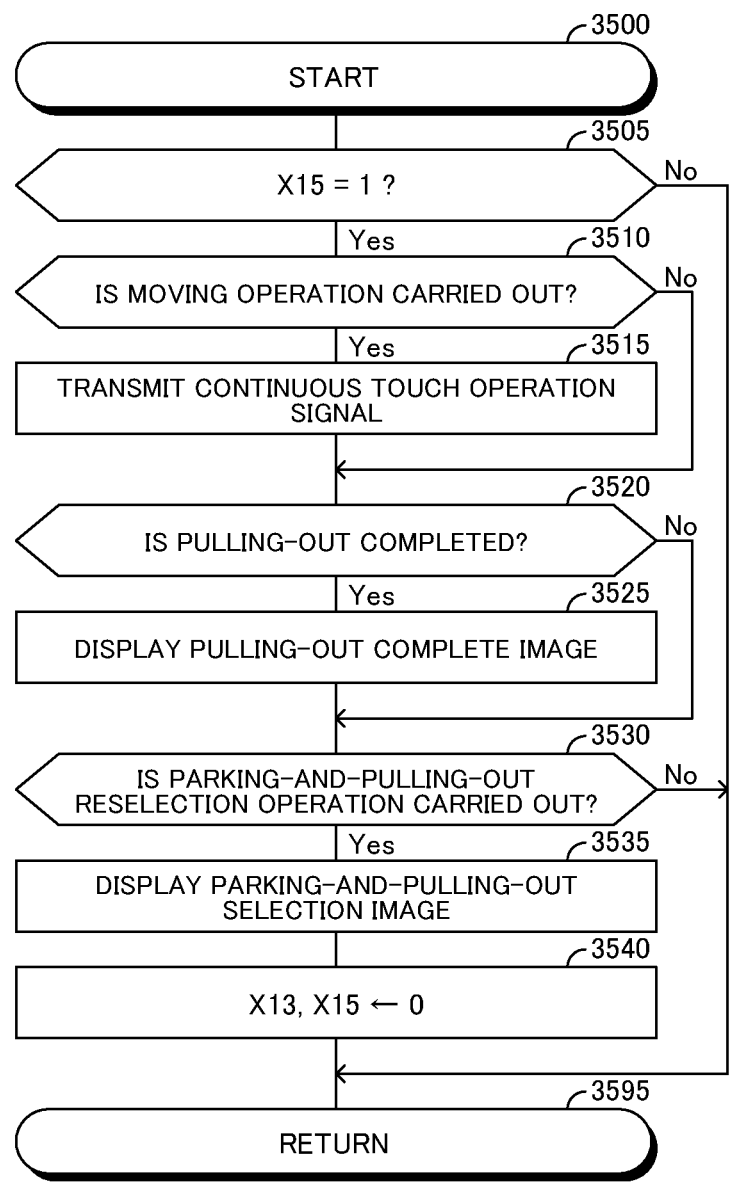
FIG. 35 is a view which shows a flowchart of a routine executed by the terminal control unit according to the embodiment of the invention.

Furthermore, the terminal CPU 191 is configured or programmed to execute a routine shown in FIG. 35 with the predetermined calculation cycle. Thus, at a predetermined timing, the terminal CPU 191 starts a process from a step 3500 of the routine shown in FIG. 35 and proceeds with the process to a step 3505 to determine whether the value of the pulling-out operation image display flag X15 is "1". When the terminal CPU 191 determines "Yes" at the step 3505, the terminal CPU 191 proceeds with the process to a step 3510 to determine whether the moving operation is carried out. That is, the terminal CPU 191 determines whether the touch operation is applied to the pulling-out moving operation image portion P64. When the terminal CPU 191 determines "Yes" at the step 3510, the terminal CPU 191 proceeds with the process to a step 3515 to wirelessly transmit the continuous touch operation signal S26. Next, the terminal CPU 191 proceeds with the process to a step 3520.

On the other hand, when the terminal CPU 191 determines "No" at the step 3510, the terminal CPU 191 proceeds with the process directly to the step 3520.

When the terminal CPU 191 proceeds with the process to the step 3520, the terminal CPU 191 determines whether pulling out the own vehicle 200 from the current parking space 31N is completed. That is, the terminal CPU 191 determines whether to have received the pulling-out complete signal S28. When the terminal CPU 191 determines "Yes" at the step 3520, the terminal CPU 191 proceeds with the process to a step 3525 to display the pulling-out complete image G69 on the terminal display 120. Next, the terminal CPU 191 proceeds with the process to a step 3530.

On the other hand, when the terminal CPU 191 determines "No" at the step 3520, the terminal CPU 191 proceeds with the process directly to the step 3530.

When the terminal CPU 191 proceeds with the process to the step 3530, the terminal CPU 191 determines whether the parking-and-pulling-out reselection operation is applied to the terminal display 120. That is, the terminal CPU 191 determines whether the touch operation is applied to the parking-and-pulling-out reselection image portion P66. When the terminal CPU 191 determines "Yes" at the step 3530, the terminal CPU 191 proceeds with the process to a step 3535 to display the parking-and-pulling-out selection image G20 on the terminal display 120. Next, the terminal CPU 191 proceeds with the process to a step 3540 to set the values of the pulling-out direction selection image display flag X13 and the pulling-out operation image display flag X15 to "0", respectively. Next, the terminal CPU 191 proceeds with the process to a step 3595 to terminate this routine once.

On the other hand, when the terminal CPU 191 determines "No" at the step 3530, the terminal CPU 191 proceeds with the process directly to the step 3595 to terminate this routine once.

Further, when the terminal CPU 191 determines "No" at the step 3505, the terminal CPU 191 proceeds with the process directly to the step 3595 to terminate this routine once.

Figure 36:
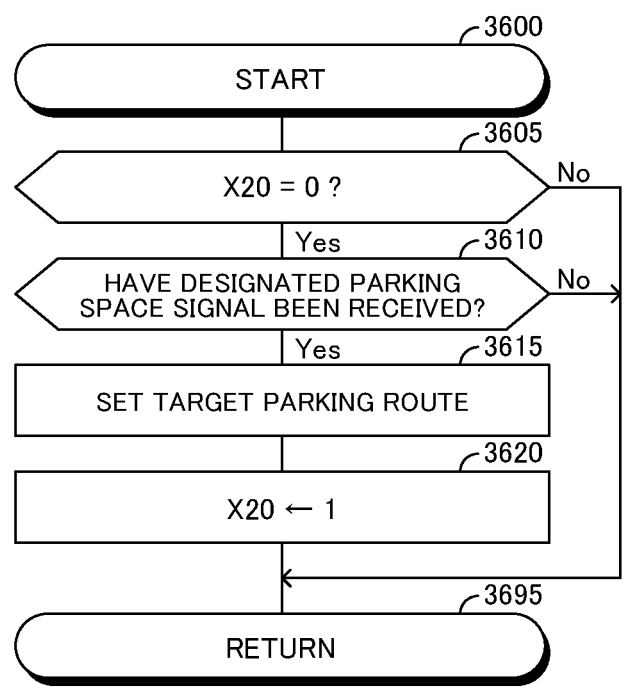
FIG. 36 is a view which shows a flowchart of a routine executed by the vehicle control unit according to the embodiment of the invention.

On the other hand, the vehicle CPU 291 of the vehicle ECU 290 of the vehicle control unit 210 is configured or programmed to execute a routine shown in FIG. 36 with the predetermined calculation cycle. Thus, at a predetermined timing, the vehicle CPU 291 starts a process from a step 3600 of the routine shown in FIG. 36 and proceeds with the process to a step 3605 to determine whether a value of a parking route set complete flag X20 is "0". The parking route set complete flag X20 is a flag which represents that the target parking route Rin_tgt is set. The value of the parking route set complete flag X20 is set to "1" when the target parking route Rin_tgt is set. When the value of the parking route set complete flag X20 is "0", the target parking route Rin_tgt is not set.

When the vehicle CPU 291 determines "Yes" at the step 3605, the vehicle CPU 291 proceeds with the process to a step 3610 to determine whether to have received the designated parking space signal S14. When the vehicle CPU 291 determines "Yes" at the step 3610, the vehicle CPU 291 proceeds with the process to a step 3615 to set the target parking route Rin_tgt. Next, the vehicle CPU 291 proceeds with the process to a step 3620 to set the value of the parking route set complete flag X20 to "1". Next, the vehicle CPU 291 proceeds with the process to a step 3695 to terminate this routine once.

On the other hand, when the vehicle CPU 291 determines "No" at the step 3610, the vehicle CPU 291 proceeds with the process directly to the step 3695 to terminate this routine once.

Further, when the vehicle CPU 291 determines "No" at the step 3605, the vehicle CPU 291 proceeds with the process directly to the step 3695 to terminate this routine once.

Figure 37:
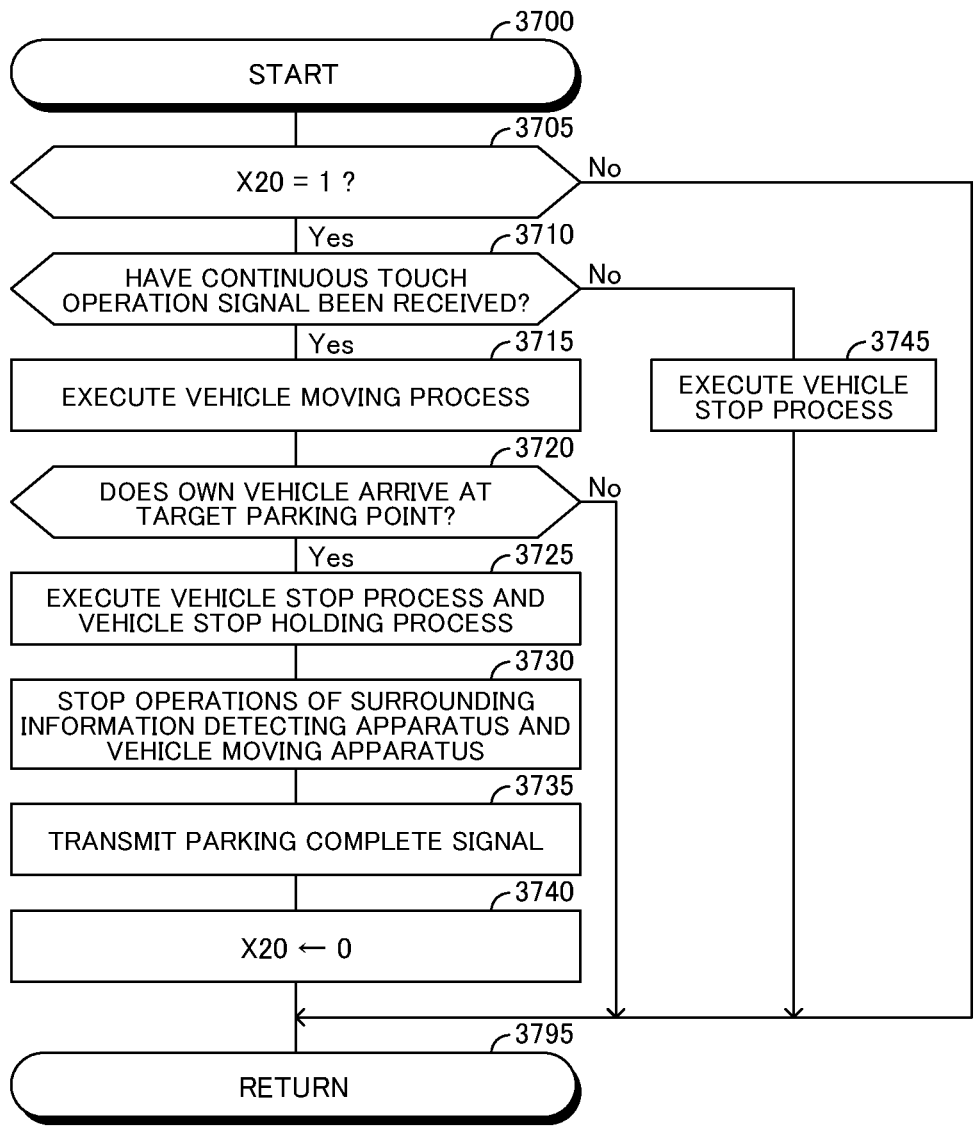
FIG. 37 is a view which shows a flowchart of a routine executed by the vehicle control unit according to the embodiment of the invention.

Further, the vehicle CPU 291 is configured or programmed to execute a routine shown in FIG. 37 with the predetermined calculation cycle. Thus, at a predetermined timing, the vehicle CPU 291 starts a process from a step 3700 of the routine shown in FIG. 37 and proceeds with the process to a step 3705 to determine whether the value of the parking route set complete flag X20 is "1". When the vehicle CPU 291 determines "Yes" at the step 3705, the vehicle CPU 291 proceeds with the process to a step 3710 to determine whether to have received the continuous touch operation signal S16.

When the vehicle CPU 291 determines "Yes" at the step 3710, the vehicle CPU 291 proceeds with the process to a step 3715 to control the operations of the vehicle moving apparatus 220 to move the own vehicle 200 along the target parking route Rin_tgt. Next, the vehicle CPU 291 proceeds with the process to a step 3720 to determine whether the own vehicle 200 arrives at the target parking point Pin_tgt. That is, the vehicle CPU 291 determines whether parking the own vehicle 200 in the designated parking space 31D is completed.

When the vehicle CPU 291 determines "Yes" at the step 3720, the vehicle CPU 291 proceeds with the process to a step 3725 to execute the vehicle stop process and the vehicle stop holding process. Next, the vehicle CPU 291 proceeds with the process to a step 3730 to stop the operations of the surrounding information detecting apparatus 260 and the vehicle moving apparatus 220. Next, the vehicle CPU 291 proceeds with the process to a step 3735 to wirelessly transmit the parking complete signal S18. Next, the vehicle CPU 291 proceeds with the process to a step 3740 to set the value of the parking route set complete flag X20 to "0". Next, the vehicle CPU 291 proceeds with the process to a step 3795 to terminate this routine once.

On the other hand, when the vehicle CPU 291 determines "No" at the step 3720, the vehicle CPU 291 proceeds with the process directly to the step 3795 to terminate this routine once.

Further, when the vehicle CPU 291 determines "No" at the step 3710, the vehicle CPU 291 proceeds with the process to a step 3745 to execute the vehicle stop process. Next, the vehicle CPU 291 proceeds with the process to the step 3795 to terminate this routine once.

Further, when the vehicle CPU 291 determines "No" at the step 3705, the vehicle CPU 291 proceeds with the process directly to the step 3795 to terminate this routine once.

Figure 38:
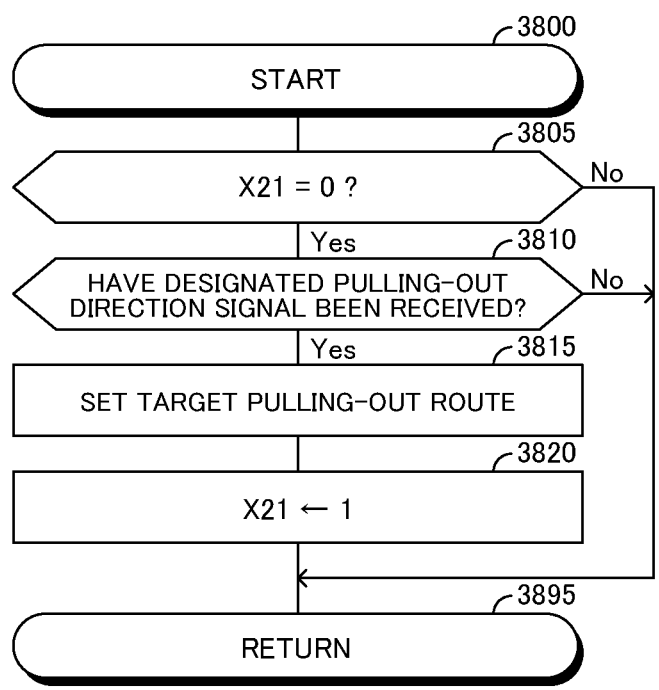
FIG. 38 is a view which shows a flowchart of a routine executed by the vehicle control unit according to the embodiment of the invention.

Further, the vehicle CPU 291 is configured or programmed to execute a routine shown in FIG. 38 with the predetermined calculation cycle. Thus, at a predetermined timing, the vehicle CPU 291 starts a process from a step 3800 of the routine shown in FIG. 38 and proceeds with the process to a step 3805 to determine whether a value of a pulling-out route set complete flag X21 is "0". The pulling-out route set complete flag X21 is a flag which represents that the target pulling-out route Rout_tgt is set. The value of the pulling-out route set complete flag X21 is set to "1" when the target pulling-out route Rout_tgt is set. When the value of the pulling-out route set complete flag X21 is "0", the target pulling-out route Rout_tgt is not set.

When the vehicle CPU 291 determines "Yes" at the step 3805, the vehicle CPU 291 proceeds with the process to a step 3810 to determine whether to have received the designated pulling-out direction signal S22. When the vehicle CPU 291 determines "Yes" at the step 3810, the vehicle CPU 291 proceeds with the process to a step 3815 to set the target pulling-out route Rout_tgt. Next, the vehicle CPU 291 proceeds with the process to a step 3820 to set the value of the pulling-out route set complete flag X21 to "1". Next, the vehicle CPU 291 proceeds with the process to a step 3895 to terminate this routine once.

On the other hand, when the vehicle CPU 291 determines "No" at the step 3810, the vehicle CPU 291 proceeds with the process directly to the step 3895 to terminate this routine once.

Further, when the vehicle CPU 291 determines "No" at the step 3805, the vehicle CPU 291 proceeds with the process directly to the step 3895 to terminate this routine once.

Figure 39:
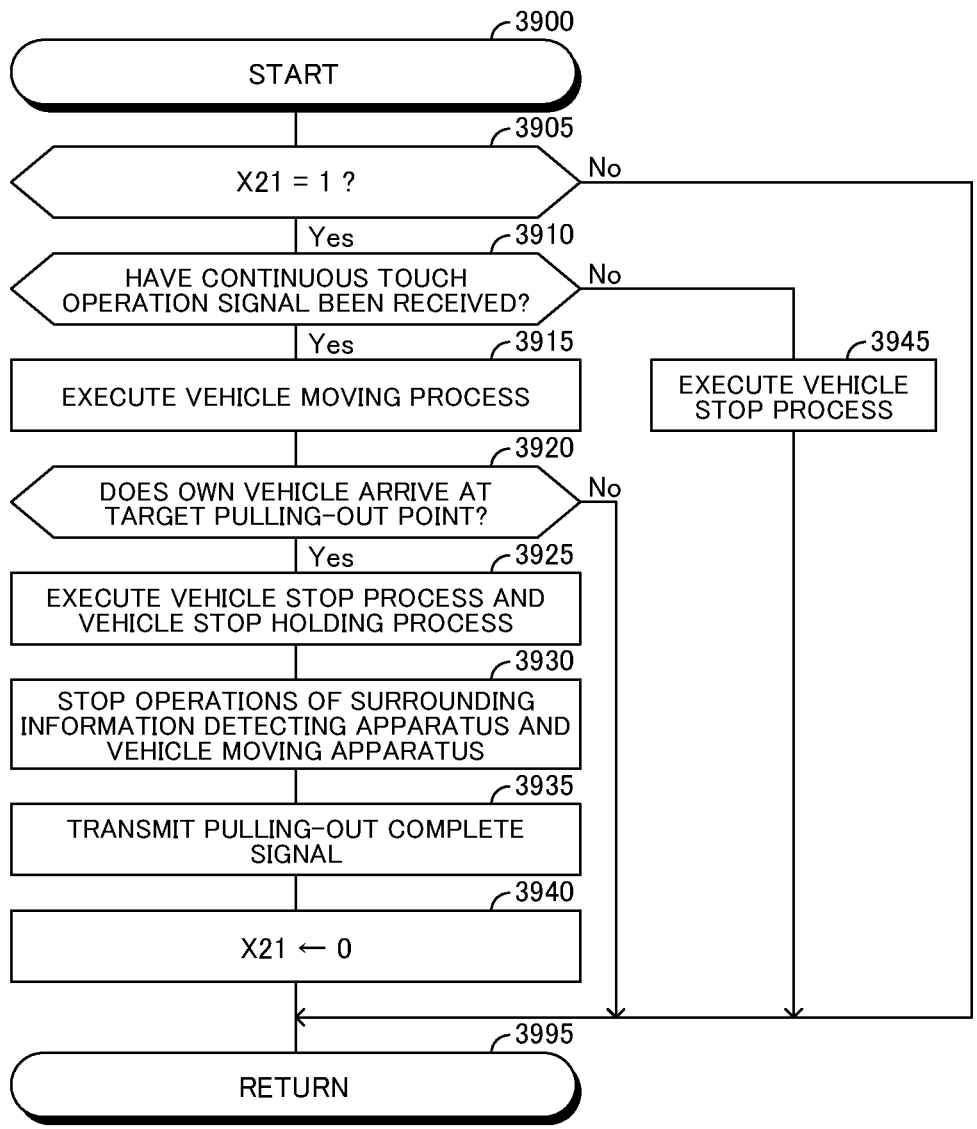
FIG. 39 is a view which shows a flowchart of a routine executed by the vehicle control unit according to the embodiment of the invention.

Further, the vehicle CPU 291 is configured or programmed to execute a routine shown in FIG. 39 with the predetermined calculation cycle. Thus, at a predetermined timing, the vehicle CPU 291 starts a process from a step 3900 of the routine shown in FIG. 39 and proceeds with the process to a step 3905 to determine whether the value of the pulling-out route set complete flag X21 is "1". When the vehicle CPU 291 determines "Yes" at the step 3905, the vehicle CPU 291 proceeds with the process to a step 3910 to determine whether to have received the continuous touch operation signal S26.

When the vehicle CPU 291 determines "Yes" at the step 3910, the vehicle CPU 291 proceeds with the process to a step 3915 to control the operations of the vehicle moving apparatus 220 to move the own vehicle 200 along the target pulling-out route Rout_tgt. Next, the vehicle CPU 291 proceeds with the process to a step 3920 to determine whether the own vehicle 200 arrives at the target pulling-out point Pout_tgt. That is, the vehicle CPU 291 determines whether pulling out the own vehicle 200 from the designated parking space 31D is completed.

When the vehicle CPU 291 determines "Yes" at the step 3920, the vehicle CPU 291 proceeds with the process to a step 3925 to execute the vehicle stop process and the vehicle stop holding process. Next, the vehicle CPU 291 proceeds with the process to a step 3930 to stop the operations of the surrounding information detecting apparatus 260 and the vehicle moving apparatus 220. Next, the vehicle CPU 291 proceeds with the process to a step 3935 to wirelessly transmit the pulling-out complete signal S28. Next, the vehicle CPU 291 proceeds with the process to a step 3940 to set the value of the pulling-out route set complete flag X21 to "0". Next, the vehicle CPU 291 proceeds with the process to a step 3995 to terminate this routine once.

On the other hand, when the vehicle CPU 291 determines "No" at the step 3920, the vehicle CPU 291 proceeds with the process directly to the step 3995 to terminate this routine once.

Further, when the vehicle CPU 291 determines "No" at the step 3910, the vehicle CPU 291 proceeds with the process to a step 3945 to execute the vehicle stop process. Next, the vehicle CPU 291 proceeds with the process to the step 3995 to terminate this routine once.

Further, when the vehicle CPU 291 determines "No" at the step 3905, the vehicle CPU 291 proceeds with the process directly to the step 3995 to terminate this routine once.

Figure 40:
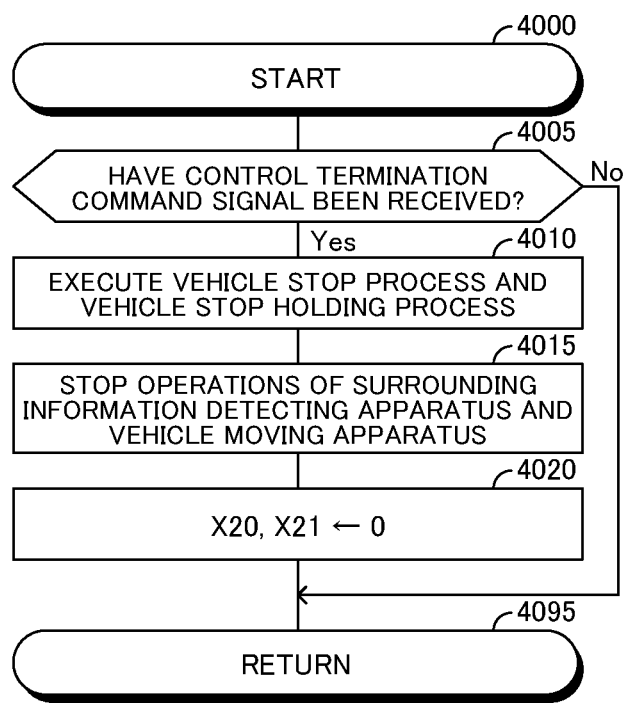
FIG. 40 is a view which shows a flowchart of a routine executed by the vehicle control unit according to the embodiment of the invention.

Further, the vehicle CPU 291 is configured or programmed to execute a routine shown in FIG. 40 with the predetermined calculation cycle. Thus, at a predetermined timing, the vehicle CPU 291 starts a process from a step 4000 of the routine shown in FIG. 40 and proceeds with the process to a step 4005 to determine whether to have received the control termination command signal S30.

When the vehicle CPU 291 determines "Yes" at the step 4005, the vehicle CPU 291 proceeds with the process to a step 4010 to execute the vehicle stop process and the vehicle stop holding process. Next, the vehicle CPU 291 proceeds with the process to a step 4015 to stop the operations of the surrounding information detecting apparatus 260 and the vehicle moving apparatus 220. Next, the vehicle CPU 291 proceeds with the process to a step 4020 to set the values of the parking route set complete flag X20 and the pulling-out route set complete flag X21 to "0", respectively. Next, the vehicle CPU 291 proceeds with the process to a step 4095 to terminate this routine once.

On the other hand, when the vehicle CPU 291 determines "No" at the step 4005, the vehicle CPU 291 proceeds with the process directly to the step 4095 to terminate this routine once.

Figure 41:
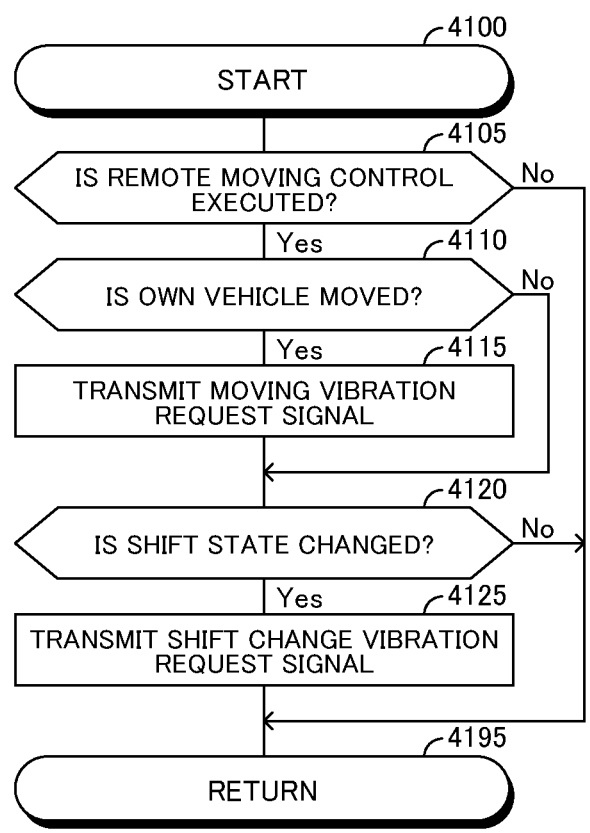
FIG. 41 is a view which shows a flowchart of a routine executed by the vehicle control unit according to the embodiment of the invention.
Figure 43:
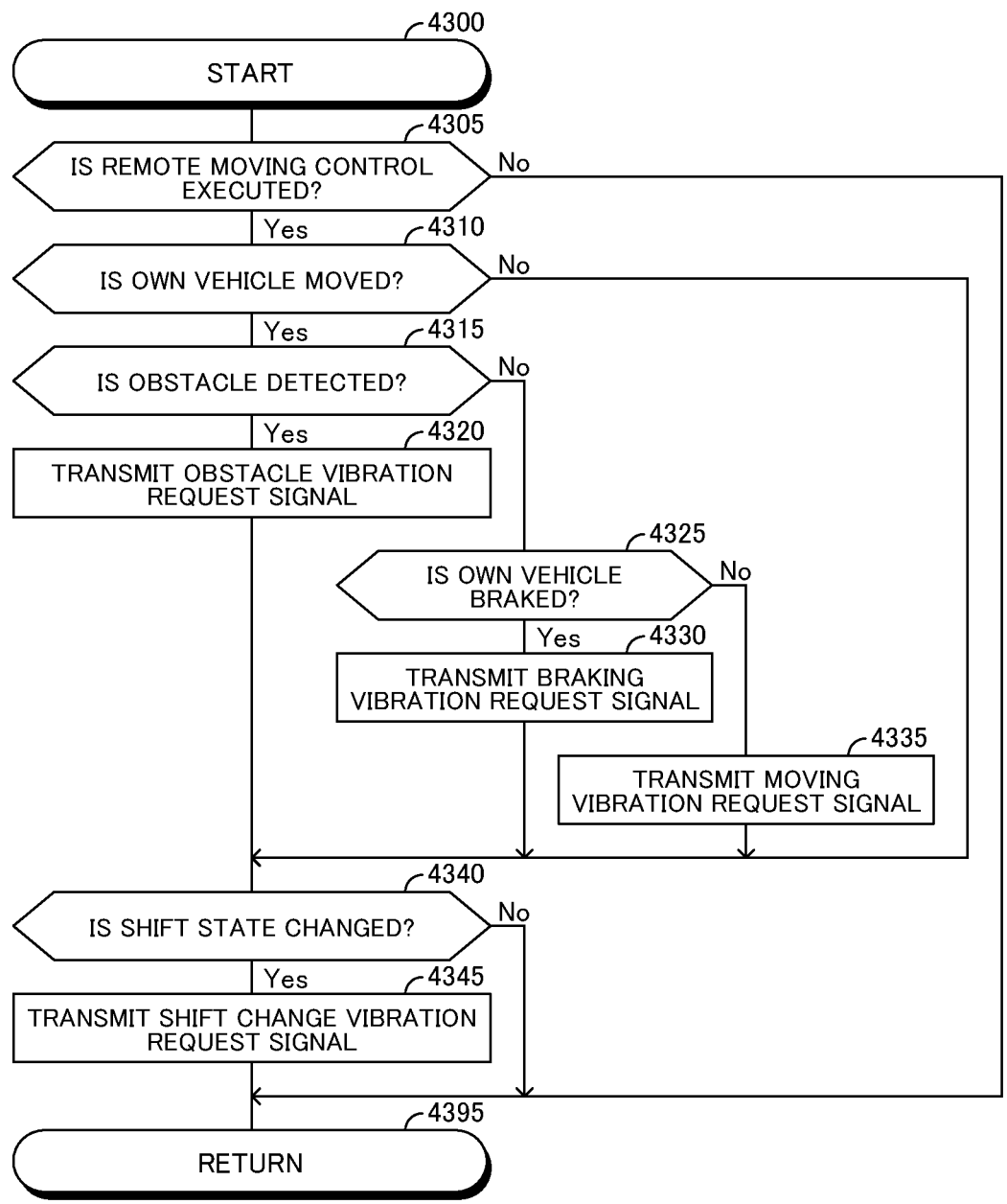
FIG. 43 is a view which shows a flowchart of a routine executed by the vehicle control unit according to the embodiment of the invention.

Further, the vehicle CPU 291 is configured or programmed to execute a routine shown in FIG. 41 or FIG. 43 with the predetermined calculation cycle. Thus, when the vehicle CPU 291 is configured or programmed to execute the routine shown in FIG. 41, at a predetermined timing, the vehicle CPU 291 starts a process from a step 4100 of the routine shown in FIG. 41 and proceeds with the process to a step 4105 to determine whether the remote moving control is executed.

When the vehicle CPU 291 determines "Yes" at the step 4105, the vehicle CPU 291 proceeds with the process to a step 4110 to determine whether the own vehicle 200 is moved forward or rearward. When the vehicle CPU 291 determines "Yes" at the step 4110, the vehicle CPU 291 proceeds with the process to a step 4115 to wirelessly transmit the moving vibration request signal S41 via the vehicle signal receiving-and-transmitting device 280. Next, the vehicle CPU 291 proceeds with the process to a step 4120.

On the other hand, when the vehicle CPU 291 determines "No" at the step 4110, the vehicle CPU 291 proceeds with the process directly to the step 4120.

When the vehicle CPU 291 proceeds with the process to the step 4120, the vehicle CPU 291 determines whether the shift state of the transmission apparatus 224 is changed from the forward driving state to the rearward driving state or from rearward driving state to the forward driving state. When the vehicle CPU 291 determines "Yes" at the step 4120, the vehicle CPU 291 proceeds with the process to a step 4125 to wirelessly transmit the shift change vibration request signal S42 via the vehicle signal receiving-and-transmitting device 280. Next, the vehicle CPU 291 proceeds with the process to a step 4195 to terminate this routine once.

On the other hand, when the vehicle CPU 291 determines "No" at the step 4120, the vehicle CPU 291 proceeds with the process directly to the step 4195 to terminate this routine once.

Further, when the vehicle CPU 291 determines "No" at the step 4105, the vehicle CPU 291 proceeds with the process directly to the step 4195 to terminate this routine once.

Figure 42:
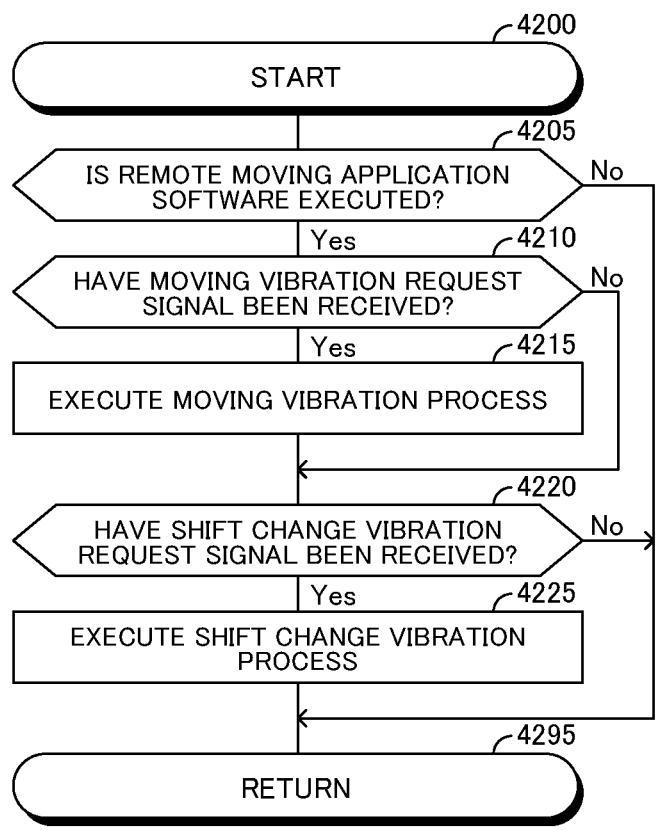
FIG. 42 is a view which shows a flowchart of a routine executed by the terminal control unit according to the embodiment of the invention.

On the other hand, the terminal CPU 191 is configured or programmed to execute a routine shown in FIG. 42 with the predetermined calculation cycle when the vehicle CPU 291 is configured or programmed to execute the routine shown in FIG. 41. Thus, at a predetermined timing, the terminal CPU 191 starts a process from a step 4200 of the routine shown in FIG. 42 and proceeds with the process to a step 4205 to determine whether the remote moving application software is executed.

When the terminal CPU 191 determines "Yes" at the step 4205, the terminal CPU 191 proceeds with the process to a step 4210 to determine whether to have received the moving vibration request signal S41. When the terminal CPU 191 determines "Yes" at the step 4210, the terminal CPU 191 proceeds with the process to a step 4215 to execute the moving vibration process. Thereby, the operation terminal 100 is vibrated with the moving vibration pattern. Next, the terminal CPU 191 proceeds with the process to a step 4220.

On the other hand, when the terminal CPU 191 determines "No" at the step 4210, the terminal CPU 191 proceeds with the process directly to the step 4220.

When the terminal CPU 191 proceeds with the process to the step 4220, the terminal CPU 191 determines whether to have received the shift change vibration request signal S42. When the terminal CPU 191 determines "Yes" at the step 4220, the terminal CPU 191 proceeds with the process to a step 4225 to execute the shift change vibration process. Thereby, the operation terminal 100 is vibrated with the shift change vibration pattern. Next, the terminal CPU 191 proceeds with the process to a step 4295 to terminate this routine once.

On the other hand, when the terminal CPU 191 determines "No" at the step 4220, the terminal CPU 191 proceeds with the process directly to the step 4295 to terminate this routine once.

Further, when the terminal CPU 191 determines "No" at the step 4205, the terminal CPU 191 proceeds with the process directly to the step 4295 to terminate this routine once.

When the vehicle CPU 291 is configured or programmed to execute the routine shown in FIG. 43, at a predetermined timing, the vehicle CPU 291 starts a process from a step 4300 of the routine shown in FIG. 43 and proceeds with the process to a step 4305 to determine whether the remote moving control is executed.

When the vehicle CPU 291 determines "Yes" at the step 4305, the vehicle CPU 291 proceeds with the process to a step 4310 to determine whether the own vehicle 200 is moved forward or rearward. When the vehicle CPU 291 determines "Yes" at the step 4310, the vehicle CPU 291 proceeds with the process to a step 4315 to determine that the obstacle is detected. When the vehicle CPU 291 determines "Yes" at the step 4315, the vehicle CPU 291 proceeds with the process to a step 4320 to wirelessly transmit the obstacle vibration request signal S44 via the vehicle signal receiving-and-transmitting device 280. Next, the vehicle CPU 291 proceeds with the process to a step 4340.

On the other hand, when the vehicle CPU 291 determines "No" at the step 4315, the vehicle CPU 291 proceeds with the process to a step 4325 to determine whether the own vehicle 200 is braked. When the vehicle CPU 291 determines "Yes" at the step 4325, the vehicle CPU 291 proceeds with the process to a step 4330 to wirelessly transmit the braking vibration request signal S43 via the vehicle signal receiving-and-transmitting device 280. Next, the vehicle CPU 291 proceeds with the process to the step 4340.

On the other hand, when the vehicle CPU 291 determines "No" at the step 4325, the vehicle CPU 291 proceeds with the process to a step 4335 to wirelessly transmit the moving vibration request signal S41 via the vehicle signal receiving-and-transmitting device 280. Next, the vehicle CPU 291 proceeds with the process to the step 4340.

Further, when the vehicle CPU 291 determines "No" at the step 4310, the vehicle CPU 291 proceeds with the process directly to the step 4340.

When the vehicle CPU 291 proceeds with the process to the step 4340, the vehicle CPU 291 determines whether the shift state of the transmission apparatus 224 is changed from the forward driving state to the rearward driving state or from rearward driving state to the forward driving state. When the vehicle CPU 291 determines "Yes" at the step 4340, the vehicle CPU 291 proceeds with the process to a step 4345 to wirelessly transmit the shift change vibration request signal S42 via the vehicle signal receiving-and-transmitting device 280. Next, the vehicle CPU 291 proceeds with the process to a step 4395 to terminate this routine once.

On the other hand, when the vehicle CPU 291 determines "No" at the step 4340, the vehicle CPU 291 proceeds with the process directly to the step 4395 to terminate this routine once.

Further, when the vehicle CPU 291 determines "No" at the step 4305, the vehicle CPU 291 proceeds with the process directly to the step 4395 to terminate this routine once.

Figure 44:
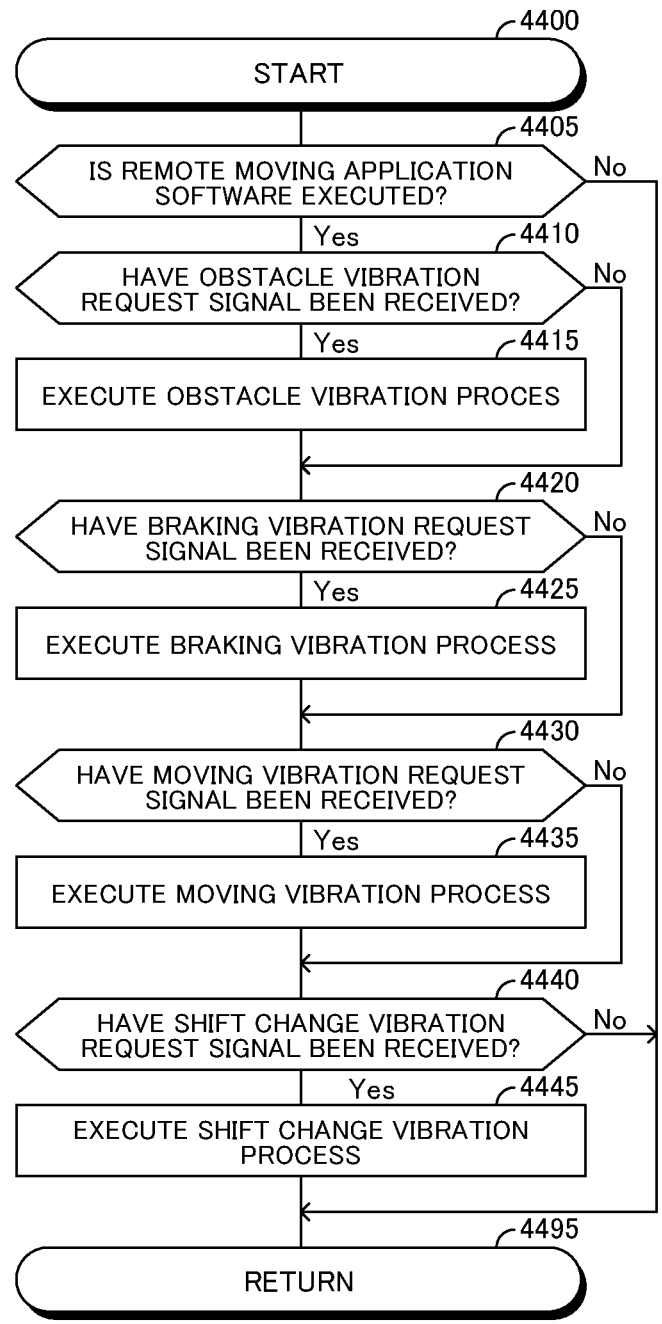
FIG. 44 is a view which shows a flowchart of a routine executed by the terminal control unit according to the embodiment of the invention.

On the other hand, the terminal CPU 191 is configured or programmed to execute a routine shown in FIG. 44 with the predetermined calculation cycle when the vehicle CPU 291 is configured or programmed to execute the routine shown in FIG. 43. Thus, at a predetermined timing, the terminal CPU 191 starts a process from a step 4400 of the routine shown in FIG. 44 and proceeds with the process to a step 4405 to determine whether the remote moving application software is executed.

When the terminal CPU 191 determines "Yes" at the step 4405, the terminal CPU 191 proceeds with the process to a step 4410 to determine whether to have received the obstacle vibration request signal S44. When the terminal CPU 191 determines "Yes" at the step 4410, the terminal CPU 191 proceeds with the process to a step 4415 to execute the obstacle vibration process. Thereby, the operation terminal 100 is vibrated with the obstacle vibration pattern. Next, the terminal CPU 191 proceeds with the process to a step 4420.

On the other hand, when the terminal CPU 191 determines "No" at the step 4410, the terminal CPU 191 proceeds with the process directly to the step 4420.

When the terminal CPU 191 proceeds with the process to the step 4420, the terminal CPU 191 determines whether to have received the braking vibration request signal S43. When the terminal CPU 191 determines "Yes" at the step 4420, the terminal CPU 191 proceeds with the process to a step 4425 to execute the braking vibration process. Thereby, the operation terminal 100 is vibrated with the braking vibration pattern. Next, the terminal CPU 191 proceeds with the process to a step 4430.

On the other hand, when the terminal CPU 191 determines "No" at the step 4420, the terminal CPU 191 proceeds with the process directly to the step 4430.

When the terminal CPU 191 proceeds with the process to the step 4430, the terminal CPU 191 determines whether to have received the moving vibration request signal S41. When the terminal CPU 191 determines "Yes" at the step 4430, the terminal CPU 191 proceeds with the process to a step 4435 to execute the moving vibration process. Thereby, the operation terminal 100 is vibrated with the moving vibration pattern. Next, the terminal CPU 191 proceeds with the process to a step 4440.

On the other hand, when the terminal CPU 191 determines "No" at the step 4430, the terminal CPU 191 proceeds with the process directly to the step 4440.

When the terminal CPU 191 proceeds with the process to the step 4440, the terminal CPU 191 determines whether to have received the shift change vibration request signal S42. When the terminal CPU 191 determines "Yes" at the step 4440, the terminal CPU 191 proceeds with the process to a step 4445 to execute the shift change vibration process. Thereby, the operation terminal 100 is vibrated with the shift change vibration pattern. Next, the terminal CPU 191 proceeds with the process to a step 4495 to terminate this routine once.

On the other hand, when the terminal CPU 191 determines "No" at the step 4440, the terminal CPU 191 proceeds with the process directly to the step 4495 to terminate this routine once.

Further, when the terminal CPU 191 determines "No" at the step 4405, the terminal CPU 191 proceeds with the process directly to the step 4495 to terminate this routine once.

The specific operations of the remote moving system 10 have been described.

It should be noted that the invention is not limited to the aforementioned embodiments, and various modifications can be employed within the scope of the invention.

What is claimed is:

1. A non-transitory computer readable medium comprising a remote moving application software comprising machine readable instructions that, when executed by a processor, performs a remote moving control, wherein the remote moving application software is installed in a terminal control unit of an operation terminal to enable the terminal control unit to wirelessly communicate to a vehicle control unit of a vehicle to cause the vehicle control unit to execute the remote moving control to autonomously control braking and shifting of the vehicle so as to move, brake and change gears of the vehicle in response to user operations applied to the operation terminal, wherein the remote moving application software is programmed to control the terminal control unit to cause the operation terminal to (i) generate vibration or (ii) output informing sounds, depending on a state of controlling the vehicle when the remote moving control is executed, wherein when (i) the remote moving control is executed, and (ii) the state of controlling the vehicle is a state of changing a shift state of a transmission apparatus of the vehicle by autonomously shifting the vehicle, the remote moving application software is programmed to control the terminal control unit to cause the operation terminal to (i) generate the vibration having a vibration pattern different from the vibration pattern of the vibration generated by the operation terminal when the state of controlling the vehicle is a state other than the state of changing the shift state or (ii) output the informing sounds having an output pattern different from the output pattern of the informing sounds output by the operation terminal when the state of controlling the vehicle is the state other than the state of changing the shift state.

2. The non-transitory computer readable medium as set forth in claim 1, wherein the remote moving application software is programmed to:

when (i) the remote moving control is executed, and (ii) the state of controlling the vehicle is a state of moving the vehicle, control the terminal control unit to cause the operation terminal to (i) generate the vibration having a predetermined moving vibration pattern or (ii) output the informing sounds having a predetermined moving informing sound output pattern; and when (i) the remote moving control is executed, and (ii) the state of controlling the vehicle is the state of changing the shift state, control the terminal control unit to cause the operation terminal to (i) generate the vibration having a shift change vibration pattern different from the predetermined moving vibration pattern or (ii) output the informing sounds having a shift change informing sound output pattern different from the predetermined moving informing sound output pattern.

3. The non-transitory computer readable medium as set forth in claim 1, wherein the remote moving application software is programmed to:

when (i) the remote moving control is executed, and (ii) the state of controlling the vehicle is a state of braking the vehicle, control the terminal control unit to cause the operation terminal to (i) generate the vibration having a predetermined braking vibration pattern or (ii) output the informing sounds having a predetermined braking informing sound output pattern; and when (i) the remote moving control is executed, and (ii) the state of controlling the vehicle is the state of changing the shift state, control the terminal control unit to cause the operation terminal to (i) generate the vibration having a shift changing vibration pattern different from the predetermined braking vibration pattern or (ii) output the informing sounds having a shift change informing sound output pattern different from the predetermined braking informing sound output pattern.

4. The non-transitory computer readable medium as set forth in claim 1, wherein the remote moving application software is programmed to:

when (i) the remote moving control is executed, and (ii) an obstacle is detected around the vehicle, control the terminal control unit to cause the operation terminal to (i) generate the vibration having the vibration pattern different from the vibration pattern which depends on the state of controlling the vehicle or (ii) output the informing sounds having the output pattern different from the output pattern which depends on the state of controlling the vehicle.

5. A remote moving system which (i) causes a terminal control unit of an operation terminal and a vehicle control unit of a vehicle to wirelessly communicate to each other and (ii) causes the vehicle control unit to execute a remote moving control to autonomously control braking and shifting of the vehicle so as to move, brake and change gears of the vehicle in response to user operations applied to the operation terminal, wherein the remote moving system is configured to control the terminal control unit to cause the operation terminal to (i) generate vibration or (ii) output informing sounds, depending on a state of controlling the vehicle when the remote moving control is executed, wherein when (i) the remote moving control is executed, and (ii) the state of controlling the vehicle is a state of changing a shift state of a transmission apparatus of the vehicle by autonomously shifting the vehicle, the terminal control unit is configured to cause the operation terminal to (i) generate the vibration having a vibration pattern different from the vibration pattern of the vibration generated by the operation terminal when the state of controlling the vehicle is a state other than the state of changing the shift state or (ii) output the informing sounds having an output pattern different from the output pattern of the informing sounds output by the operation terminal when the state of controlling the vehicle is the state other than the state of changing the shift state.

* * * * *